US010304244B2

(12) United States Patent
Chuang et al.

(10) Patent No.: US 10,304,244 B2
(45) Date of Patent: May 28, 2019

(54) MOTION CAPTURE AND CHARACTER SYNTHESIS

(71) Applicant: Microsoft Technology Licensing, LLC, Redmond, WA (US)

(72) Inventors: Ming Chuang, Bellevue, WA (US); Alvaro Collet Romea, Seattle, WA (US); Hugues H. Hoppe, Redmond, WA (US); Fabian Andres Prada Nino, Baltimore, MD (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 75 days.

(21) Appl. No.: 15/206,086

(22) Filed: Jul. 8, 2016

(65) Prior Publication Data
US 2018/0012407 A1    Jan. 11, 2018

(51) Int. Cl.
*G09G 5/00*   (2006.01)
*G06T 17/20*   (2006.01)
(Continued)

(52) U.S. Cl.
CPC ............ *G06T 17/205* (2013.01); *G06T 7/75* (2017.01); *G06T 13/40* (2013.01); *G06T 15/04* (2013.01);
(Continued)

(58) Field of Classification Search
CPC ..... G06T 17/205; G06T 7/0046; G06T 13/40; G06T 15/04
(Continued)

(56) References Cited

U.S. PATENT DOCUMENTS 7,408,986 B2    8/2008  Winder
8,026,917 B1 *  9/2011  Rogers .................. G06T 13/40
                                                345/419
(Continued)

FOREIGN PATENT DOCUMENTS

WO   2013174671 A1   11/2013

OTHER PUBLICATIONS

Aksoylu, et al., "Multilevel solvers for unstructured surface meshes", In SIAM Journal on Scientific Computing, vol. 26, Iss. 4, Apr. 1, 2005, pp. 1146-1165.
(Continued)

*Primary Examiner* — Sarah Lhymn
(74) *Attorney, Agent, or Firm* — Merchant & Gould

(57) ABSTRACT

In some examples, a computing device can determine synthetic meshes based on source meshes of a source mesh sequence and target meshes of a target mesh sequence. The computing device can then place the respective synthetic meshes based at least in part on a rigid transformation to define a processor-generated character. For example, the computing device can determine subsets of the mesh sequences based on a similarity criterion. The computing device can determine modified first and second meshes having a connectivity corresponding to a reference mesh. The computing device can then determine the synthetic meshes based on the modified first and second meshes. In some examples, the computing device can project source and target textures onto the synthetic mesh to provide projected source and target textures. The computing device can determine a synthetic texture registered to the synthetic mesh based on the projected source and target textures.

20 Claims, 16 Drawing Sheets

(51) Int. Cl.
  *G06T 13/40* (2011.01)
  *G06T 15/04* (2011.01)
  *G06T 7/73* (2017.01)
(52) U.S. Cl.
  CPC ............... *G06T 2207/20072* (2013.01); *G06T 2207/20076* (2013.01)
(58) Field of Classification Search
  USPC .................................. 345/418, 419, 420, 619
  See application file for complete search history.

(56) References Cited

U.S. PATENT DOCUMENTS

| | | | |
|---|---|---|---|
| 8,958,600 B2 | 2/2015 | Othmezouri et al. | |
| 2006/0274070 A1* | 12/2006 | Herman | A63F 13/10 345/474 |
| 2008/0309664 A1* | 12/2008 | Zhou | G06T 13/40 345/420 |
| 2009/0002376 A1 | 1/2009 | Xu et al. | |
| 2009/0284529 A1 | 11/2009 | De Aguiar et al. | |
| 2010/0238182 A1 | 9/2010 | Geisner et al. | |
| 2011/0018880 A1* | 1/2011 | Whited | G06T 11/203 345/473 |
| 2011/0304622 A1* | 12/2011 | Rogers | G06T 13/40 345/420 |
| 2012/0169737 A1* | 7/2012 | Alter | G06T 13/40 345/428 |
| 2012/0280991 A1 | 11/2012 | Maloney et al. | |
| 2013/0002669 A1* | 1/2013 | Rhee | G06T 13/40 345/420 |
| 2014/0035901 A1 | 2/2014 | Chen et al. | |
| 2015/0113379 A1 | 4/2015 | Wakefield et al. | |
| 2015/0178988 A1 | 6/2015 | Montserrat Mora et al. | |
| 2015/0310656 A1* | 10/2015 | Otto | G06K 9/00342 345/420 |
| 2017/0004627 A1* | 1/2017 | Baloch | G06T 17/20 |
| 2017/0032560 A1* | 2/2017 | Dionne | G06T 13/40 |
| 2017/0091994 A1* | 3/2017 | Beeler | G06T 17/20 |

OTHER PUBLICATIONS

Arikan, et al., "Interactive motion generation from examples", In Proceedings of the 29th Annual Conference on computer Graphics and Interactive Techniques, Jul. 23, 2002, pp. 483-490.
Bojsen-Hansen, et al., "Tracking surfaces with evolving topology", In Journal of ACM Transactions on Graphics, vol. 31, Iss. 4, Jul. 2012, 10 pages.
Boukhayma, et al., "Video based Animation Synthesis with the Essential Graph", In Proceedings of IEEE International Conference on 3D Vision, Oct. 2015, 10 pages.
Carranza, et al., "Free-Viewpoint Video of Human Actors", In Journal of ACM Transactions on Graphics, vol. 22, Iss. 3, Jul. 2003, pp. 569-577.
Casas, et al., "4D Model Flow: Precomputed Appearance Alignment for Real-Time 4D Video Interpolation", In Proceedings of 23rd Pacific Conference on Computer Graphics and Applications, vol. 34, No. 7, Oct. 7, 2015, 10 pages.
Casas, et al., "4D Parametric Motion Graphs for Interactive Animation", In Proceedings of the ACM SIGGRAPH Symposium on Interactive 3D Graphics and Games, Mar. 9, 2012, pp. 103-110.
Casas, et al., "4D Video Textures for Interactive Character Appearance", In Journal of Computer Graphics Forum, vol. 33, Iss. 2, May 2014, 10 pages.
Casas, et al., "Surface-based Character Animation", retrieved on: May 17, 2016, available at: <<http://dancasas.github.io/docs/casas_RWVC2015.pdf>>, 13 pages.
Chao, et al., "A Simple Geometric Model for Elastic Deformations", In Journal of ACM Transactions on Graphics, vol. 29, Iss. 4, Jul. 2010, 6 pages.

Chuang, et al., "Estimating the Laplace-Beltrami operator by restricting 3D functions", In Proceedings of the Symposium on Geometry Processing, vol. 28, No. 5, Jul. 15, 2009, 10 pages.
Collet, et al., "High-Quality Streamable Free-Viewpoint Video", In Journal of ACM Transactions on Graphics, vol. 34, Iss. 4, Aug. 2015, 13 pages.
"CVSSP3D Publications and Datasets", retrieved on May 24, 2016, available at: <<http://cvssp.org/data/cvssp3d/>>, 4 pages.
de Goes, et al., "Vector Field Processing on Triangle Meshes", In Proceedings of 8th ACM SIGGRAPH Conference and Exhibition on Computer Graphics and Interactive Techniques, Nov. 2, 2015, 48 pages.
Dziuk, "Finite elements for the Beltrami operator on arbitrary surfaces", In Publication of Springer, May 24, 2016, 15 pages.
Eisemann, et al., "Floating Textures", In Journal of Computer Graphics Forum, vol. 27, No. 2, Apr. 2008, 10 pages.
Funkhouser, et al., "Modeling by Example", In Journal of ACM Transactions on Graphics, vol. 23, Iss. 3, Aug. 2004, pp. 652-663.
Heck, et al., "Parametric Motion Graphs", In Proceedings of the symposium on Interactive 3D graphics and games, Apr. 30, 2007, pp. 1-8.
Horn, et al., "Closed Form Solutions of Absolute Orientation using Orthonormal Matrices", In Journal of the Optical Society of America A, vol. 5, No. 7, Jul. 1988, pp. 1127-1135.
Huang, et al., "Global temporal registration of multiple non-rigid surface sequences", In Proceedings of IEEE Conference on Computer Vision and Pattern Recognition, Jun. 20, 2011, 8 pages.
Huang, et al., "Human Motion Synthesis from 3D Video", In Proceedings of IEEE Conference on Computer Vision and Pattern Recognition, Jun. 20, 2009, 8 pages.
Huang, et al., "Human Shape and Pose Tracking Using Keyframes", In Proceedings of IEEE Conference on Computer Vision and Pattern Recognition, Jun. 23, 2014, 8 pages.
Huang, et al., "Hybrid Skeletal-Surface Motion Graphs for Character Animation from 4D Performance Capture", In Journal of ACM Transactions on Graphics, vol. 34, Iss. 2, Feb. 2015, 14 pages.
Huang, et al., "Shape Similarity for 3D video Sequences of People", In International Journal of Computer Vision, vol. 89, Isss 2-3, Sep. 2010, 20 pages.
Jacobson, "libgl—A simple C++ geometry processing library", retrieved on May 24, 2016, available at: <<http://libigl.github.io/libigl/>>, 4 pages.
James, et al., "Mesh Ensemble Motion Graphs: Data-driven Mesh Animation with Constraints", In Proceedings of ACM Transactions on Graphics, vol. 26, No. 4, Oct. 2007, 16 pages.
Kanade, et al., "Virtualized reality: Constructing virtual worlds from real scenes", In Journal of IEEE MultiMedia, vol. 4, Iss. 1, Jan. 1997, pp. 34-47.
Kazhdan, et al., "Rotation invariant spherical harmonic representation of 3D shape descriptors", In Proceedings of Eurographics/ACM SIGGRAPH symposium on Geometry processing, Jun. 23, 2003, 9 pages.
Kazhdan et al., "Shape Matching and Anisotropy", ACM Transactions on Graphics, vol. 23, No. 3, Aug. 2004, 7 pages.
Kovar, et al., "Motion graphs", In Journal ACM Transactions on Graphics, vol. 21, Iss. 3, Jul. 2002, pp. 473-482.
Lategahn, et al., "Motion-without-Structure: Real-time Multipose Optimization for Accurate Visual Odometry", In Proceedings of IEEE Intelligent Vehicles Symposium, Jun. 3, 2012, 6 pages.
Lee et al., "Interactive control of avatars animated with human motion data", In Journal ACM Transactions on Graphics, vol. 21, Iss. 3, Jul. 2002, pp. 491-500.
Leon, et al., "A PDE model for computing the optical flow", In Proceedings of XVI Congreso de Ecuaciones Diferenciales y Aplicaciones, Sep. 1999, 8 pages.
Levin et al., "Markov Chains and Mixing Times", In Publication of American Mathematical Society, May 24, 2016, 387 pages.
Li, et al., "Robust single-view geometry and motion reconstruction", In Journal ACM Transactions on Graphics, vol. 28, Iss. 5, Dec. 2009, 10 pages.
Liao et al., "Automating Image Morphing using Structural Similarity on a Halfway Domain", ACM Transactions on Graphics, vol. 33, Iss. 5, Sep. 2014, 12 pages.

(56) References Cited

OTHER PUBLICATIONS

Lucas, et al., "An iterative image registration technique with an application to stereo vision", In Proceedings of the 7th international joint conference on Artificial intelligence, Aug. 24, 1981, pp. 674-679.

Ovsjanikov, et al., "Functional maps: A flexible representation of maps between shapes", In Journal ACM Transactions on Graphics, vol. 31 Iss. 4, Jul. 2012, 11 pages.

Pinkall, et al., "Computing Discrete Minimal Surfaces and Their Conjugates", In Journal Experimental Mathematics, vol. 2, Iss. 1, Jan. 1993, pp. 15-36.

Potts et al., "A Fast Algorithm for Nonequispaced Fourier Transforms on the Rotation Group", Numerical Algorithms, vol. 52, No. 3, Nov. 2009, pp. 355-384.

Prada, et al., "Unconditionally Stable Shock Filters for Image and Geometry Processing", In Journal Computer Graphics Forum, vol. 34, Iss. 5, Aug. 2015, 10 pages.

Rusinkiewicz, "Trimesh 2", retrieved on May 24, 2016, available at: <<http://gfx.cs.princeton.edu/proj/trimesh2/>>, 4 pages.

Shi, et al., "Good features to track", In IEEE Conference on Computer Vision and Pattern Recognition, Jun. 1994, 8 pages.

Shilane, et al., "The Princeton Shape Benchmark", In Proceedings of the Shape Modeling International, Jun. 7, 2004, 12 pages.

Si, "TetGen, a Delaunay-Based Quality Tetrahedral Mesh Generator ", In Journal ACM Transactions on Mathematical Software, vol. 41, Iss. 2, Jan. 2012, 36 pages.

Sorkine, et al., "As-rigid-as-possible surface modeling", In Proceedings of the fifth Eurographics symposium on Geometry processing, Jul. 2007, 8 pages.

Starck, et al., "Video-based character animation", In Proceedings of ACM SIGGRAPH/Eurographics symposium on Computer animation, Jul. 29, 2005, pp. 49-58.

Tangelder, et al., "A survey of content based 3D shape retrieval methods", In Journal Multimed Tools Applications, vol. 39, Dec. 8, 2007, pp. 441-471.

Tejera, et al., "Animation Control of Surface Motion Capture", In Journal of IEEE Transactions on Cybernetics, vol. 43, No. 6, Dec. 2013, 14 pages.

Tomasi, et al., "Detection and Tracking of Point Features", In Technical Report CMU-CS-91-132, Apr. 1991, 22 pages.

Casas, et al., "Interactive Animation of 4D Performance Capture", In IEEE Transactions on Visualization and Computer Graphics, vol. 19, Issue 5, May 2013, pp. 762-773.

Magnenat-Thalmann et al., "Real-Time Individualized Virtual Humans", In Proceedings of ACM Special Interest Group on Computer GRAPHics and Interactive Techniques (SIGGRAPH) ASIA Courses, Article 17, Dec. 10, 2008, 64 Pages.

"International Search Report and Written Opinion Issued in PCT Application No. PCT/US2017/040572", dated Oct. 16, 2017, 22 Pages.

Tekalp, et al., "Two-Dimensional Mesh-Based Visual-Object Representation for Interactive Synthetic/Natural Digital Video", In Proceedings of IEEE, vol. 86, Issue 6, Jun. 1998, pp. 1029-1051.

Varanasi, Kiran, "Modélisation Spatio-Temporelle des scènes Dynamiques 3D à partir des données Visuelles", In Doctoral Dissertation, University of Grenoble, Dec. 2, 2010, 154 Pages.

Tycowicz, et al., "Real-Time Nonlinear Shape Interpolation", In Journal ACM Transactions on Graphics, vol. 34, Iss. 3, Apr. 2015, 10 pages.

Vlasic, et al., "Dynamic shape capture using multi-view photometric stereo", In ACM Transactions on Graphics, vol. 28, Iss. 5, Dec. 2009, 12 pages.

Volino, et al., "Online interactive 4D character animation", In Proceedings of the 20th International Conference on 3D Web Technology, Jun. 18, 2015, pp. 289-295.

Zhao, et al., "Achieving good connectivity in motion graphs", In Journal of Graphical Models, vol. 71, Iss. 4, Jul. 2009, 14 pages.

Zitnick, et al., "High-quality video view interpolation using a layered representation", In Journal ACM Transactions on Graphics, vol. 23, Iss. 3, Aug. 2004, pp. 600-608.

Zollhofer, et al., "Real-time non-rigid reconstruction using an RGB-D camera", In Journal ACM Transactions on Graphics, vol. 33, Iss. 4, Jul. 2014, 10 pages.

* cited by examiner

700

702 — DETERMINE FIRST AND SECOND SUBSETS OF MESH SEQUENCE BASED AT LEAST IN PART ON PREDETERMINED SIMILARITY CRITERION

704 — DETERMINE REFERENCE MESH OF FIRST AND SECOND SUBSETS

706 — DETERMINE MODIFIED FIRST MESHES BASED AT LEAST IN PART ON RESPECTIVE FIRST-SUBSET MESHES AND REFERENCE MESH

708 — DETERMINE MODIFIED SECOND MESHES BASED AT LEAST IN PART ON RESPECTIVE SECOND-SUBSET MESHES AND REFERENCE MESH

710 — DETERMINE SYNTHETIC MESHES BASED AT LEAST IN PART ON RESPECTIVE MODIFIED FIRST MESHES AND RESPECTIVE MODIFIED SECOND MESHES

FIG. 7

MOTION CAPTURE AND CHARACTER SYNTHESIS

BACKGROUND

Viewers of computer-generated videos increasingly expect high-quality, lifelike depictions in those videos. To achieve realistic motion, some schemes use motion-capture systems to collect data of people performing desired motions (e.g., walking or dancing). Characters of a video are then animated to follow the motion-capture data. A frame of motion-captured data can be represented as a mesh of polygons approximating the surface of the person whose motions are being captured. An example is a polygon mesh that approximately surrounds the aggregate volume occupied by a ballerina and her tutu at one moment during a ballet dance.

However, relying on motion-capture data limits the videos to motions that can be physically performed by humans. Some techniques use motion-capture data in an attempt to synthesize motions not actually recorded. However, these techniques are often very limited in the types of character models they can process.

SUMMARY

This disclosure describes systems, methods, and computer-readable media for synthesizing processor-generated characters, e.g., for use in rendering computer-generated videos. Some example techniques described herein can permit synthesizing motions that appear natural or that do not distort the shapes of characters. Some example techniques described herein can permit synthesizing motions based on multiple meshes, even if those meshes differ in connectivity.

In some examples, a computing device can determine a rigid transformation based on a first source mesh of a source mesh sequence and a first target mesh of a target mesh sequence. The computing device can determine respective interpolation weights associated with individual source meshes of the source mesh sequence based on respective indices of the individual source meshes in the source mesh sequence. The computing device can determine respective synthetic meshes based at least in part on the individual source meshes, the respective reference meshes, and the respective interpolation weights. The computing device can then place the respective synthetic meshes based at least in part on the rigid transformation to define a processor-generated character.

According to example techniques described herein, a computing device can determine a first subset of a mesh sequence and a second subset of a mesh sequence based at least in part on a selected similarity criterion. The first subset can include first meshes of the mesh sequence and the second subset can include second meshes of the mesh sequence. The computing device can determine a reference mesh of the first meshes and the second meshes. The computing device can determine modified first meshes having a connectivity corresponding to the reference mesh based at least in part on the respective first meshes and the reference mesh. The computing device can determine modified second meshes having a connectivity corresponding to the reference mesh based at least in part on the respective second meshes and the reference mesh. The computing device can then determine synthetic meshes based at least in part on the respective modified first meshes and the respective modified second meshes.

According to still further example techniques described herein, a computing device can determine a synthetic mesh based at least in part on a source mesh of a source mesh sequence, a target mesh of a target mesh sequence, and a predetermined rigidity evaluation metric. The computing device can project a source texture onto the synthetic mesh to provide a projected source texture. The computing device can project a target texture onto the synthetic mesh to provide a projected target texture. The computing device can then determine a synthetic texture registered to the synthetic mesh based at least in part on the projected source texture and the projected target texture.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to systems, methods, computer-readable instructions, modules, algorithms, hardware logic, or operations as permitted by the context described above and throughout the document.

BRIEF DESCRIPTION OF THE DRAWINGS

The same numbers are used throughout the drawings to reference like features and components. The drawings are not necessarily to scale.

FIG. 7 is a flow diagram that illustrates an example process for synthesizing meshes.

DETAILED DESCRIPTION

Overview

Figure 1:
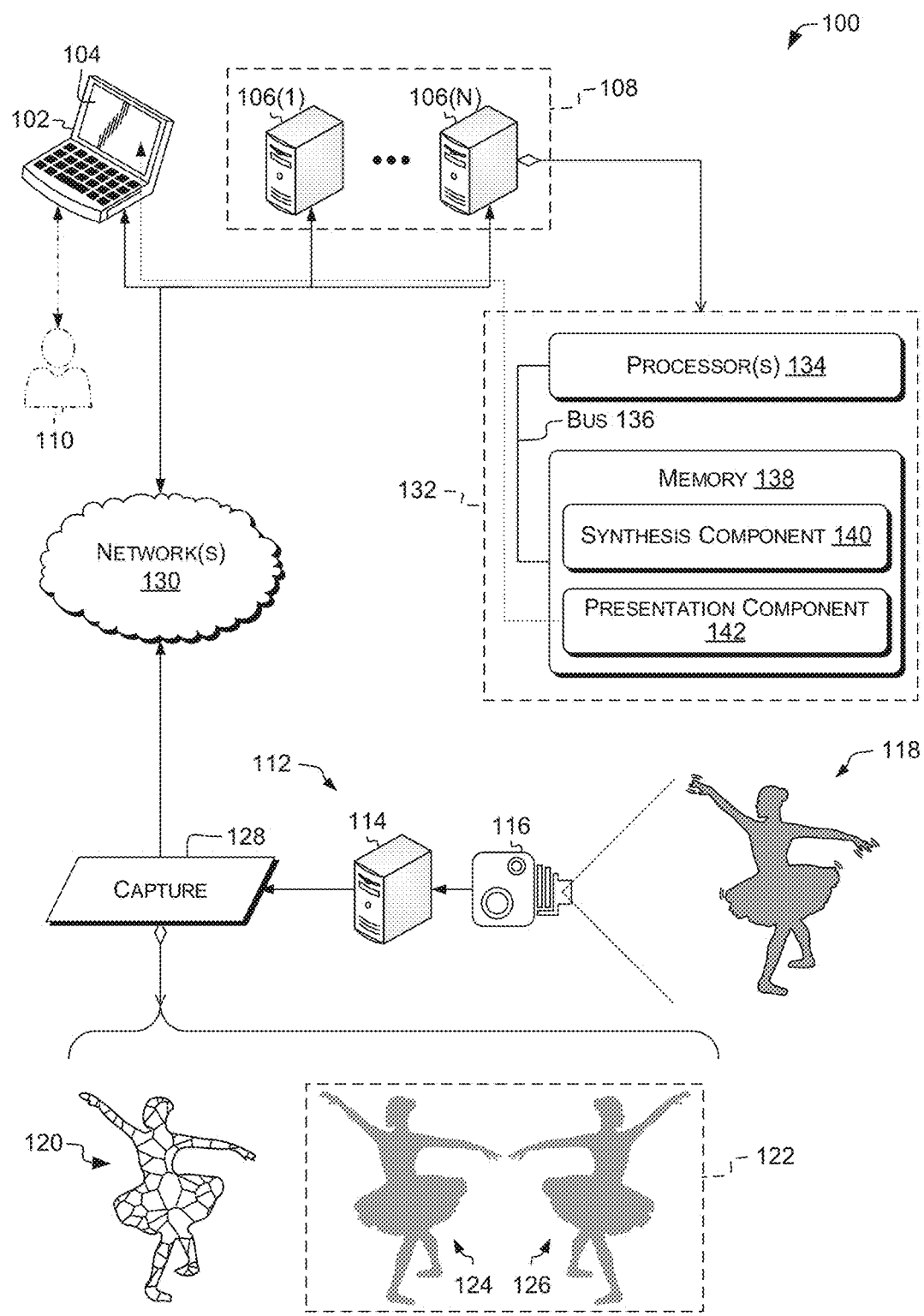
FIG. 1 is a block diagram depicting an example environment for implementing character synthesis as described herein.

In some examples of motion-capture techniques, an "actor," e.g., a person, animal, plant, or mobile inanimate object (e.g., a robot), carries out a "performance," e.g., a sequence of motions undertaken in a motion-capture environment. A motion-capture system provides data of a mesh representing the actor, e.g., a mesh of triangles, planar quadrilaterals ("quads"), or other planar polygons ("polys"). Some motion-capture systems can also provide data of a texture representing the appearance of the actor during the performance. A mesh includes data indicating the positions of multiple vertices in a virtual space and data indicating connections ("edges") between the vertices. A texture can include image data associated with specific vertices of the mesh.

To produce smooth, life-like motions of computer-animated characters ("characters" herein, for brevity) in a computer-animated video (a "production"), a mesh can be rendered with corresponding texture data to produce a character that simulates the appearance of the actor. In some examples, respective meshes (or meshes and textures) can be captured for multiple frames of a performance, and those meshes (and textures) can be rendered in respective frames of a production to produce a simulation of the actor's motions during the performance. As used herein, a production can be any video including a computer-animated character, even if portions of the video are constructed from models, captured live, or otherwise produced using at least some techniques other than computer-graphics rendering techniques.

However, restricting characters to follow exactly the captured performances significantly reduces the range of uses for characters. Therefore, some prior schemes attempt to interpolate between motion-captured meshes to provide synthetic meshes not part of the motion-capture data. These synthetic meshes can represent, for example, non-captured transitions between captured motion types. For example, given a performance including walking, running, and jumping, in that order, interpolation could be used to determine synthetic frames connecting walking to jumping. However, some prior schemes require that the captured meshes on which a particular synthetic mesh is based have the same connectivity patterns between vertices, and differ only in vertex positions. These schemes are unable to produce synthetic meshes, e.g., in situations in which the shape of a mesh changes, e.g., when an actor's clothing changes shape due to the actor's motions, or when an actor grips or releases an object. Applying some prior schemes to meshes differing in connectivity would require extensive pre-processing of the input meshes, with corresponding requirements for processor time and storage space.

Moreover, to increase the utility of synthesized characters, it is desirable to be able to render the character from any viewpoint. However, some prior schemes warp captured textures based in a specific viewpoint. Therefore, these schemes require rendering the texture from each desired viewpoint. Furthermore, some schemes using textures exhibit blurring or ghosting when synthesizing textures for rendering synthetic meshes.

Accordingly, some example techniques described herein provide techniques and constructs to determine synthetic meshes. Some example techniques can determine realistic synthetic meshes even based on meshes that differ in connectivity. Some example techniques do not require preprocessing an entire captured performance before synthesizing transitions, which can reduce the amount of processing time and storage space required for producing the synthetic meshes. Some example techniques can determine synthetic textures registered to a synthetic mesh, which can permit rendering a character from any viewpoint without re-computing the synthetic texture for each viewpoint. This can reduce the time required to determine and render each frame, e.g., permitting higher frame rates in productions compared to prior schemes. Some example techniques can determine synthetic textures exhibiting reduced ghosting and improved image quality compared to prior schemes.

In some examples, a motion graph can be determined including the captured frames and synthetic frames. Some examples can determine a stochastic, continuous path through the motion graph (a "synthetic path") in order to provide a production giving the appearance of continuous motion of a character without repetition. These and other techniques described herein can permit providing productions including characters exhibiting natural motions, e.g., for educational or other uses.

Some example scenarios and example techniques for mesh, texture, or path synthesis are presented in greater detail in the following description of the figures. Various examples are presented with reference to non-real-time processing of previously-captured motion data. However, these examples are not limiting. In some examples, processing can be performed in real-time, or processing can be performed in real-time or near-real-time concurrently with the capture of frames of motion data. As used herein, the term "character synthesis" and similar terms refer to any of, or any combination of, mesh, texture, or path synthesis, as permitted by the context.

Various examples permit automatically synthesizing motion graphs with new smooth transitions between compatible poses and actions. Such motion graphs can enable natural periodic motions, stochastic playback, and user-directed animations. Various aspects can provide visually seamless transitions between synthetic meshes and captured meshes.

In some examples of meshes, edges can define where two mathematically continuous smooth surfaces meet or can connect vertices using straight lines or curves. A vertex can include a position along with other information such as color, normal vector and texture coordinates. A face is a closed set of edges, in which a triangle face has three edges, and a quad face has four edges. A polygon is a face having at least three edges. In systems covering objects with multi-sided faces, polygons and faces can be equivalent. However, polygons may additionally or alternatively be represented as multiple faces. For example, some polygons can be divided into multiple triangles. A polygonal mesh may be considered an unstructured grid, or undirected graph, with addition properties of geometry, shape, and topology.

Objects created with polygon meshes may store different types of elements. The elements may include vertices, edges, faces, polygons, and surfaces. Mesh models may also define other useful data. For example, groups may be defined with separate elements of the mesh for determining separate sub-objects for skeletal animation or separate characters for non-skeletal animation. While references are made to "meshes" or "mesh files" throughout this document, embodiments are not limited to a particular mesh format. Any multi-dimensional modeling formats may be used applying various examples herein.

As used herein, the terms "random" and "stochastic," and similar terms, can refer to draws or processes involving truly random numbers or pseudorandom numbers.

For brevity of illustration, in the diagrams herein, an arrow beginning with a diamond connects a first component or operation (at the diamond end) to at least one second component or operation that is or can be included in the first component or operation.

Illustrative Environment

FIG. 1 shows an example environment 100 in which examples of character-synthesis systems can operate or in which methods for synthesizing characters such as described below can be performed. In the illustrated example, various devices or components of environment 100 include at least one computing device 102, depicted without limitation as a laptop computing device. Computing device 102 can represent, e.g., any type of computing device that can communicate via a network, or any type of computing device that can render three-dimensional graphics, e.g., onto a two-dimensional image plane of a display 104, e.g., a conventional electronic display such as an organic light-emitting diode (OLED) display or liquid-crystal display (LCD).

In the illustrated example, environment 100 also includes computing device(s) 106 (1)-106 (N) (individually and/or collectively referred to herein with reference 106, and N≥1). Computing devices 106 can be computing nodes in a cluster computing system 108, e.g., a cloud service such as MICROSOFT AZURE, GOOGLE CLOUD PLATFORM, or another cluster computing system ("computing cluster" or "cluster") having several discrete computing nodes (device(s) 106) that work together to accomplish a computing task assigned to the cluster 108 as a whole. In some examples, computing device(s) 102 can be clients of cluster 108 and can submit jobs to cluster 108 and/or receive job results from cluster 108. Computing devices 106 (1)-106(N) in cluster 108 can, e.g., share resources, balance load, increase performance, and/or provide fail-over support and/or redundancy. Computing devices 102 can additionally or alternatively operate in a cluster and/or grouped configuration. In the illustrated example, computing devices 102 communicate with computing devices 106. Additionally or alternatively, computing devices 102 can communicate with cluster 108, e.g., with a load-balancing or job-coordination device of cluster 108, and cluster 108 or components thereof can route transmissions to individual computing devices 106.

Some cluster-based systems can have all or a portion of the cluster 108 deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

By way of example and not limitation, any of computing device(s) 102 and/or 106 can include, but are not limited to, a server computer and/or blade server such as a Web server, a map/reduce server and/or other computation engine, a network-attached-storage unit, a laptop, a personal digital assistant (PDA), a tablet computer such as a MICROSOFT SURFACE or APPLE IPAD, a smartphone such as a MICROSOFT LUMIA, a feature phone, a smart watch, a network-connectable biometric device such as a fitness tracker, a virtual-reality (VR) or augmented-reality (AR) display such as GOOGLE GLASS or other displays or computing systems, e.g., configured to be worn on the head, wrist, or another part of the body, a network-connectable sensor or actuator, a robot, an network-enabled television, a television set-top box (cable or otherwise, e.g., an APPLE TV), a game console, a portable gaming system, a desktop computer, or a server.

Different devices or types of devices can have different uses for synthetic characters or productions. For example, a laptop or desktop computing device 102 can be used as an interface for controlling a synthesis process, or for displaying a production including synthetic meshes. A smartphone or presentation-display computing device 102 can render productions, e.g., in real time, or present pre-rendered productions, e.g., to convey information to users.

In some examples, computing devices 102 and/or 106 interact with an entity 110. The entity 110 can include systems, devices, parties such as users, and/or other features with which computing devices 102 and/or 106 can interact. For brevity, examples of entity 110 are discussed herein with reference to users of a computing system; however, these examples are not limiting. In some examples, computing device 102 is operated by entity 110, e.g., a user. In some examples, computing devices 106 operate synthesis engines discussed herein to determine (e.g., generate or synthesize) productions or components thereof (e.g., meshes, textures, or paths), and transmit data of the productions (e.g., mesh data or rendered image data of frames of the production) to computing device 102, e.g., a smartphone. Computing device 102 can, e.g., present the production to entity 110.

Environment 100 also includes capture system 112, including a capture controller 114, which can be a computing device, and at least one capture device 116, e.g., a CMOS, CCD, depth, surface, volumetric, stereo, or other camera or other detector configured to detect shape or appearance of at least one actor during a performance 118. Performance 118 is illustrated as a ballet dance for clarity of explanation and without limitation. In some examples, capture controller 114 can operate capture device(s) 116 in synchronization to capture mesh and/or texture data for each of a plurality of frames. As used herein, the term "performance" does not require conscious planning of a sequence of motions. A performance can include pre-planned or improvised motions, e.g., of a dancer, or unconscious motions, e.g., of a SLINKY (stretchable helical spring) descending a staircase or of a physical system being tested in a controlled experiment.

Capture system 112 is configured to provide mesh data 120. Mesh data 120 can include vertices and edges, e.g., as described above, for a surface and/or volume of an actor captured during performance 118. Mesh data 120 is depicted as a random polygonal tessellation but is not restricted thereto. Mesh data 120 can include, e.g., triangles, quads, or other polys, in any combination. Mesh data 120 can include, e.g., at least one mesh per captured frame.

Capture system 112 can also be configured to provide texture data 122. Texture data 122 can represent the visual appearance of the actor during performance 118. For illustration and without limitation, texture data 122 is represented as including texture segments 124 and 126 of two different views of the actor. However, texture data 122 can include any number of components in a texture atlas, e.g., one texture component per substantially flat region of the actor, or texture components of approximately equal sizes. Texture data 122 can include, e.g., at least one texture per captured frame. Texture data 122 can include two-dimensional texture data, e.g., digital image(s), three-dimensional texture data, e.g., image slices, cubemaps, mipmapped textures, or other digital image data formats. Texture data 122 can include original camera images captured by an optical capture device 116. However, this is not required. Texture data 122 can include optical data, e.g., image content, projected onto a mesh. Texture data 122 can omit pre-texturing image content, in some examples. Some examples of texture data 122 are discussed below with reference to FIG. 15.

In the illustrated example, capture system 112 provides a capture 128 including a sequence of frames. Frames of the capture 128 include respective mesh data 120 and/or respective texture data 122. Capture 128 can be processed as described herein, e.g., with reference to FIGS. 2-16, to provide at least one production including at least one synthetic character, e.g., at least one character including at least one of a synthetic mesh or a synthetic texture.

In some examples, computing devices 102, 106, and/or 114 can communicate with each other and/or with other computing devices via one or more network(s) 130, e.g., the Internet. In some examples, network(s) 130 can be or include a cable television network, radio frequency (RF), microwave, satellite, or data network, such as the Internet, and can each support wired or wireless media using any format or protocol, such as broadcast, unicast, or multicast. Additionally, network(s) 130 can be any type of network, wired or wireless, using any type of network topology and any network communication protocol, and can be represented or otherwise implemented as a combination of two or more networks.

Details of an example computing device 106(N) are illustrated at inset 132. The details of example computing device 106(N) can be representative of others of computing device(s) 102 or 106, or capture controller 114. However, each of the computing device(s) 102 or 106, or capture controller 114, can include additional or alternative hardware and/or software components. Computing device 106 (N) includes at least one processor 134 connected, e.g., via system bus 136, with at least one memory 138 (e.g., computer-readable medium, CRM). Memory 138 can be configured to store, e.g., a synthesis component 140 and/or a presentation component 142 executable on the processor 134. The components 140 and/or 142 can include, e.g., modules stored on computer-readable media such as computer storage media (discussed below) and having thereon computer-executable instructions. In the illustrated example environment 100, component 140 and/or 142 can be a component of an operating system (not shown) or otherwise stored or executed locally on computing device 102. Memory 138, in some examples, can store instructions, e.g., in component 140 and/or 142. The instructions, when executed by the at least one processor 134, can cause the at least one processor 134 to perform operations such as the operations described below with reference to FIGS. 2-16.

In some examples, capture system 112 provides mesh data 120 and/or texture data 122 associated with at least one frame to cluster 108 or at least one computing device 106. The cluster 108 or computing device 106 then determines synthetic character data including at least one synthetic mesh or at least one synthetic texture of a character. The cluster 108 or computing device 106 provides the synthetic character data to computing device 102, which presents a production including the synthetic character data on an electronic display. In some examples, any subset, or all, of computing device 102, computing device(s) 106, and/or capture controller 114 can be combined into a single device performing the functions of multiple illustrated components. For example, computing device 102 can be integrated with capture controller 114 to permit evaluating synthetic characters during a motion-capture session. In some examples, as indicated by the dotted arrow, presentation component 142 can render a production for presentation on display 104. In some examples, presentation component 142 can execute on computing device 102 to render the production on display 104.

Various examples herein operate on an input $\mathcal{P} = \{(\mathcal{P}_0, I_0), \ldots, (F_{n-1}, I_{n-1})\}$ including a sequence of textured meshes $F_i$ for respective frames i, where each mesh $F_i = (K_i, V_i)$ with connectivity $K_i$ and vertex positions $V_i$. Each $I_i$ is a texture associated with frame i and mesh $F_i$. For brevity, references to "frame $F_i$" refer to mesh $F_i$ unless otherwise indicated by the context. A motion graph $\mathcal{G} = (\mathcal{P}, \varepsilon)$ is a directed graph in which each node corresponds to a frame and each edge $e \in \varepsilon \subseteq \mathcal{P} \times \mathcal{P}$ represents the possible transition from one frame to another. Thus, for a captured sequence, the motion graph is a single-path graph as there is an edge between each pair of two consecutive frames. Note that the first frame $F_0$ has no incoming edge, and the last frame $F_{n-1}$ has no outgoing edge. In some examples, a captured graph is acyclic, so does not include any repeating motion. In some examples, each node of a captured graph has only one outgoing edge, so the graph defines only a single path.

Various examples augment the motion graph with a new set of synthetic transitions, e.g., including synthetic frames or sequences thereof. Various examples successively identify a pair of similar frames using a distance function D, e.g., to find a source frame $F_s$ and a target frame $F_t$, such that D $(F_s, F_{t-1}) < \in$ and $D(F_{s+1}, F_t) < \in$ for some error threshold $\in$, and augment the motion graph with a new edge $(F_s, F_t)$. However, as the corresponding frames may come from different animation sequences, this new transition can easily result in a visible discontinuity during playback.

Accordingly, various examples find loosely matching windows $W_s = \{F_{s-k}, \ldots, F_{s+k}\}$ and $W_t = \{F_{t-k}, \ldots, F_{t+k}\}$ and then deform the windows by synthesizing new transition frames between $F_{s-k}$ and $F_{t+k}$. The transition window $W_{s \to t}$ includes a short fixed-size sequence of synthetic frames (meshes, or meshes and textures):

$$W_{s \to t} = (F_{-k}^{st}, F_{-k+1}^{st}, \ldots, F_{k-1}^{st}, F_k^{st}) \quad (1)$$

where $\{F_i^{st}\}$ are synthetic meshes for the synthetic frames. In some examples, $F_{-k}^{st} \approx F_{s-k}$, and $F_k^{st} \approx F_{t+k}$ (with equivalence up to tessellation). The sequence $W_{s \to t}$ is a subgraph, and is merged with the motion graph in some examples.

After adding a set of transitions $\{W_1, \ldots, W_l\}$, the new motion graph contains the nodes $\mathcal{F} \cup \{F^{W_1}\} \cup \ldots \cup \{F^{W_l}\}$, e.g., the union of the original graph edges and some or all new transition paths. Examples of motion graphs including transition paths or other transition sequences are discussed below with reference to FIGS. 3 and 4. A processing unit can determine an annotated motion graph, e.g., a Markov chain graph, from this graph by assigning transition probabilities to each node. In some examples, transition probabilities are determined so that a random walk visits all nodes with approximately equal probability. As used herein, the term "visit probabilities" refers to the probability that a node will be visited on a random walk through a graph having given transition probabilities. Visit probabilities can be determined, e.g., by simulating a random walk through the graph over a large number of cycles, until the visit probability of a node changes by less than a threshold amount each time the node is visited. In some examples, for recurrent graphs, visit probabilities can be determined by computing the left eigenvector of the transition matrix with eigenvalue one.

As used herein, matrices are represented by bold, upper-case Roman characters (e.g. $M \in \mathbb{R}^{M \times N}$) and vectors by lower-case Roman characters (e.g. $v \in \mathbb{R}^N$). The coefficients of matrices and vectors are represented with lower-case Roman characters (e.g. $m_{ij} \in \mathbb{R}$ and $v_i \in \mathbb{R}$).

Given $v \in \mathbb{R}^{dN}$, $v$ can be an N-dimensional vector whose coefficients are themselves d-dimensional column vectors. Similarly, given $M \in \mathbb{R}^{dN \times N}$, M can be an N×N-dimensional matrix whose coefficients are d-dimensional column vectors. The term $\text{diag}_d(v)$ denotes the N×N diagonal matrix whose diagonal entries are the d-dimensional coefficients of $v$.

Given matrices $M_1$ and $M_2$, $M_1 \oplus M_2$ denotes the matrix with $M_1$ and $M_2$ along the diagonal:

$$M_1 \oplus M_2 = \begin{pmatrix} M_1 & 0 \\ 0 & M_2 \end{pmatrix} \quad (2)$$

Given a matrix M and integer k, $M^{\oplus k}$ denotes the block diagonal matrix with k blocks, $M^{\oplus k} = M \oplus \ldots \oplus M$.

Given matrices $M_1$ and $M_2$ with the same number of rows, $M_1 | M_2$ denotes the (horizontal) concatenation:

$$M_1 | M_2 = (M_1 M_2) \quad (3)$$

A triangle mesh $\mathcal{M}$ has vertices $\mathcal{V}$ and triangles $\mathcal{T}$ (or other polys $\mathcal{T}$).

Discrete functions are represented using the hat basis as elements of $\mathbb{R}^{|\mathcal{V}|}$ and vector fields are represented using the conforming basis of gradients and rotated gradients as elements of $\mathbb{R}^{2|v|}$.

The (lumped) mass and stiffness matrices are denoted $M \in \mathbb{R}^{|\mathcal{V}| \times |\mathcal{V}|}$ and $S \in \mathbb{R}^{|v| \times |v|}$, respectively. The former is the diagonal matrix with one third of the area of a vertex's one-ring on the diagonal, and the latter is the ubiquitous cotangent Laplacian. Matrix H denotes the Hodge-Laplacian for vector fields, $H = (S \cdot M^{-1} \cdot S)^{\oplus 2}$.

Given an orthonormal tangent frame at each triangle, $J \in \mathbb{R}^{2|\mathcal{T}| \times 2|\mathcal{T}|}$ denotes an operator that rotates each triangle's tangent vector by 90°; $G \in \mathbb{R}^{|\mathcal{V}| \times 2|\mathcal{T}|}$ denotes an operator that returns the gradient of the scalar function, and $B \in \mathbb{R}$ denotes a matrix that takes a vector field expressed in terms of the conforming basis and returns the coefficients with respect to the per-triangle tangent frame, $B = G | J \circ G$.

Illustrative Processing

Figure 2:
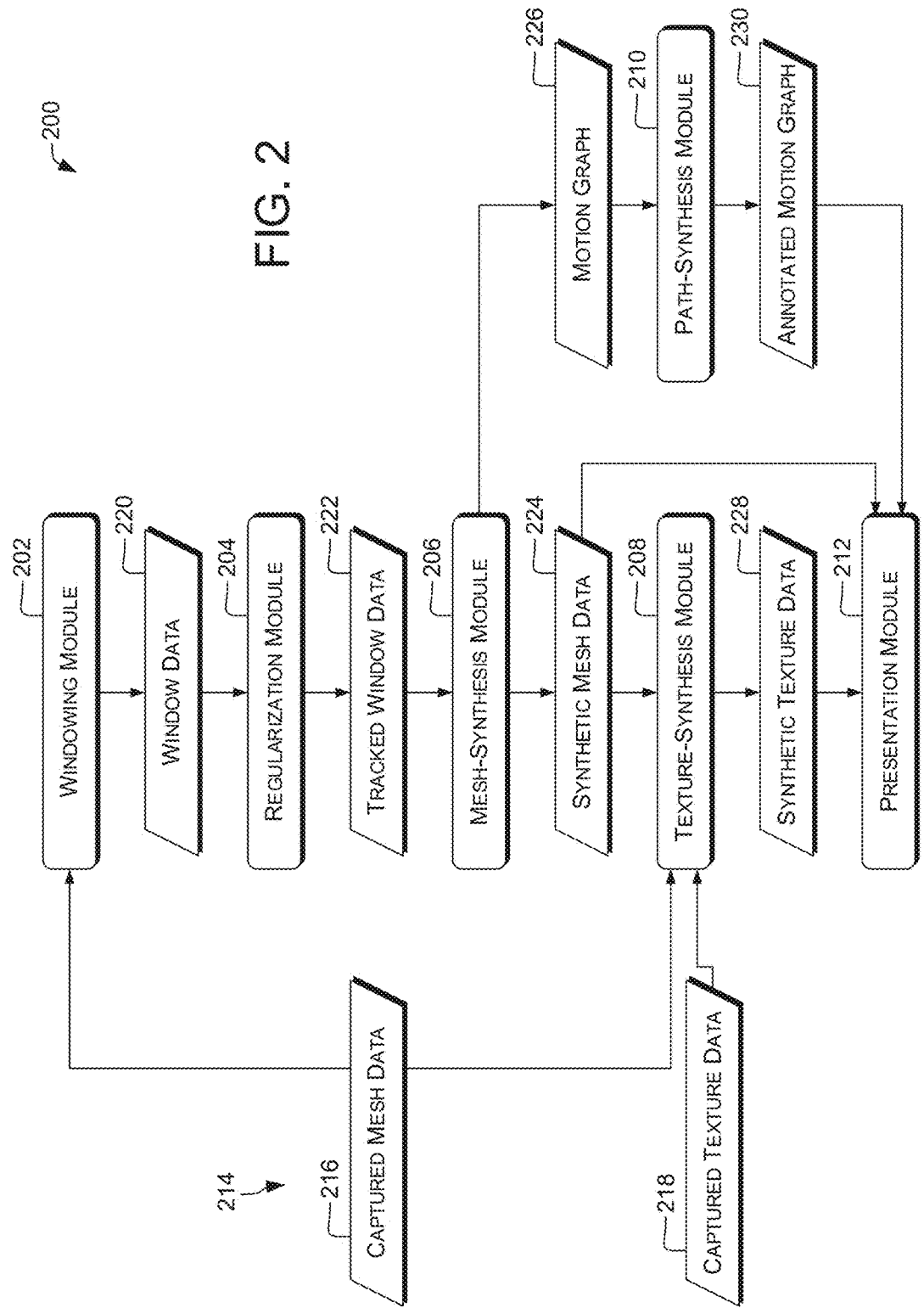
FIG. 2 is a dataflow diagram depicting example module interactions during character synthesis.

FIG. 2 is a dataflow diagram 200 illustrating example interactions between components illustrated in FIG. 1, and showing example modules of synthesis component 140 and/or presentation component 142. The modules of the synthesis component 140, e.g., stored in memory 138, can include one or more modules, e.g., shell modules, or application programming interface (API) modules, which are illustrated as a windowing module 202, a regularization module 204, a mesh-synthesis module 206, a texture-synthesis module 208, and a path-synthesis module 210. The modules of the presentation component 142 can include one or more modules, which are illustrated as a presentation module 212. The specific components shown are illustrative and not limiting. In some examples, a subset of the illustrated modules can be used, or additional modules not shown can be used with at least one of the illustrated modules. Throughout the discussion below of FIG. 2, listed functions of "a processing unit" can be performed by at least one processor 134 executing computer program instructions of the module being discussed. Separate references to "a processing unit" can refer to one and the same processing unit, or different processing units, or any combination thereof. The illustrated modules can operate on a capture 214, which can represent capture 128. Capture 214 can include captured mesh data 216, which can represent mesh data 120, and/or captured texture data 218, which can represent texture data 122. In some examples, capture 214 can omit captured texture data 218. In some examples, capture 214 can include synthetic or representative texture data instead of captured texture data 218.

In some examples, windowing module 202 can identify candidate pairs of similar frames $F_s$, $F_t$. Regularization module 204 can choose and fit a single template to the meshes in the source and target windows. Mesh-synthesis module 206 and texture-synthesis module 208 can interpolate between the source and target to obtain the new synthesized window $W_{s \to t}$. For example, given two similar windows centered about frames $F_s$ and $F_t$ in the input sequence, mesh-synthesis module 206 and texture-synthesis module 208 can construct two new mesh sequences $W_{s \to t}$ and $W_{t \to s}$ which provide smooth transitions between opposite endpoints of the two windows, e.g., as discussed herein with reference to FIG. 3. Path-synthesis module 210 can determine transition probabilities of motion-graph edges so that the steady-state frequency of visiting nodes during a random walk is close to uniform or another desired distribution.

In some examples, windowing module 202 is configured to determine window data 220. Window data 220 can include one or more records. Each record of window data 220 can include or identify a source mesh, a target mesh, at least one source-window mesh, and at least one destination-window mesh, all selected from captured mesh data 216. In some examples, each record of window data 220 can include or identify a source mesh associated with frame s, a target mesh associated with frame t, source-window meshes associated with frames s−k ... s+k, and target-window meshes associated with frames t−k ... t+k, for a predetermined constant k. An example of such a set of windows is discussed below with reference to FIG. 3. In some examples, k=10 or k=20.

To identify potential transitions, a processing unit can search for pairs of frames $F_s$ and $F_t$ in captured mesh data 216 with the property that the window around $F_s$ (the set of source-window meshes) is similar to the window around $F_t$ (the set of target-window meshes). The use of a window also helps provide source and target surfaces having similar velocities.

In some examples, source and target frames can be determined using measures of shape similarity, e.g., using shape descriptors designed for efficient retrieval. In some examples the shape matching is performed offline, but this not limiting. In particular, a processing unit can exhaustively (or otherwise) search a space of shape rotations to determine similarity between shapes even if those shapes are rotated with respect to each other. The processing unit can determine a dissimilarity score between two pairs of models by first translating each model so that its center of mass is aligned with the origin, and then searching over rotations about the origin, e.g., all such rotations, for a rotation that mathematically minimizes the sum-of-squared distances between the shapes.

In some examples, a processing unit can use a Fourier-transform-based shape descriptor in determining similarity. In some non-limiting examples, windowing module 202 can process shapes, e.g., captures of human actors, having a consistent up vector (e.g., enforced by gravity). In these examples, windowing module 202 can assume the up vector is constant and test for similarity over a space of 2-D rotations. Shape descriptors in such examples can be invariant to translation in an XY ground plane and rotation around a vertical Z axis. In other examples, windowing module 202 can assume the up vector is not constant and test for similarity over a space of three-dimensional (3-D) rotations. Fourier-based descriptors can be readily computed, can be efficient to match using, e.g., the Fast Fourier Transform (FFT), and can retrieve models with high precision. In other examples, volumetric shape histograms or spherical harmonic descriptors can be used. In some examples, a Euclidean Distance Transform (EDT) can be used in determining shape similarity.

Letting $\chi_s$ and $\chi_t$ be the indicator functions of the two surfaces and letting $EDT_s^2$ and $EDT_t^2$ be the (squared) Euclidean Distance Transforms, this distance can be expressed as:

$$D_{st}(R) = \langle EDT_s^2, R(\chi_t) \rangle + \langle \chi_s, R(EDT_t^2) \rangle \qquad (4)$$

with $R(\Phi)$ the rotation of $\Phi$ (e.g., $R(\Phi)(p) = \Phi(R(p))$). The space of possible rotations can be exhaustively searched, sampled, or searched using other techniques in order to find a rotation that provides the mathematically minimum (locally or globally) dissimilarity score of the space searched.

In the example of Eq. (4), the shape descriptor can include Fourier transforms (e.g., FFTs) of characteristic functions and a distance field. FFTs can be computed of two signals: (1) a characteristic function of 3-D position (e.g., indicator function $\chi$) having values, e.g., of unity inside the surface and zero outside the surface; and (2) a volumetric sample of an unsigned distance function (such as an EDT) of the surface. The characteristic function and the distance function can be of sampled volumetrically, e.g., at voxels or at concentric circles in a slice parallel to, e.g., the XY or XZ planes (e.g., cylindrical shells).

In the example of Eq. (4), the dissimilarity measure $D_{st}$ is lower when there is reduced correlation between the indicator function of one surface and the distance function of the other, and vice versa. Some examples include integrating the distances between two surfaces over a space of rotations, e.g., all horizontal rotations. This is because, for two identical objects, the distances between the surfaces are 0, so the integral is minimal.

In some examples, comparing local windows rather than comparing individual frames of the captured mesh data 216 permits matching the motions or other actions before or after frames $F_s$ and $F_t$, not merely the shapes of the meshes in those frames. In some examples, searching for frames that are similar up to a rotation about the (vertical) z-axis permits more accurately detecting similarities in the presence of actions defined in relation to a ground plane, e.g., walking, dancing, or other human motions under substantially Earth-normal gravity.

Solving Eq. (4) can provide a windowed dissimilarity matrix D with entries:

$$d_{st} = \min_{R \in SO(2)} \sum_{i=-k}^{k} \omega(k) \cdot D_{s+k,t+k}(R) \qquad (5)$$

where the rotation R is taken from the group of rotations about the z-axis and $\omega: [-k, k] \to \mathbb{R}$ is a kernel, centered at zero, that gives more weight to the matching score of frames that are closer to $F_s$ and $F_t$ respectively. A processing unit can perform the matching efficiently using the Fast Fourier Transform, advantageously reducing the computational load of search compared with brute-force search techniques. For example, the FFT can be used to determine a vector representing the shape, and two FFTs can be combined using the dot product to provide a similarity score.

To perform shape matching, e.g., to compute the similarity matrix D, a processing unit can proceed in two steps, (1) per-frame computation and (2) comparing pairs of frames.

In a per-frame computation step, a processing unit can use ShapeSPH or similar geometry libraries to compute the discrete indicator and Euclidean Distance Transforms functions for each mesh being compared, e.g., represented as a grid of $$2N \times \frac{N}{2} \times N$$

samples in cylindrical coordinates, with indices corresponding to angle, radius, and height. A processing unit can then compute the one-dimensional (1-D) FFT across each row of angles to get a representation of frame $F_i$ by the complex Fourier coefficients of the indicator and Euclidean Distance Transform:

$$\hat{x}^i, \hat{E}^i \in \mathbb{C}^{2N \times N/2 \times N}. \qquad (6)$$

This computation can be performed for each of then frames and has complexity $O(n \cdot N^3 \log N)$.

In some examples, a processing unit can use ShapeSPH ShapeAlign or another algorithm or library configured to align pairs of triangle meshes, e.g., using Wigner-D functions. Using such algorithms, a processing unit can determine, e.g., a translation, isotropic or anisotropic scaling, or rotation useful for aligning two models. In some examples, a processing unit can sample the indicator function and Euclidian distance function of a mesh into concentric spheres, cylinders, or other shapes. The processing unit can, in some examples, use the Spherical Harmonic Transform and Wigner D-Transform, or other techniques, e.g., to perform an exhaustive search for the optimal alignment rotation.

In the second step of comparing pairs of frames, using the Fourier coefficients from Eq. (6), a processing unit can compute the similarity between frames s and t of the captured mesh data 216 by correlation, e.g., by multiplying the Fourier coefficients into the vector $\hat{c}^{st}$ as in Eq. (7). The multiplication by the radius m permits accounting for the circumference of the circle.

$$\hat{c}_i^{st} = \sum_{l=-k}^{k} \omega_k \cdot \sum_{m=1}^{N/2} m \cdot \sum_{n=1}^{N} \left( \hat{x}_{lmn}^{s+k} \cdot \overline{\hat{e}_{lmn}^{t+k}} + \hat{e}_{lmn}^{s+k} \cdot \overline{\hat{x}_{lmn}^{t+k}} \right), \qquad (7)$$

A processing unit can compute the inverse Fourier Transform to get the correlation values in the spatial domain, and then find the minimal correlation value:

$$d_{st} = \min_{i \in [0, 2N)} c_i^{st}. \quad (8)$$

The $d_{st}$ value from Eq. (8) can be used as the entry in the dissimilarity matrix D for source frame s and target frame t. Eq. (8) can be performed for each of the $n^2$ pairs of frames and thus can have complexity $O(n^2 \cdot N^3)$.

For computing distances, a processing unit can use various predetermined parameters, e.g., N=64 for the resolution of the voxel grid or setting co to be the fifth-order B-spline. In some examples of determining candidate transitions, a processing unit can discard transition (s, t) if at least one of the following example conditions, or similar conditions with different numerical limits, holds: (1) the frames are too close to each other: |s−t|<60; (2) the candidate transition is too close to an existing transition $(\tilde{s}, \tilde{t})$: |s−$\tilde{s}$|<20 and |t−$\tilde{t}$|<20; or (3) the dissimilarity is too large: $d_{st} > (3\Sigma_i d_{i,i+1})/(i-1)$.

Given the dissimilarity matrix from Eq. (4) (e.g., with entries from Eq. (8)), a processing unit can define a set of candidate transitions by iteratively choosing pairs of frames from the captured mesh data 216 that are associated with low dissimilarity scores (increasing the likelihood of success in synthesizing a transition) and are sufficiently far from previously chosen pairs (to avoid creating many transitions between the same pairs of actions). For example, pairs can be selected as candidate pairs in increasing order of distance score, or stochastically among the set of pairs having distance scores satisfying selected criteria (e.g., distance scores less than a threshold). Window data 220 can be updated to record the candidate pairs or transitions.

In some examples, as the pair selection is iterated, a processing unit can attempt to synthesize transitions, e.g., as discussed herein with reference to regularization module 204 or mesh-synthesis module 206. If the synthesis succeeds for a particular pair, that pair can be added to the window data 220. If the synthesis fails for a particular pair, the failed pair can be discarded or not saved. This can permit synthesizing and selecting other candidate transitions in the vicinity without synthesizing numerous redundant transitions between closely-spaced frames. Windowed matching permits determining candidate pairs that have similar action, while the weighting kernel ensures that the center frames $F_s$ and $F_t$ are close.

In some examples, regularization module 204 is configured to determine "tracked" window data 222. A record of tracked window data 222 corresponds to a record of window data 220, but each mesh in the record of tracked window data 222 has a common connectivity between vertices in the meshes. In some examples, if a first mesh and a second mesh have common connectivity between vertices, there is a one-to-one correspondence between vertices in the first mesh and vertices in the second mesh. Furthermore, in these examples, there is a one-to-one correspondence between edges in the first mesh and edges in the second mesh. In these examples, if two vertices $v_1$ and $v_2$ in the first mesh are connected by an edge $e_1$, the corresponding vertices $w_1$ and $w_2$ in the second mesh are also connected by an edge $f_1$.

Having found frames $F_s$ and $F_t$ with similar windows $W_s = \{F_{s-k}, \ldots, F_{s+k}\}$ and $W_t = \{F_{t-k}, \ldots, F_{t+k}\}$, e.g., as indicated in window data 220 provided by windowing module 202, at least one new transition sequence can be determined, e.g., two transition sequences. A transition sequence can include data of at least one synthetic mesh. In some examples, a transition sequence can include data of at least one synthetic texture. In some examples, a transition sequence can include data of at least one path through the synthetic meshes, e.g., a linear path. One example transition sequence can extend from the beginning of $W_s$ to the end of $W_t$ and another example transition sequence can extend from the beginning of $W_t$ to the end of $W_s$. An example is discussed below with reference to FIG. 3, in which a source window 302 is $W_s$, a target window 306 is $W_t$, and two transition sequences 310, 314 are shown.

In some examples, a tetrahedral or other template mesh can be fitted to some or all frames in $W_s$ and $W_t$, so that those frames are tessellated with a common connectivity. This shared tessellation can then be used to synthesize new transition frames.

Procedure TrackTemplate, example pseudocode for which is shown in Table 1, outlines the steps of the fitting phase. An initial surface template is chosen and extended to a volumetric template. Then the surface template is propagated through (and across) the frames in $W_s$ and $W_t$ to obtain the tracked windows $\overline{W}_s$ and $\overline{W}_t$. The tracked windows $\overline{W}_s$ and $\overline{W}_t$, or indications thereof, can be stored in tracked window data 222.

TABLE 1

| TrackTemplate( $W_s$, $W_t$, ∈, ε, L ) |
| --- |
| 1    $F_a$ ← SelectTemplate( $W_s$, $W_t$ ) |
| 2    $\tilde{F}_a$ ← Tetrahedralize( $F_a$ ) |
| 3    Q ← {a} |
| 4    while Q ≠ ∅ |
| 5        q ← Pop( Q ) |
| 6        for r ∈ UnprocessedNeighbors( q ) |
| 7            $\tilde{F}_r$ ← PropagateSurface( $\partial \tilde{F}_q$ ) |
| 8            $\tilde{F}_r$ ← DetailTransfer( $\tilde{F}_r$, $F_r$, ∈, ε, L ) |
| 9            $\tilde{F}_r$ ← PropagateVolume( $\tilde{F}_q$, $\tilde{F}_r$ ) |
| 10           Push( Q , r ) |

In some examples of Table 1, line 8 (the call to Detail-Transfer) is omitted. Using PropagateSurface followed by PropagateVolume without an intervening DetailTransfer can reduce processing time compared with including Detail-Transfer. In some examples of Table 1, procedure Tetrahedralize is omitted or is an identity operation. In an example in which template Fa consists of triangles or tetrahedra, or otherwise matches a predetermined form, omitting Delaunay or other triangulation in Tetrahedralize can reduce processing time. In some examples, including Tetrahedralize processing can permit processing meshes, e.g., captured meshes 120, that may not match a predetermined form at the beginning of processing. In some examples, e.g., using surface As-Rigid-As-Possible (ARAP) techniques for mesh interpolation or mesh synthesis as discussed below, calls to procedures Tetrahedralize and PropagateVolume can be omitted or replaced with identity operations. This can reduce processing time in situations in which surface registration is sufficient.

In some examples of Table 1, line 4 expresses a fixed-size-window termination criterion. In some examples, Table 1, line 4, can be replaced with an adaptive termination criterion. For example, procedure TrackTemplate can include tracking the connectivity as far away from Fa as possible, until the tracking fails (e.g., by exceeding a predetermined error threshold). This can provide longer windows, which can permit forming smoother transitions. In some examples, window determination or tracking (by windowing module 202 or regularization module 204) can include adjusting the positioning of windows, e.g., by selecting $F_s$ or $F_t$ other than at the center of the window. This can permit adjusting transitions for increased smoothness.

In procedure SelectTemplate referenced in Table 1, a processing unit can select the connectivity from among the meshes (captured mesh data 216) in $W_s$ and $W_t$ (indicated in window data 220), and use the frame (mesh) $F_a$ which best satisfies predetermined criteria, e.g., in decreasing order of priority, more connected components, lower genus, and larger surface area.

In some examples, a processing unit can select frame $F_a$ to be the frame having the mesh with the largest number of connected components of the meshes in $W_s$ and $W_t$. If multiple meshes are tied for the largest number of connected components, a processing unit can select $F_a$ as the mesh with lowest genus (e.g., the fewest holes) from among the meshes with the largest number of connected components. If multiple meshes are tied for both the largest number of connected components and the lowest genus, a processing unit can select $F_a$ as the mesh with the largest surface area among the meshes with the largest number of connected components and lowest genus. In the event two or more meshes share the largest surface area, the largest number of connected components, and the lowest genus, a processing unit can select $F_a$ from among those two or more meshes, e.g., randomly, or by selecting the one of those two or more meshes closest to the center of its respective window ($W_s$ or $W_t$).

In some examples, procedure Tetrahedralize, referenced in Table 1, is used. In procedure Tetrahedralize, a processing unit can tetrahedralize the interior of $F_a$ using a constrained Delaunay triangulation that introduces Steiner points and has area-edge ratio bounded by, e.g., 1.8 to get the volumetric template $\overline{F}_a$. This can include determining new vertices in the interior of the mesh.

In some examples, a processing unit can tetrahedralize $F_a$ using the TetGen library or other tetrahedralization routines, e.g., implementing the Bowyer-Watson algorithm or the incremental flip algorithm. The processing unit can provide a predetermined area-edge ratio (e.g., 1.8) as input to the tetrahedralization routine. This parameter can control the aspect ratio of the tetrahedral generated, e.g., to avoid elongated or poorly shaped tetrahedra. In some examples, a constrained triangulation is used to guarantee that the input triangles (the surface of the mesh being tetrahedralized) are used as faces of the output tetrahedra. In some examples, Steiner points are added to initial vertex set to guarantee that the output is indeed a tetrahedralization and to satisfy the target aspect ratio.

In procedure UnprocessedNeighbors referenced in Table 1, since adjacent poses in the source (or target) can have similar geometries, a processing unit can propagate the template within the source (respectively, target) by registering tracked frames to their untracked neighbors. Using the similarity of frames $F_s$ and $F_t$, a processing unit can propagate from the source to the target (or vice versa in the case that $F_a \in W_t$) by registering $\overline{F}_s$ to $F_t$.

In some examples, tracking can begin from a heuristically selected frame $F_a$, discussed above with reference to procedure SelectTemplate. Tracking can include propagating connectivity from $F_a$ one frame at a time across the window including $F_a$. Tracking can additionally or alternatively include propagating connectivity from frame $F_s$ to frame $F_t$. Tracking can additionally or alternatively include propagating connectivity from $F_t$ one frame at a time across the target window. The end result can be a tracked mesh F for each frame $F \in W_s \cup W_t$, all with the same connectivity as $F_a$.

In a specific nonlimiting example, $\alpha = s+2$ and $k=3$. A processing unit can begin processing with frame $F_a$. The connectivity of frame $F_a = F_{s+2}$ can be tracked to frames $F_{s+3}$ and $F_{s+1}$. The connectivity of frame $F_{s+1}$ can then be tracked to frame $F_s$. The connectivity of frame $F_s$ can then be tracked to frame $F_{s-1}$, and additionally or alternatively to frame $F_t$ in the target window. Tracking connectivity from frame $F_s$ to frame $F_t$ can improve accuracy of the tracking since $F_s$ and $F_t$ have previously been determined to be similar (e.g., as discussed herein with reference to Eqs. (4)(8)). The connectivity of frame $F_{s-1}$ can be tracked to frame $F_{s-2}$, and the connectivity of frame $F_{s-2}$ can be tracked to frame $F_{s-3}$. Additionally, the connectivity of frame $F_t$ can be tracked to frame $F_{t-1}$ and frame $F_{t+1}$. Connectivity can be tracked outward in the target window from frame $F_{t-1}$ and frame $F_{t+1}$ in the same way described for the source window. In some examples, connectivity can be tracked in the source window and the target window in parallel, reducing the time required to perform the tracking. Tracking only for frames within the source and target windows can reduce the required processing compared to preprocessing connectivity for all frames. Moreover, tracking only for frames within the source and target windows can provide more accurate tracking and speed tracking by providing frames having predetermined levels of similarity. This can reduce the need for the processing unit to make significant changes to the meshes while tracking, which can speed convergence of tracking algorithms.

In procedure PropagateSurface, referenced in Table 1, a processing unit can register the boundary of the tracked template, $\neq \overline{F}_q$, to the neighbor's geometry, $F_r$. The result of processing in procedure PropagateSurface can be a mesh $\tilde{F}_r$ having substantially the same shape as mesh $F_r$, and having the same connectivity as template mesh $\overline{F}_a$ among vertices and edges on the surface of the mesh. In some examples, the mesh $\tilde{F}_r$ can include only surface polys. In other examples, the mesh $\tilde{F}_r$ can include surface polys and at least one interior vertex (a vertex not part of any surface poly). Because adjacent frames (and $F_s$ and $F_t$) are similar, as determined by the windowing module 202, this process can be performed effectively. In some examples, each call to PropagateSurface can provide a mesh $\tilde{F}_r$ sharing surface connectivity, e.g., having a one-to-one mapping between surface edges and vertices, with the preceding mesh $\overline{F}_q$, and therefore with the template $\overline{F}_a$.

A processing unit can use non-rigid iterative closest points (ICP) techniques to perform this registration. For example, the processing unit can inspect 3×3 transformation matrices throughout a mathematical optimization process and compute a penalty that increases as the three columns of the matrix become non-orthogonal, or as the three columns of the matrix have lengths other than 1. This an example of a surface-deformation evaluation metric.

In some examples, at least one error metric can be used to determine whether tracking is successful. For example, a Hausdorff distance between $\neq \overline{F}_q$ and $F_r$ can be computed and compared to an error threshold to determine whether the tracking is successful. In some examples, a processing unit can abort the transition synthesis when the Hausdorff distance exceeds a predetermined threshold, e.g., 10 cm. This is an example of a geometry-based error metric. In some examples, a rendering error value can be determined and compared to an error threshold. The rendering error value can be determined by projecting the tracked mesh to the viewpoint of the camera (e.g., capture device 116) and computing a difference between, e.g., a silhouette or a normal map of the projected tracked mesh and the corresponding data of the projected original mesh.

In some examples of ICP, the processing unit can use orthonormal matrices to locally preserve distances between points during the mesh deformation. In some examples of non-rigid ICP, functions can be used that do not penalize the deviation of the local linear transform from an orthogonal matrix. In some examples, a local linear transform can be computed that is a rotation encoded in parametric form (e.g., Euler angles). A processing unit can mathematically optimize to determine parameters that best fit the data.

In procedure DetailTransfer, referenced in Table 1, having performed ICP to coarsely register the template's surface to the input, a processing unit can further deform the geometry of the template to better match the input's detail. The surface normals can be used to encode details, which does not require the input and template meshes to share a common tetrahedralization.

In some examples, a processing unit can transfer detail by offsetting vertices on the template so that the deformed mesh better matches the input (from captured mesh data 216). In some examples, rather than seeking the offsets that bring the template vertices closer to the input, a processing unit can first independently model the template's and input's detail as offsets along a smoothed normal field, and then replace the template's offsets with those of the input. Various examples remove the need for a smooth offset constraint required to mitigate the effects of mis-registration, which can increase the effectiveness of transfer of higher-spatial-frequency content. Moreover, some examples provide a smoother surface than prior schemes, mitigating the effects of lack of smoothness in the underlying normal field.

Procedure DetailTransfer, example pseudocode for which is shown in Table 2, outlines the steps of an example algorithm for hierarchical detail extraction. First a processing unit can hierarchically define the template and input meshes as normal offsets from smoother base-domains. Then a processing unit can replace the offsets of the template with those of the input. Using the base layer from one pass of detail-transfer as the input to the next allows for extraction of details across different frequencies.

TABLE 2

DetailTransfer( $F_0$, $F_1$, $\in$, $\varepsilon$, L )

```
1    for α ∈ {0,1}:
2        F̃_α ← F_α
3        for l ∈ [0, L):
4            ( n⃗_α^l , h_α^l ) ← NormalOffsetToBase( F̃_α , ∈ · 4^l , ε)
5            F̃_α ← F̃_α + h_α^l · n⃗_α^l
6    Φ* ← PullBack( F̃_0 , F̃_1 )
7    for l ∈ [0, L):
8        F̃_0 ← F̃_0 - Φ*^(h_1^l) · n⃗_0^l
9    return F̃
```

Noting that the normal offset that smooths a surface corresponds to the mean-curvature, this approach is akin to replacing (hierarchically) the mean-curvature of the template with the mean-curvature of the input.

Procedure NormalOffsetToBase, referred to in Table 2, can operate as follows: Given mesh and smoothness parameters for the normal field and the target base layer, a processing unit can first compute the smooth normals and then compute the normal offsets that generate the smooth layer. Pseudocode for an example NormalOffsetToBase procedure is shown in Table 3.

TABLE 3

NormalOffsetToBase( F , $\in$ , $\varepsilon$)

```
1    n⃗ ← SmoothNormals( F , ∈ )
2    h ← EstimateOffsets( F , n⃗ , ε)
3    return( n⃗ , h )
```

Procedure SmoothNormals, referred to in Table 3, can simulate the diffusion of the normal field as a map between manifolds. For example, a processing unit can constrain the normals to change in the tangent plane of the corresponding point on the sphere. In some examples, initializing $\vec{n}$ to be the Gauss map, a processing unit can solve for the tangent offset field $\vec{t}$ that minimizes the energy:

$$E(\vec{t}) = \int_F [\|\vec{t}\|^2 + \in \cdot \|\nabla(\vec{n}+\vec{t})\|^2] dp, \qquad (9)$$

with the first term penalizing large changes and the second encouraging smoothness of the resulting map.

Using the Euler-Lagrange formulation, the minimizer t is the solution to the screened-Poisson equation:

$$(1-\in \cdot \Delta) \vec{t} = -\in \pi(\Delta \vec{n}) \qquad (10)$$

where the Laplace-Beltrami operator, $\Delta$, is applied to each of the coordinate functions $\vec{t}$ and $\vec{n}$, independently, and $\pi$ is the operator projecting onto the tangent space.

Lastly, a processing unit can update the normal field by applying the offset and rescaling:

$$\vec{n} \leftarrow \frac{\vec{n}+\vec{t}}{\|\vec{n}+\vec{t}\|} \qquad (11)$$

Some prior schemes for smoothing the normals first compute the Gauss map and independently diffuse the coordinate functions. However, since the normal field lies on the sphere, such schemes can result in undesirable artifacts such as the simultaneous vanishing of the coordinate functions (making it impossible to define a unit normal) or the convergence of each of the coordinate functions to a constant (which would not provide a meaningful normal field). By contrast, examples described above do not suffer from these artifacts. Shifting a point on the sphere by a vector in the point's tangent space (1) only moves the point further from the origin, so it is impossible for it to be zero, and (2) after normalization, the shift only moves a point to a position in the same hemisphere, making it impossible to have all points move to the same position if the initial mapping was surjective.

The diffusion can be iterated and, if it converges, the result is a harmonic map from F to the sphere. In particular, when F is genus-0 the resulting map is a conformal spherical parameterization.

Procedure EstimateOffsets, referred to in Table 3, can operate on the initial embedding of the surface, $\Phi: F \rightarrow \mathbb{R}^3$ (with $\Phi(p)=p$ for all $p \in F$) and the smoothed normal field $\vec{n}$. A processing unit can solve for the normal offsets h by minimizing:

$$E(h) = \int_F [\|h\|^2 + \varepsilon \cdot \|\nabla(\Phi+h\cdot \vec{n})\|^2] dp, \qquad (12)$$

with the first term penalizing large offsets and the second encouraging smoothness of the resulting embedding.

Using the Euler-Lagrange formulation, the minimizer h is the solution to the screened-Poisson equation:

$$(1-\varepsilon \cdot (\vec{n}^* \cdot \Delta \cdot \vec{n}))h = -(\vec{n}^* \cdot \Delta) \cdot \phi \quad (13)$$

where $\vec{n}^*$ is the dual of the normal field (taking a vector in $\mathbb{R}^3$ and returning the dot-product with the normal). To mitigate the shrinking effects of mean-curvature flow, a processing unit can adjust the offset function so that it has zero mean, e.g., $h \leftarrow h - \int_F h / \int_F 1$.

Procedure PullBack, referred to in Table 2, can operate on surfaces F and G already registered using ICP. A processing unit can determine a correspondence map as the map taking a point on the source to the closest point on the target:

$$\Phi(p) = \underset{q \in G}{\arg\min} \|p - q\|^2, \forall\, p \in F. \quad (14)$$

The pull-back of this map is then used to transform the offsets computed on the target to offsets on the source:

$$\Phi^*(h_G) = h_G \circ \Phi. \quad (15)$$

The results of propagating the surface and transferring detail, namely meshes $\overline{F}_r$, can be included in tracked window data 222.

In various examples of the above algorithm(s) for detail transfer, a processing unit can receive as input, source and target meshes $\mathcal{M}_\alpha = (\mathcal{V}_\alpha, \mathcal{T}_\alpha)$, with $\alpha \in \{0, 1\}$. The vertex positions and normals can be denoted by the $3|v_\alpha|$-dimensional vectors of (linearized) coefficients, $v_\alpha$ and $n_\alpha$.

Referring to normal smoothing (Eq. (10)), given the mesh normals, a processing unit can compute the (linearized) tangent vectors, $t_1$, $t_2 \in \mathbb{R}^{3|v|}$, where the i-th tangents are perpendicular to the i-th normal. A processing unit can set $T = \text{diag}_3 t_1 | \text{diag}_3 t_2$ to be the operator that takes tangent coefficients and returns the (per-vertex) tangent vectors.

The tangential offsets o with respect to this frame are given by the solution to the $2|\mathcal{T}| \times 2|\mathcal{T}|$ linear system:

$$(T' \cdot (M + \varepsilon \cdot S)^{\oplus 3} \cdot T)o = -\varepsilon \cdot (T' \cdot S^{\oplus 3}) \cdot n. \quad (16)$$

A processing unit can determine the new normal positions by offsetting the original normals in the tangent direction, $\tilde{n} = n + T \cdot o$, and normalizing so that the normals have unit length.

Some examples include choosing tangents at each vertex. However, the smoothed normals can be independent of the specific tangent values chosen, in some examples.

In some examples of offset estimation, e.g., Eq. (13), given the smoothed normals, $\tilde{n}$, a processing unit can determine the offsets h as solutions to a $|\mathcal{V}| \times |v|$ linear system, e.g.:

$$(\text{diag}_3'(\tilde{n}) \cdot (M + \varepsilon \cdot)^{\oplus 3} \cdot \text{diag}_3(\tilde{n}))h = -\varepsilon \cdot (\text{diag}_3'(\tilde{n}) \cdot S) \cdot v. \quad (17)$$

Then, setting $1 \in \mathbb{R}^{|v|}$ to be the vector whose entries are all 1, a processing unit can adjust h to have zero mean by setting:

$$h \leftarrow h - \frac{1^t \cdot M \cdot h}{1^t \cdot M \cdot 1} \cdot 1. \quad (18)$$

Referring to registration (Eq. (14)), a processing unit can define the pull-back of the registration as the matrix $P \in \mathbb{R}$ whose i-th row entries are defined by the following procedure, wherein for computing the closest point, the TriMesh kD-tree implementation can be used: (1) find the point on $\mathcal{G}_1$ closest to the i-th vertex of $\mathcal{G}_0$; (2) compute the barycentric coordinates of the point relative to the vertices of the containing triangle; and (3) set the entries corresponding to these vertices to the barycentric weights (and all other row entries to zero).

In implementing the detail transfer, in some examples, the following parameter values can be used: $\varepsilon = 10^{-3}$ for the normal smoothing weight, $\varepsilon = 10^{-4}$ for the offset smoothing weight, and L=3 for the number of hierarchy levels.

In various examples, in procedure PropagateVolume referenced in Table 1, line 9, having registered the surface of the tracked mesh $\partial F_q$ to the neighbor $\tilde{F}_r$, a processing unit can extend the registration to the interior of the volume ("propagate volume"). To do this, a processing unit can solve the volumetric ARAP registration problem, seeking positions of the interior vertices of $\overline{F}_r$ that mathematically minimize an ARAP energy from the initial template $\overline{F}_a$ to $\overline{F}_r$, while locking the boundary vertices to the positions of $\tilde{F}_r$ from procedure PropagateSurface. The result of processing in procedure PropagateVolume can be a mesh $\tilde{F}_r$, having substantially the same shape as mesh $F_r$, and having the same connectivity as template mesh $\overline{F}_a$ among vertices and edges both on the surface of the mesh and in the interior of the mesh. The former is referred to as "surface connectivity" and the latter is referred to as "interior connectivity."

In some examples of ARAP registration, to compute the volumetric ARAP energy, a processing unit can use the tetrahedron-based implementation of the libigl C++ geometry processing library or other libraries. Given two tetrahedral meshes $(v_1, \mathcal{K})$ and $(\mathcal{V}_2, \mathcal{K})$ with the same tessellation $\mathcal{K}$, the ARAP energy in some examples is given by $$E(\mathcal{K}, V_1, V_2) = \sum_{\sigma \in \mathcal{K}} |\sigma|_1 \cdot \min_{R \in SO(3)} \|R - L_\sigma\|_F^2 \quad (19)$$

with $L_\sigma$ the linear component of the affine map taking the embedding of $\sigma$ through $V_1$ to its embedding through $V_2$, $|\sigma|_1$ the volume of $\sigma$ under the embedding of $v_1$, and $|\cdot|_F^2$ the squared Frobenius norm.

In some examples, instead of Eq. (19), Eq. (19B) can be used:

$$E(\mathcal{K}, V_1, V_2) = \sum_{\sigma \in K} \min_{R_\sigma \in SO(3)} \|\nabla_{g_\sigma}(p_2 - R_\sigma p_1)\|_{g_\sigma}^2 \quad (20)$$

with $p_1$ and $p_2$ being the embedding functions of the tetrahedral meshes (given by linear interpolation of vertex positions) and $g_\sigma$ the metric tensor from the reference embedding.

In some examples, the ARAP energy can be defined vertex-by-vertex. For each vertex, the edges connected to that vertex can be considered. A rigid transform leaves the angles between those edges unchanged. Therefore, the ARAP energy can indicate the extent to which a particular transformation (rigid or not) changes the angle between two edges at a common vertex of those two edges, or changes the angles of multiple such edge pairs at the common vertex. ARAP energy functions can be examples of rigidity evaluation metrics discussed herein. In some examples, for tetrahedral meshes, each rotation in an ARAP process can act on the 4 edges of a tetrahedron. In some examples, for triangles, each rotation can act on the edges of all triangles adjacent to a particular vertex.

A processing unit can minimize the nonlinear energy of Eq. (19), or another ARAP or other rigidity evaluation metric, by running multiple iterations, e.g., 20 iterations, of a local/global optimization technique. For example, the optimization technique can alternate between solving for local rotations and solving for global vertex positions. Throughout this document, the terms "optimize," "optimal," "mathematically optimal," and similar terms refer to techniques for solving, and determined solutions to, mathematical-optimization problems. "Optimal" and similar terms do not imply that a particular solution is necessarily the best possible in any sense.

When performing the tracking (e.g., as Eq. (19)) a processing unit can initialize the solver with the vertex positions of the tracked frame when the two frames are in the same window. When the frames are in different windows (e.g., tracking from $F_s$ to $F_t$ or vice-versa) a processing unit can apply the rigid transformation whose translational component aligns the centers of mass and rotational component minimizes the dissimilarity of Eq. (4). When synthesizing the geometry of in-between frames (e.g., as discussed herein with reference to Eqs. (23), (24), or (25)) a processing unit can use the weighted linear blend of the vertex positions in the source and aligned target as the initial guess.

In some examples, mesh-synthesis module 206 is configured to determine synthetic mesh data 224, e.g., based at least in part on at least some of the captured mesh data 216 or the tracked window data 222. For example, mesh-synthesis module 206 can operate on the tracked meshes $\overline{F}_r$ in tracked window data 222. Mesh-synthesis module 206 can additionally or alternatively be configured to produce a motion graph 226 including or referencing the synthetic mesh data 224.

In some examples, using the tracked windows determined as described above with reference to regularization module 204, a processing unit can construct an animation that transitions from the first frame of the source window to the last frame of the target. In some examples, mesh-synthesis module 206 can determine a synthetic transition sequence including a plurality of synthetic meshes and connections between those meshes in a motion graph, e.g., as discussed herein with reference to FIG. 3. Synthetic transition sequences can additionally or alternatively include synthetic texture data, captured mesh data 216, and/or captured texture data 218.

Procedure SynthesizeTransition, example pseudocode for which is shown in Table 4, can be used to determine the synthetic mesh data 224. First, the target window is rigidly aligned to the source (line 1). Next, starting and ending textures are obtained by projecting the input textures, $I_{s-k}$ and $I_{t+k}$, onto the tracked geometries, $F_{-k}^{st}$ and $F_{k}^{st}$, and the optical flow field is estimated, as discussed below with reference to the texture-synthesis module 208 (lines 2-4). Then, intermediate frames are constructed by minimizing a rigidity-invariant objective function (lines 6 and 7). Intermediate textures can be generated by advecting the start texture forward, the end texture backward, and blending, as discussed below with reference to the texture-synthesis module 208 (lines 8-11).

TABLE 4

| SynthesizeTransition( $\overline{W}_s$, $\overline{W}_t$, $\in$, $\varepsilon$, L ) |
|---|
| 1    (o, R) ← AlignWindows( $\overline{F}_s$, $\overline{F}_t$ ) |
| 2    $I_{-k}^{st}$ ← ProjectTexture( $F_{s-k}$, $I_{s-k}$, $F_{-k}^{st}$ ) (or $\overline{F}_{s-k}$ in place of $F_{-k}^{st}$) |
| 3    $I_{k}^{st}$ ← ProjectTexture( $F_{t+k}$, $I_{t+k}$, $F_{k}^{st}$ ) (or $\overline{F}_{t+k}$ in place of $F_{k}^{st}$) |
| 4    $\vec{v}$ ← MeshOpticalFlow( $F_a$, $I_{-k}^{st}$, $I^{st}$, $\in$, $\varepsilon$, L ) |
| 5    for i ∈ [−k, k]: |

TABLE 4-continued

| SynthesizeTransition( $\overline{W}_s$, $\overline{W}_t$, $\in$, $\varepsilon$, L ) |
|---|
| 6    $\overline{F}_i^{st}$ ← FitARAP( $\overline{F}_{s+i}$, $\overline{F}_{t+i}$, R ) |
| 7    $F_i^{st}$ ← Pose( $F_{s+i}$, $\overline{F}_{t+i}$, $\overline{F}_i^{st}$, R, o ) |
| 8    $\lambda_i$ ← $^{i+k}/_{2k}$ |
| 9    $I_i^s$ ← Advect( $F_a$, $I_{-k}^{st}$, $\lambda_i \cdot \vec{v}$ ) |
| 10    $I_i^t$ ← Advect( $F_a$, $I_k^{st}$, $-(1 - \lambda_i) \cdot \vec{v}$ ) |
| 11    $I_i^{st}$ ← $I_i^s \cdot (1 - \lambda_i) + I_i^t \cdot \lambda_i$ |

At procedure AlignWindows, referred to in Table 4, line 1, a processing unit can solve for a mathematically optimal translation and rotation registering $\overline{F}_t$ to $\overline{F}_s$, e.g., a translation $o \in \mathbb{R}^2$ and rotation $R \in SO(2)$ that minimize the weighted sum of squared differences:

$$E(R,o) = \Sigma_i w_i \cdot m_i \cdot \|p_i^s - (R(p_i^t) + o)\|^2 \qquad (21)$$

with $\{p_i^s\}$ (respectively $\{p_i^t\}$) the vertices in $\overline{F}_s$ (respectively, $\overline{F}_t$), $m_i$ the mass of the i-th vertex (the sum of the volumes of the incident tetrahedra in $\overline{F}_s$ and $\overline{F}_t$), and $w_i$ a weight that gives higher importance to vertices that are closer to the ground plane. In some examples, techniques for solving the Procrustes problem in matrix algebra can be used to determine the translation and rotation registering $\overline{F}_t$ to $\overline{F}_s$, e.g., using singular value decomposition (SVD). Some such techniques are implemented in the Eigen library, which can be used.

Biasing the registration towards the lower parts of the body helps avoid undesirable "gliding" motion. To perform this biasing, a processing unit can set the weight as:

$$w_i = \exp\left(-\frac{(z_i^s + z_i^t)^2}{2\sigma_z^2}\right) \qquad (22)$$

with $z_i^s$ (respectively, $z_i^t$) the z-coordinate of the i-th vertex in $\overline{F}_s$ (respectively, $\overline{F}_t$) and $\sigma_z$ is the root-mean-square (RMS) height from the ground:

$$\sigma_z^2 = \frac{\sum_i m_i \cdot (z_i^s + z_i^t)^2}{\sum_i m_i}. \qquad (23)$$

At procedure FitARAP, referred to in Table 4, line 6, a processing unit can synthesize a mesh of synthetic mesh data 224 by solving for the geometry that minimizes the weighted sum of ARAP energies between the new frame and the source and target. Given spatially aligned transition windows $W_s$ and $W_t$ from tracked window data 222, a processing unit can interpolate between corresponding frames to synthesize the meshes transitioning from $F_{s-k}$ to $F_{t+k}$, and can include those synthetic meshes in the synthetic mesh data 224.

Compared to linear interpolation, various examples can provide meshes exhibiting reduced distortion and shrinking. In some examples, linear interpolation is used to determine an initial value for the ARAP optimization. Some examples use surface ARAP, which can provide more accurate interpolation for dissimilar poses compared to linear interpolation. Some examples use volumetric ARAP, which can more accurately match the volume enclosed by interpolated meshes to the volume enclosed by the captured meshes than can linear interpolation or surface ARAP.

In some examples of intrinsic pose interpolation, a processing unit can minimize a weighted sum of ARAP energies (e.g., for each connected component). Given source and target frames, $\overline{F}_{s+i}$ and $\overline{F}_{t+i}$, for a frame i of a transition from the source window to the target window, a processing unit can solve for the frame $\overline{F}_i^{st}$ minimizing:

$$E(\overline{F}_i^{st}) = (1-\lambda_i) \cdot E_{ARAP}(\overline{F}_i^{st}, \overline{F}_{s+i}) + \lambda_i \cdot E_{ARAP}(\overline{F}_i^{st}, \overline{F}_{t+i}) \quad (24)$$

In Eq. (23), $E_{ARAP}(\cdot,\cdot)$ can be the same volumetric ARAP energy as discussed herein with reference to Eq. (19) (but without locking boundary vertices). Another example of ARAP energy is discussed below with reference to Eq. (43). In some examples, $\lambda_i$ can be the interpolation weight given by the cubic blending kernel ("smoothstep"):

$$\lambda_i = 3\left(\frac{i+k}{2k}\right)^2 - 2\left(\frac{i+k}{2k}\right)^3. \quad (25)$$

In some examples, a processing unit can use a cubic blending function rather than the simpler linear function because the vanishing derivative at the end-points i=±k ensures that the interpolated frames interpolate not only the shapes of the meshes in frames between (or between and including) $F_{s-k}$ and $F_{t+k}$ but also the velocity of the animations at these frames. In some examples, specifically, using a cubic blending kernel as in Eq. (24) can preserve the velocity of the animation at the starting and ending frames, which linear blending according to some prior schemes cannot.

For the reverse transition, from the target window to the source window, a processing unit can solve for the frame $\overline{F}_i^{ts}$ minimizing:

$$E(\overline{F}_i^{ts}) = (1-\lambda_i) \cdot E_{ARAP}(\overline{F}_i^{ts}, \overline{F}_{t+i}) + \lambda_i \cdot E_{ARAP}(\overline{F}_i^{ts}, \overline{F}_{s+i})$$

Frames $F_i^{st}$ and $F_i^{ts}$ can be included in synthetic mesh data 224.

Procedure Pose, referred to in Table 4, line 7, can receive as input the source and target frames, $\overline{F}_{s+i}$ and $\overline{F}_{t+i}$, and the result of the ARAP registration, namely a transition frame $\overline{F}_i^{st}$ that is only defined up to rigid transformation. To pose the (connected component of the) synthesized frame, a processing unit can solve for the translation $\tilde{o} \in \mathbb{R}^3$ and rotation $\tilde{R} \in SO(3)$ that minimizes the weighted sum of registration errors:

$$E(\tilde{o}, \tilde{R}) = \sum_j m_j \left[ (1-\lambda_i) \left\| (\tilde{R}(p_j^{st}) + \tilde{o}) - p_j^{s+i} \right\|^2 + \lambda_i \left\| (\tilde{R}(p_j^{st}) + \tilde{o}) - (\tilde{R}(p_j^{t+i}) - o) \right\|^2 \right] \quad (27)$$

with $p_j^{st}$ the j-th vertex of the synthetic mesh in frame $\overline{F}_i^{st}$, (o, R) the rigid registration from procedure AlignWindows that best aligns the target to the source, and $m_j$ the mass of the j-th vertex. A processing unit can then apply the rigid transformation to the vertices of $\overline{F}_i^{st}$. Analogous transformations can be determined for frames $\overline{F}_i^{ts}$. Frames $F_i^{st}$ and $F_i^{ts}$ can be included in synthetic mesh data 224 after transformation by procedure Pose.

In some examples, texture-synthesis module 208 is configured to determine synthetic texture data 228, e.g., based at least in part on at least one of tracked window data 222 or captured texture data 218. Examples can include procedures noted above with reference to Table 4.

At procedure ProjectTexture, referred to in Table 4, lines 2 and 3, when calibrated camera images of the original scanned performance (captured texture data 218) are available, a processing unit can texture the frames at the boundary of the transition by projecting these images ($I_i$). In some examples, given the camera parameters (e.g., camera position in the world, focal length, angular field of view, or other parameters), a processing unit can project a point in 3-D into the camera-image plane. The processing unit can sample the texture color of each triangle by determining the projection of that triangle on the camera that provides a desired visibility, e.g., for which the ray between the camera center and the triangle center is closest to the triangle normal. Contributions from non-occluded images can be weighted by respective dot products of camera orientations and surface normals. If the original camera images are not available, a processing unit can use nearest-point sampling to assign texture colors. In some examples in which texture data 122 includes projected data, at least one of Table 4 lines 2 and 3 can be omitted. In some examples in which capture 214 includes a sequence of textured meshes, to obtain textures on the boundary meshes $F_{-k}^{st}$ and $F_k^{st}$, the texture from the corresponding original meshes $F_{s-k}$ and $F_{t+k}$ can be projected onto the tracked boundary meshes. In some examples, non-rigid ICP as described herein can provide boundary mesh having geometry similar to the corresponding meshes before tracking, which permits projecting textures effectively. In some examples, textures are projected onto meshes at the original positions of those meshes, not those meshes transformed by rigid transformations, in order to maintain an association between the coordinate frame of the mesh and the coordinate frame of the texture as, e.g., captured by capture system 112.

At procedure MeshOpticalFlow, referred to in Table 4, line 4, and for which example pseudocode is shown in Table 5, to texture the frames in the interior of the transition, a processing unit can estimate the optical flow field i that takes the texture from the first frame in the source window (denoted $F_{-k}^{st}$) to the texture in the last frame of the target window (denoted $F_k^{st}$). Given such a flow field, a processing unit can synthesize in-between textures by flowing the texture from the first frame of the source forward, the texture from the last frame backward, and blending.

A processing unit can do this using an optical flow algorithm for signals on meshes. Computing optical flow directly on the surface can permit synthesizing textures in a way that is geometry-aware and agnostic to occlusions and texture seams. For images, in some examples, optical flow can be implemented over a multiresolution pyramid, using the lower resolutions to define the low-frequencies of the flow (that register the lower frequencies of the source and target images) and refining at successively higher resolutions.

As meshes do not carry a hierarchical structure, a processing unit can adapt the algorithm by introducing a penalty term that encourages the flow to be smooth. Initially, the source and target signals are smoothed and the penalty term is given a high weight so that a processing unit can focus on estimating the lower frequencies of the flow. The source and target are then advected along the estimated flow so that they are roughly aligned, and the process is repeated with less smoothing of the source and target and smaller smoothness penalty to allow for high-frequency correction.

Compared to linear blending, optical flow according to some examples herein, e.g., using multiple hierarchy levels to more effectively register the source to the target, can provide reduced ghosting artifacts and improved detail. Some examples include comparing color histograms using the Earth Mover's Distance to determine the effectiveness of optical flow at preserving the distribution of texel values, which some prior similarity measures like root-mean-square (RMS) error and structural similarity (SSIM) cannot do.

TABLE 5

MeshOpticalFlow( F , $I_0$ , $I_1$ , ∈ , ε, L )

1    $\vec{v}$ ← 0
2    for l ∈ [0, L]:
3      $\vec{v}$ ← $\vec{v}$ + RefineFlow( F , $I_0$ , $I_1$ , $\vec{v}$ , $∈/4^l$ , $ε/4^l$ )
4    return $\vec{v}$ At procedure RefineFlow, referred to in Table 5 and for which example pseudocode is shown in Table 6, at each hierarchy level, the vector-field $\vec{v}$ can be refined by smoothing the input signals, flowing the smoothed signals halfway along $\vec{v}$ so that they are coarsely registered to each other (lines 1 and 2), estimating the higher-resolution flow $\vec{\mu}$ that aligns the coarsely registered signals (line 3), and incorporating the refining flow $\vec{\mu}$ back into the vector field $\vec{v}$.

TABLE 6

RefineFlow( F , $I_0$ , $I_1$ , $\vec{v}$ , ∈ , ε)

1    $\tilde{I}_0$ ← Advect( F , SmoothSignal( $I_0$ , ∈ ) , $\vec{v}/2$ )
2    $\tilde{I}_1$ ← Advect( F , SmoothSignal( $I_1$ , ∈ ) , $-\vec{v}/2$ )
3    $\vec{\mu}$ ← EstimateFlow( F , $\tilde{I}_0$ , $\tilde{I}_1$ , ε)
4    λ ← GetScale( F , $\tilde{I}_0$ , $\tilde{I}_1$ , $\vec{\mu}$ )
5    return λ · $\vec{\mu}$ At procedure SmoothSignal, referred to in Table 6, to smooth the signal I on surface F, a processing unit can solve for the signal $\tilde{I}$ that minimizes the energy:

$$E(\tilde{s}) = \int_F [(\tilde{I}(p) - I(p))^2 + \varepsilon \cdot \|\nabla I(p)\|^2] dp, \quad (28)$$

with the first term penalizing deviation from the input signal and the second encouraging smoothness.

Using the Euler-Lagrange formulation, the minimizer $\tilde{I}$ is the solution to the screened-Poisson equation:

$$(1 - \varepsilon \cdot \Delta)\tilde{I} = I \quad (29)$$

where Δ is the Laplace-Beltrami operator on F.

At procedure Advect, referred to in Table 6, to flow a signal I along a vector field $\vec{w}$, a processing unit can compute the streamlines of the vector field:

$$\gamma_p^{\vec{w}} : [0,1] \to F$$

and set the value of the advected signal by following the flow line backwards and sampling:

$$\tilde{I}(p) = I(\gamma_p^{-\vec{w}}(1)). \quad (31)$$

At procedure EstimateFlow, referred to in Table 6, to refine the flow, a processing unit can follow the optical flow implementation for images, seeking the flow $\vec{\mu}$ such that the change obtained by flowing $I_0$ along $\vec{\mu}$ explains the difference between $I_1$ and $I_0$. And, symmetrically, flowing $I_1$ along $-\vec{\mu}$ explains the difference between $I_0$ and $I_1$.

Using a first-order approximation, the change in the value of a signal I advected by a vector field $\vec{w}$ is given by the negative of the dot-product of I with the vector field: $-\langle \nabla I, \vec{w} \rangle$. Thus, the correction vector field (approximately) satisfies:

$$-\langle \vec{\mu}, \nabla I_0 \rangle = I_1 - I_0 \text{ and } \langle \vec{\mu}, \nabla I_1 \rangle = I_0 - I_1. \quad (32)$$

Setting $\delta(p) = I_{0(p)} - I_{1(p)}$ to be the difference between the signals, the flow is given as the minimizer of the energy:

$$E(\vec{\mu}) = \int_F \Sigma_{i=0}^1 (\langle \nabla I_i(p), \vec{\mu}(p) \rangle - \delta(p))^2 + \varepsilon \cdot \|\nabla \vec{\mu}(p)\|^2 \quad (33)$$

with the first term penalizing the failure of the vector field to explain the difference in signals, and the second encouraging smoothness of the flow.

Again, using the Euler-Lagrange formulation, the minimizer $\vec{\mu}$ is the solution to a linear system:

$$(\rho_0^* \cdot \rho_0 + \rho_1^* \cdot \rho_1 - \varepsilon \cdot \Delta)\vec{\mu} = (\rho_0^* + \rho_1^*)\delta \quad (34)$$

where $\rho_i$ is the linear operator taking vector fields to scalar fields by evaluating the point-wise dot-product of the vector field with the gradient of $I_i$:

$$\rho_i(\vec{w})(p) = \langle \vec{w}(p), \nabla I_i(p) \rangle, \quad (35)$$

In Eqs. (33) and (34), $\rho_i^*$ is the adjoint of $\rho_i$, and Δ is the Hodge Laplacian.

Procedure GetScale, referred to in Table 6, can provide improved flow compared to schemes using a soft smoothness constraint. In such schemes, the penalty not only encourages the vector field to be smooth, but also small. This has the effect of dampening the flow. In some examples, a processing unit can correct the dampening by solving a 1-D optimization problem to get the correct scale. For example, fixing $\vec{v}$, a processing unit can disregard the smoothness penalty from Eq. (32) and define the energy of the scale λ as:

$$E(\lambda) = \int_F \sum_{i=0}^1 (\langle \nabla I_i, \lambda \cdot \vec{\mu} \rangle - \delta)^2 dp. \quad (36)$$

Setting the derivative to zero, a processing unit can compute:

$$\lambda = \frac{\int_F \delta \langle \nabla I_0, \nabla I_1, \vec{\mu} \rangle dp}{\int_F \langle \nabla I_0, \vec{\mu} \rangle^2 + \langle \nabla I_1, \vec{\mu} \rangle^2 dp}. \quad (37)$$

The result λ of Eq. (36) can be the return value of procedure GetScale.

In various examples of optical flow, a processing unit can receive as input a single mesh ($\mathcal{M}$) with source and target signals $s_0$ and $s_1$. For explanation and without limitation, various examples below are discussed with reference to single-channel signals. Multi-channel signals can additionally or alternatively be processed.

A processing unit can begin the optical flow pipeline by preprocessing, including transforming the texture map into a signal on the mesh. This done by setting the value at each vertex to the average value of the texture map on the vertex's one-ring. In some examples, a processing unit can also subdivide the mesh by splitting edges longer than a threshold and re-triangulating in order to ensure that the signal captures sufficient texture detail.

An example implementation of the optical flow includes four steps: Smoothing, advection, flow estimation, and scale adjustment.

With reference to signal smoothing (e.g., Eq. (28)), a processing unit can determine a smoothed signal $\tilde{s}$ as a solution to the |υ|×|υ| linear system:

$$(M + \in \cdot S)\tilde{s} = M \cdot s \qquad (38)$$

With reference to advection (e.g., Eq. (30)), given a point $p \in \mathcal{M}$, a processing unit can evaluate the scalar field s advected along $\vec{v}$ for time t by taking N geodesic steps along the mesh. At each step a processing unit can evaluate the vector field $\vec{v}$ at p (determined by the triangle or other poly containing p) and update the position by taking a unit steps backwards along the geodesic from p in direction $-\vec{v}(p)/N$. This can be implemented by following the straight line defined by the tangent and unfolding adjacent faces if a triangle edge is reached. A processing unit can then set the value of the advected signal by sampling the input signal at the new position p. In some examples, advection can be performed as is done in unconditionally-stable shock filtering of images or meshes.

When the p is a vertex, a processing unit can offset p by a small amount into each adjacent triangle and proceed as above, using the average over adjacent triangles to set the value of the advected scalar field at p.

With reference to flow estimation (e.g., Eq. (33)), to discretize the flow estimation, a processing unit can perform operations using the following auxiliary operators. $M_T \in \mathbb{R}$ can be a triangle mass matrix, e.g., a diagonal matrix whose i-th entry is the area of the i-th triangle. $D_\alpha \in \mathbb{R}$ can be a matrix which takes a vector field and returns the dot-product with the gradient of $s_\alpha$, evaluated at each triangle.

$$D_\alpha = \left(\operatorname*{diag}_{2}(G(s_\alpha))\right)^t \cdot B. \qquad (39)$$

Vector $d \in \mathbb{R}^{|T|}$ can be a per-triangle difference between the source and target, obtained by computing the difference of the average values of $\tilde{s}_0$ and $\tilde{s}_1$ at the vertices.

Using these, the discretization of Eq. (33) can be computed to provide the correction flow as the solution to the $2|v| \times 2|v|$ linear system:

$$\left(\sum_{\alpha \in [0,1]} (D_\alpha^T \cdot M_T \cdot D_\alpha) - \varepsilon \cdot H\right)\vec{v} = \left(\sum_{\alpha \in [0,1]} D_\alpha^T \cdot M_T\right)d. \qquad (40)$$

With reference to scale adjustment (e.g., Eq. (36)), the processing unit can determine a scale λ, e.g., a mathematically optimal scale, as:

$$\lambda = \frac{d^t \cdot \left(\sum_{\alpha \in [0,1]} M_T \cdot D_\alpha\right) \cdot \vec{v}}{\vec{v}^t \cdot \left(\sum_{\alpha \in [0,1]} D_\alpha^T \cdot M_T \cdot D_\alpha\right) \cdot \vec{v}}. \qquad (41)$$

After estimating the flow field on the mesh, a processing unit can post-process the flow field. For example, the processing unit can use the flow field to advect the texture. For each texel (texture element) center in the captured texture data 218, a processing unit can locate a corresponding position within a triangle of the mesh, follow the stream-line defined by the flow, and sample the input texture at the advected position. A processing unit can then set the value at the starting texel position to the sampled value. In some examples, in implementing the optical flow, the following parameters can be used: $\in = 3 \cdot 10^{-3}$ for the signal smoothing weight, $\varepsilon = 10^6$ for the offset smoothing weight, and L=7 for the number of hierarchy levels. The results of advecting the textures can be the $I_i^s$ and $I_i^t$ values from Table 4, which values can be included in synthetic texture data 228. In the example of Table 4, line 11, $I_i^s$ and $I_i^t$ can be blended to form synthetic texture $I_i^{st}$, which can be included in synthetic texture data 228.

In some examples, for genus-g surfaces (e.g., 3-D surfaces enclosing g holes), the span of the basis can omit the harmonic vector fields, e.g., the 2g-dimensional space of curl- and divergence-free vector fields. In some examples, captured datasets include human or other characters which are genus-0. In some examples, surfaces of arbitrary genus can be processed by, e.g., explicitly estimating a basis for the harmonic vector fields and incorporating that basis within the system, or using a different (e.g. edge-based) discretization of vector fields.

In some examples, path-synthesis module 210 is configured to determine an annotated motion graph 230, e.g., based at least in part on motion graph 226. The annotated motion graph 230 can include transition probabilities, in some examples. As discussed above, mesh-synthesis module 206 can produce a motion graph 226 including captured meshes and synthetic meshes. Examples of motion graph 226 are discussed below with reference to FIGS. 3 and 4. Having constructed an annotated motion graph 230 by synthesizing transition(s) and adding at least some of those transition(s) to the captured (linear, single-path) motion graph, a processing unit can create synthetic motions by traversing the graph, either stochastically or deterministically.

In some examples, graph traversal requires updating the actor's world pose. In some examples, a processing unit can assign a 2-D rigid transformation to each graph edge. For edges of the input sequence, this transformation can be identity. For edges corresponding to synthetic transitions, the transformation can be the rigid transformation computed for window alignment, e.g., as discussed herein with reference to procedure AlignWindows and Eqs. (20), (21), and (22). As a processing unit traverses each graph edge, the processing unit can apply the transform to the character's pose, e.g., via matrix multiplication.

In some examples, the graph $\mathcal{G}$, e.g., motion graph 226, can be trimmed to its largest strongly connected component, e.g., by a processing unit, or before being received by a processing unit. In some examples, the complexity of the graph can be reduced by removing all vertices whose indegree and outdegree are both one. In some examples using such simplified graphs, the number of graph edges can be at least twice the number of graph vertices.

In some examples, path-synthesis module 210 can determine transition probabilities associated with a random walk through the motion graph 226. For random traversal, the annotated motion graph 230 can be or include a Markov chain $\mathcal{G} = (\mathcal{P}, \varepsilon, P)$ defining a (sparse or otherwise) transition probability matrix P that assigns to each directed edge $e = (F_i, F_j) \in \varepsilon$ a transition probability $p_{i,j}$. Outgoing probabilities at each node can sum to unity, e.g., P1=1.

Various examples assign transition probabilities P such that the steady-state distribution $\mathcal{S}(P)$ of the Markov Chain, e.g., the probability of being at any given node after a long random walk, is as close to uniform as possible. In some examples, $\mathcal{S}(P)$ can be the unique left eigenvector of P with eigenvalue one.

In some examples, $\mathcal{S}(P)$ can approximate a uniform distribution after activating just a few transitions in $\mathcal{G}$. For example, if there exists a transition from the last input frame to the first, enabling just this single transition makes the steady-state distribution uniform. To avoid these undesirable trivial solutions, a processing unit can add the Frobenius norm $|P|_F$ as a regularization term. It is equivalent to the sum of $L^2$ norms of the rows of P and encourages uniformity of outgoing transition probabilities at all nodes.

Denoting the uniform distribution as $\pi=1/|\mathcal{P}|$, an example objective is $$\min_P \alpha \cdot |\mathcal{F}| \cdot \|\mathcal{S}(P) - \pi\|^2 + (1-\alpha) \cdot \frac{|\mathcal{E}|}{|\mathcal{F}|^2} \cdot \|P\|_F^2 \qquad (42)$$

subject to the constraints $P1=1$, $p_{i,j} \geq 0$, and $p_{i,j}=0$ if $(F_i, F_j) \notin \varepsilon$. The factors $|\mathcal{P}|$ and $|\varepsilon|/|\mathcal{P}|^2$ can balance the two penalty terms. This objective can be mathematically optimized to determine a matrix P. Matrix P can be included in annotated motion graph 230.

Eq. (41) is an example of a constrained nonlinear objective function. A processing unit can mathematically minimize the objective, e.g., using a pattern searcher such as the direct solver in the MATLAB "patternsearch" routine or similar routines. Example parameters can include a maximum of $10^4$ function evaluations and $\alpha=0.08$. As a starting state for the nonlinear minimization, a processing unit can first mathematically minimize the quadratic proxy energy $$\alpha \cdot |\mathcal{F}| \cdot \|\pi P - \pi\|^2 + (1-\alpha) \cdot \frac{|\mathcal{E}|}{|\mathcal{F}|^2} \cdot \|P\|_F^2 \qquad (43)$$

subject to the same constraints as discussed with reference to Eq. (41). This proxy energy is motivated by the fact that $\mathcal{S}(P)$ is the only distribution satisfying $\mathcal{S}(P)P = \mathcal{S}(P)$ on irreducible Markov chains. The P matrix from Eq. (42) can be used as an initial value of the pattern search or other optimization of Eq. (41). In some examples, a random walk using probabilities defined by P can visit the input frames more uniformly than does a random walk using probability $\pi$ for each edge at each transition.

In some examples, the target distribution Tr in the optimization can be replaced with a non-uniform distribution. This can permit making certain portions of the annotated motion graph 230 occur more or less frequently than other portions of the annotated motion graph 230 under a random walk.

In some examples, presentation module 212 is configured to present at least one frame of the synthetic mesh data 224 and/or the synthetic texture data 228. For example, the presentation module 212 can present a production including frames of the synthetic mesh data 224 textured with the synthetic texture data 228. In some examples, the presentation module 212 can present the frames of the production in an order specified by the annotated motion graph 230. For example, the presentation module 212 can display frames in an order specified by a random walk through the annotated motion graph 230. The random walk can be governed by the probabilities in the annotated motion graph 230, e.g., matrix P from Eq. (41).

In some examples, the presentation module 212 can determine a shortest path in the annotated motion graph 230 between two states, and can present frames of the production along the determined shortest path. For example, for deterministic path generation, the presentation module 212 can permit interactive graph traversal. The presentation module 212 can play the input sequence or a random walk, e.g., in the absence of other instructions. The presentation module 212 can receive an indication of a target frame, e.g., selected by a user via a user interface. The presentation module 212, in response to the indication, can find the shortest path in the motion graph 226 or annotated motion graph 230 that goes from the current frame to the indicated frame. The presentation module 212 can then depict the located shortest path, e.g., by highlighting the edges of the path in a visual representation of the graph, or by playing back frames along the path. The shortest path can be determined, e.g., using Dijkstra's algorithm, the Viterbi algorithm, or other path-finding algorithms applicable to directed graphs.

In some examples of ARAP, e.g., as discussed above with reference to procedure FitARAP and Eqs. (23)(25), an ARAP energy set forth in Eq. (43) can be used.

$$E_{ARAP}(q, p) = \frac{1}{12} \sum_{e_{ab} \in \{i,j,k,l\}} \left( |p_{cd}| \cot \alpha_{ab}^{cd} |q_{ab} - R^{ijkl} p_{ab}|^2 \right) \qquad (44)$$

This is an example of a piecewise linear Dirichlet energy. In some examples, Eq. (43) can be minimized using Newton trust region solvers.

In Eq. (43), p is the vertex position of the reference configuration (this is fixed) and q is the vertex position of the deformed configuration (the parameter being optimized). $e_{ab}$ is an edge from a to b. $a_{ab}^{cd}$ is the dihedral angle opposite $e_{ab}$, e.g., at edge $e_{cd}$. R is a rotation from the reference to the deformed configuration, and can be computed in closed form from p and q. In some examples, R can be computed by using SVD, or by using Newton's algorithm to determine a right polar decomposition.

Figure 3:
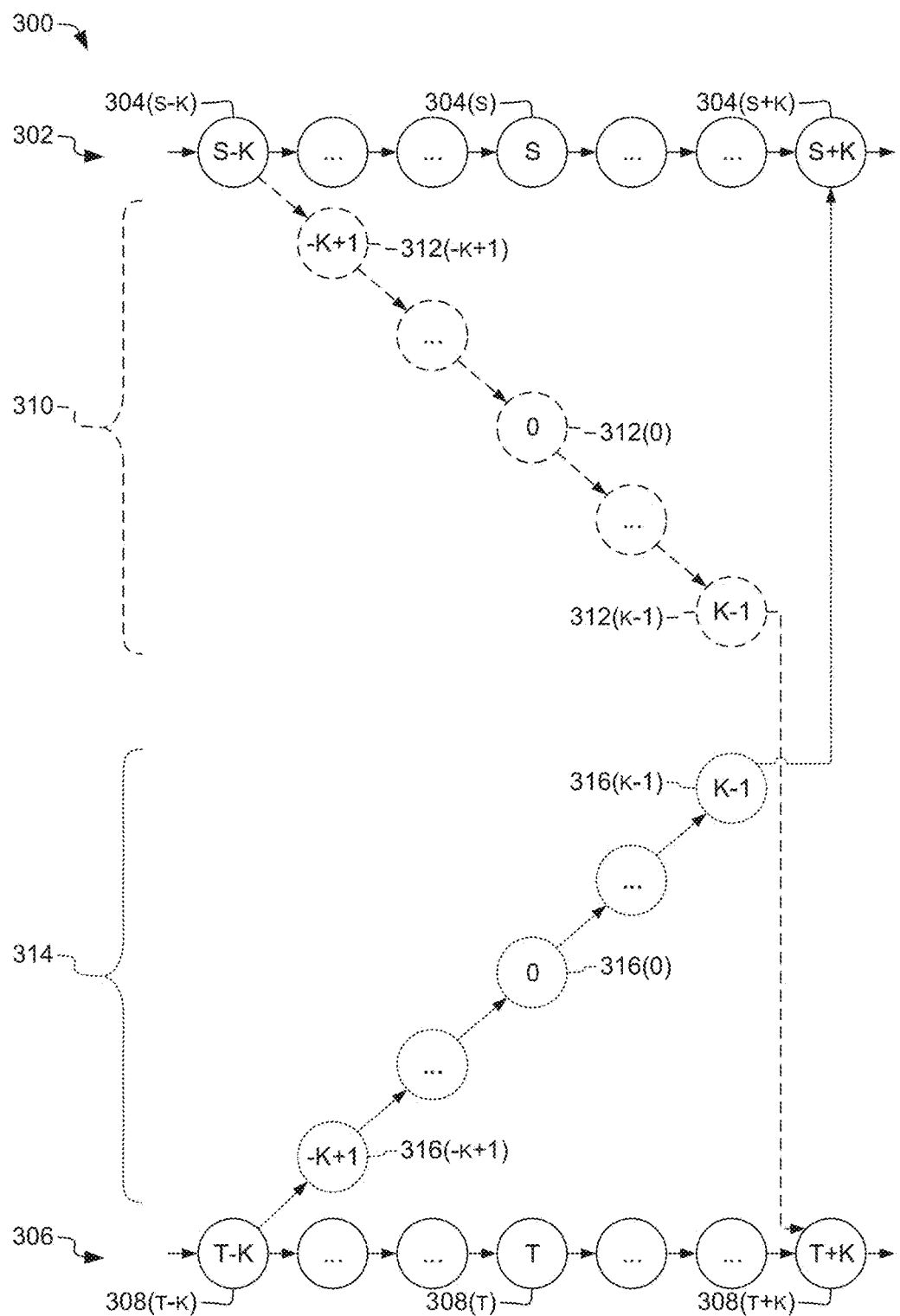
FIG. 3 is a graphical representation of sequences of frames in an example capture, and shows example transition sequences.

FIG. 3 shows an example of portions of a capture 300, which can represent capture 128 or 214, and synthesized frames. Capture 300 can be or be included in a motion graph 226. Capture 300 includes at least two windows of frames, e.g., as discussed above with reference to window data 220 or tracked window data 222. For clarity and without limitation, frames in the captured sequence are numbered herein beginning from frame 0, frames are depicted as circles, and edges between frames in a motion graph 226 or annotated motion graph 230 are depicted as arrows. The direction of normal forward playback (increasing frame time) is from left to right in this example. As noted above, each frame in FIG. 3 can include mesh data. Frames can additionally include texture data.

Source window 302 includes a plurality of source frames 304 (s−k)-304 (s+k) (individually and/or collectively referred to herein with reference 304, where s≥k and k>0). For brevity, not all frames are labeled. As represented by the arrows, in capture 300 (e.g., in the sequence in which the frames were captured), each source frame 304 is followed by the next. Similarly, target window 306 includes a plurality of target frames 308 (t−k)-308 (t+k) (individually and/or collectively 308, t>k). In the illustrated example, source frames 304 are consecutive in the captured sequence, as are target frames 308. However, this is not limiting.

Synthetic transition sequence 310, shown dashed for clarity, can include a plurality of synthetic frames 312 (−k+1)-312 (k−1) (individually or collectively 312). As indicated by the vertical alignment of frames, in this example, synthetic frame 312 (0) is associated with source frame 304(s) and target frame 308(t), and other synthetic frames 312 are associated with respective source frames 304 and target frames 308. In some examples, mesh-synthesis module 206 and/or texture-synthesis module 208 can determine frames 312 of synthetic transition sequence 310 so that playing back source frame 304 (s k), followed by synthetic frames 312 (−k+1), 312 (−k+2), . . . , 312 (−1), 312 (0), 312 (1), . . . , 312 (k−2), 312 (k−1) of sequence 310, followed by target frame 308 (t+k) will provide a visually smooth transition from source frame 304 (s−k) to target frame 308 (t+k).

Similarly, synthetic transition sequence 314, shown dotted for clarity, can include a plurality of synthetic frames 316 (−k+1)-316 (k−1) (individually or collectively 316). Synthetic frames 316 can be associated with respective source frames 304 and target frames 308 in the same way as synthetic frames 312 of synthetic transition sequence 310. In some examples, mesh-synthesis module 206 and/or texture-synthesis module 208 can determine frames 316 of synthetic transition sequence 314 so that playing back target frame 308 (s−k), followed by synthetic frames 316 (−k+1), 316 (−k+2), . . . , 316 (−1), 316 (0), 316 (1), . . . , 316 (k−2), 316 (k−1) of sequence 314, followed by source frame 304 (t+k) will provide a visually smooth transition from target frame 308 (s k) to source frame 304 (t+k).

In some examples, capture 300 is a segment of a motion graph. When traversing the graph, e.g., by presentation module 212, source frame 304 (s−k) can be followed by source frame 304 (s−k+1) to continue displaying the original sequence. Alternatively, source frame 304 (s−k) can be followed by synthetic frame 312 (−k+1) to begin the transition to target frame 308 (t+k) of the target window 306.

In some examples, sequences 310 and 314 can differ. In some examples, sequences 310 and 314 can be sequences other than opposite directions in a particular sequence of nodes. For example, illustrated sequence 310 ($W_{s \rightarrow t}$) and sequence 314 ($W_{t \rightarrow s}$) do not correspond to opposite edges in the motion graph because they are adjacent to different nodes in other parts of the motion graph (not depicted).

In an illustrative example, synthetic frame 312 (0) can differ from synthetic frame 316 (0), and likewise for other pairs of synthetic frames 312 and respective synthetic frames 316. For example, synthetic frames 312 (1) and 316 (1) can each be interpolated from source frame 304 (s+1) and target frame 308 (t+1). However, as discussed herein with reference to Eqs. (23) and (25), the roles of source and target are interchanged when determining synthetic frame 316 (1) compared to when determining synthetic frame 312 (1). Therefore, synthetic frames 312 (1) and 316 (1) can differ. This can provide a smooth transition regardless of which direction of transition is being taken. This can also permit increasing the number of synthetic edges, since smooth transitions can be formed between windows in either direction rather than only from source to target. These examples are not limiting, though, and some examples include forming an edge for a particular window only from source to target, or only from target to source.

In some examples, sequence 310 can include at least one of source frame 304 (s−k) or target frame 308 (s+k). In some examples, sequence 310 can include at least one synthetic frame isomorphic to at least one of source frame 304 (s k) or target frame 308 (s+k) (e.g., equivalent up to tesselation). In some examples, sequence 314 can include at least one of source frame 304 (s+k) or target frame 308 (s−k). In some examples, sequence 314 can include at least one synthetic frame isomorphic to at least one of source frame 304 (s+k) or target frame 308 (s−k) (e.g., equivalent up to tesselation).

Figure 4:
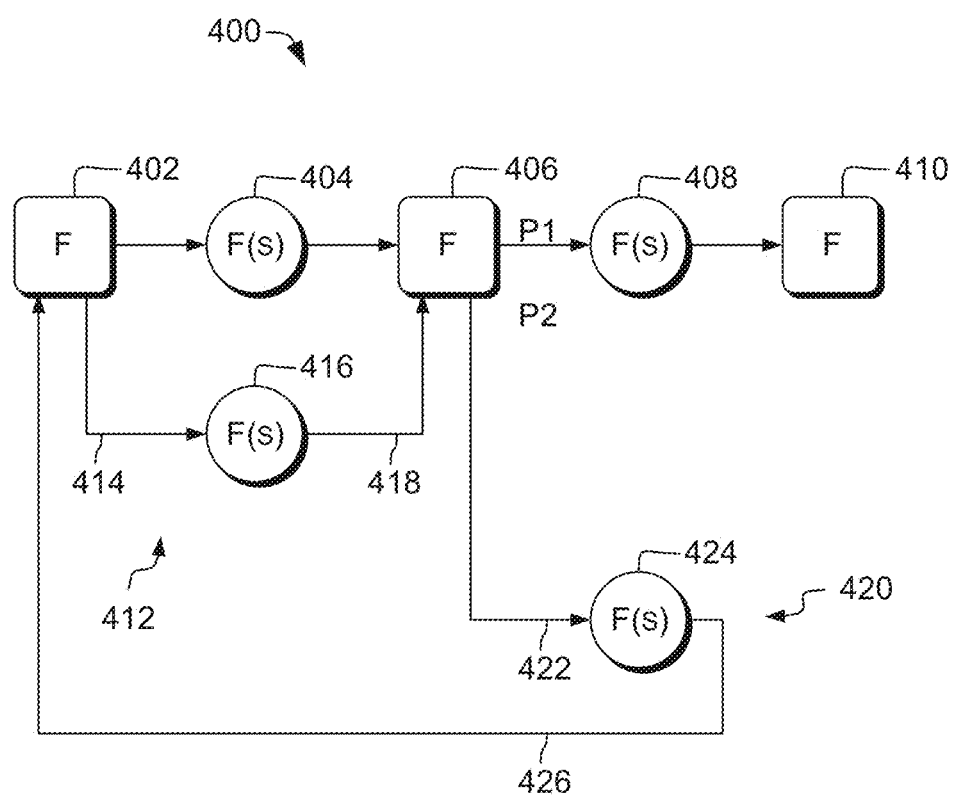
FIG. 4 is a depiction of an example motion graph including transition sequences.

FIG. 4 shows an example motion graph 400, which can represent motion graph 226 or annotated motion graph 230, or a portion of either of those. In motion graph 400, e.g., a directed graph (digraph), each frame is one node. Rounded rectangles represent nodes (frame "F") with multiple output edges. Each circle represents one or more nodes, each of which has a single output edge to the next node. For example, each circle can represent a span of one or more frames ("F(s)") between windows such as those discussed above with reference to FIG. 3. In the illustrated example, capture 128 corresponds with a straight left-to-right traversal of the graph, beginning with frame 402, frame group 404, frame 406, frame group 408, and frame 410.

In the illustrated example, frame group 404 and frame group 408 are overlapping windows, e.g., source window 302 and target window 306 in FIG. 3. Therefore, motion graph 400 includes a transition 412 from frame 402 to frame 406. Transition 412 includes edge 414 from frame 402 to frame group 416, frame group 416, and edge 418 from frame group 416 to frame 406. Motion graph 400 also includes transition 420 from frame 406 to frame 402. Transition 420 includes edge 422 from frame 406 to frame group 424, frame group 424, and edge 426 from frame group 424 to frame 402. Frame group 424 is shown vertically aligned with frame group 408 to emphasize that, at frame 406, a choice can be made to continue the production with either frame group 408 (e.g., with probability P1) or frame group 424 (e.g., with probability P2=1−P1). Similarly, at frame 402, a choice can be made to continue the production with either frame group 404 or frame group 416.

FIGS. 5-16 illustrate example processes for character synthesis or for presentation of synthetic characters. The methods are illustrated as sets of operations shown as discrete blocks. The methods can be implemented in any suitable hardware, software, firmware, or combination thereof. For example, functions shown in FIGS. 5-16 can be implemented on or otherwise embodied in one or more computing devices 102 or 106, or capture controller 114, e.g., using software running on such devices. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

The order in which the operations are described is not to be construed as a limitation, and any number of the described operations can be combined in any order or in parallel to implement each process. For clarity of explanation, reference is made to various components and data items shown in FIGS. 1-4 that can carry out or participate in the steps of the exemplary methods. It should be noted, however, that other components can be used; that is, exemplary methods shown in FIGS. 5-16 are not limited to being carried out by the identified components.

Figure 5:
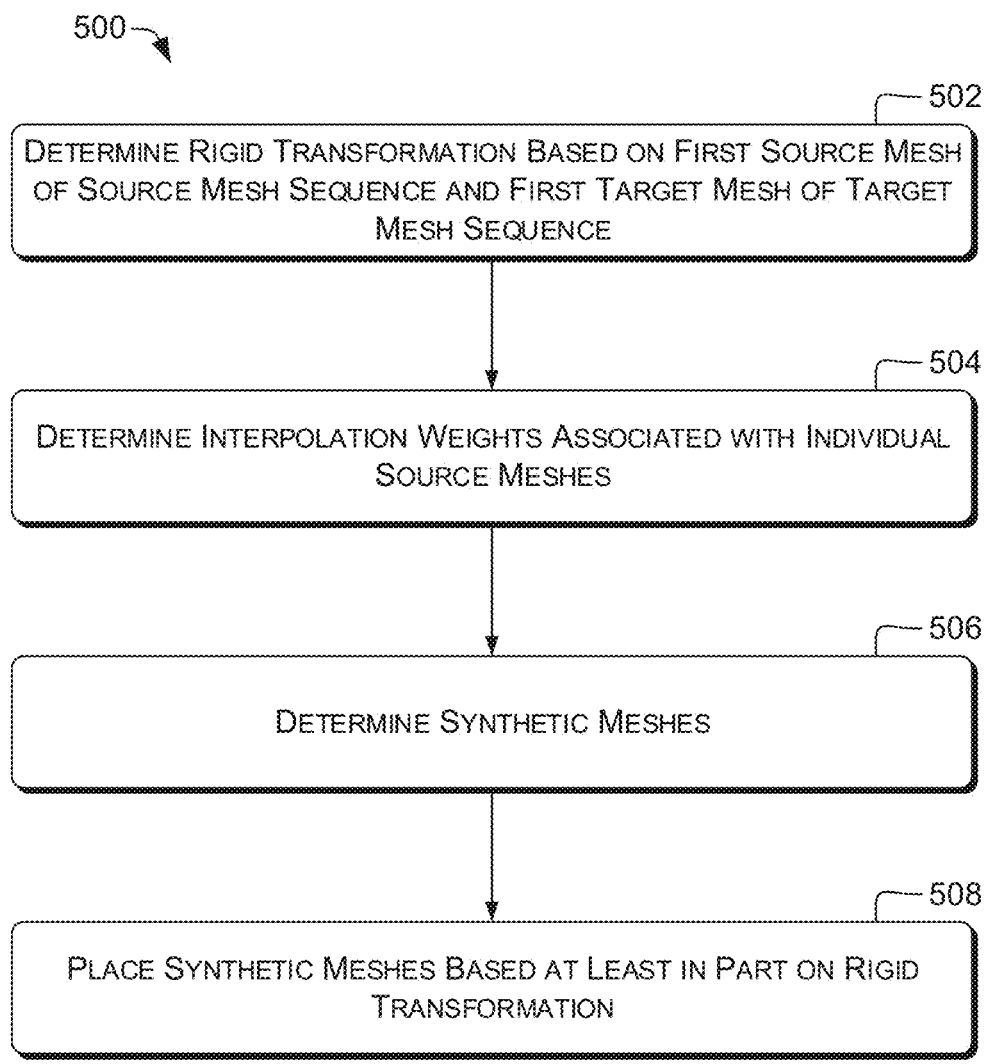
FIG. 5 is a flow diagram that illustrates an example process for synthesizing a mesh.

FIG. 5 illustrates an example process 500 for synthesizing a mesh. Process 500 can be carried out using windows determined by windowing module 202. In some examples, block 502 can be carried out after tracking connectivity, e.g., as described herein with reference to regularization module 204. Process 500 is described with reference to a source mesh sequence and a target mesh sequence. These terms are for clarity of explanation; any sequence of frames, e.g. in window data 220 or tracked window data 222 can be the source mesh sequence or the target mesh sequence. For example, process 500 can be carried out using frame group 404 as the source mesh sequence and frame group 408 as the target mesh sequence, or vice versa. Blocks of process 500 can be carried out, e.g., in any order in which block 502 precedes block 508 and blocks 504, 506, and 508 are executed in that order with respect to each other.

In some examples, at block 502, a rigid transformation is determined based on a first source mesh of a source mesh sequence (e.g., source window 302) and a first target mesh of a target mesh sequence (e.g., target window 302). Examples are discussed herein, e.g., with reference to procedure AlignWindows, Table 4, and Eqs. (20), (21), and (22). For example, the rigid transformation can include the translation o and rotation R from the solution to Eq. (20). The first source mesh can be frame $F_s$ (or tracked frame $\tilde{F}_s$) and the first target mesh can be frame $F_t$ (or tracked frame $\tilde{F}_t$). In some examples, the rigid transformation can include a homogeneous-coordinate matrix expressing at least one of the translation o and rotation R.

In some examples, at block 504, respective interpolation weights associated with individual source meshes of the source mesh sequence are determined based on respective indices of the individual source meshes in the source mesh sequence. For example, Eq. (24) can be used to determine weights $\lambda_i$ associated with indices i of the meshes in a sequence, i $\in$[-k, k].

In some examples, at block 506, respective synthetic meshes are determined based at least in part on the individual source meshes, respective target meshes of the target mesh sequence, and the respective interpolation weights. Examples are discussed herein, e.g., with reference to procedure FitARAP, Table 4, and Eqs. (23) and (25).

In some examples, at block 508, the synthetic meshes are placed based at least in part on the rigid transformation. For example, block 508 can include applying the rigid transformation (o, R) to the synthetic meshes. Additionally or alternatively, block 508 can include determining at least one rigid transformation (õ, $\tilde{R}$), e.g., as discussed herein with reference to Eq. (26), and applying one of the frame-specific rigid transformation(s) to individual one(s) of the synthetic meshes. In an example, each synthetic mesh is transformed by a respective frame-specific rigid transformation. In some examples, a translation o and rotation R can be applied to frames of the target mesh sequence, e.g., by forming a 4×4 homogeneous-coordinate transformation matrix based on translation o and rotation R and multiplying the homogeneous coordinates of each vertex of each mesh in the target mesh sequence by the transform matrix. In some examples, placing the meshes at block 508 can define a processor-generated character, e.g., by establishing meshes to be used during a production including the character and transitioning through the synthetic meshes. Block 508 and other processing operations herein can be performed to further define the processor-generated character, e.g., by determining synthetic meshes for different transitions.

In some examples, block 508 can include determining respective alignment transformations, e.g., frame-specific rigid transformations, that place the respective synthetic meshes with respect to the respective meshes of the source mesh sequence and the target mesh sequence. "Placing" the synthetic meshes can include translation, rotation, or both. Block 508 can include displacing (e.g., translating, rotating, or both) the respective synthetic meshes by the respective alignment transformations to provide displaced synthetic meshes.

Figure 6:
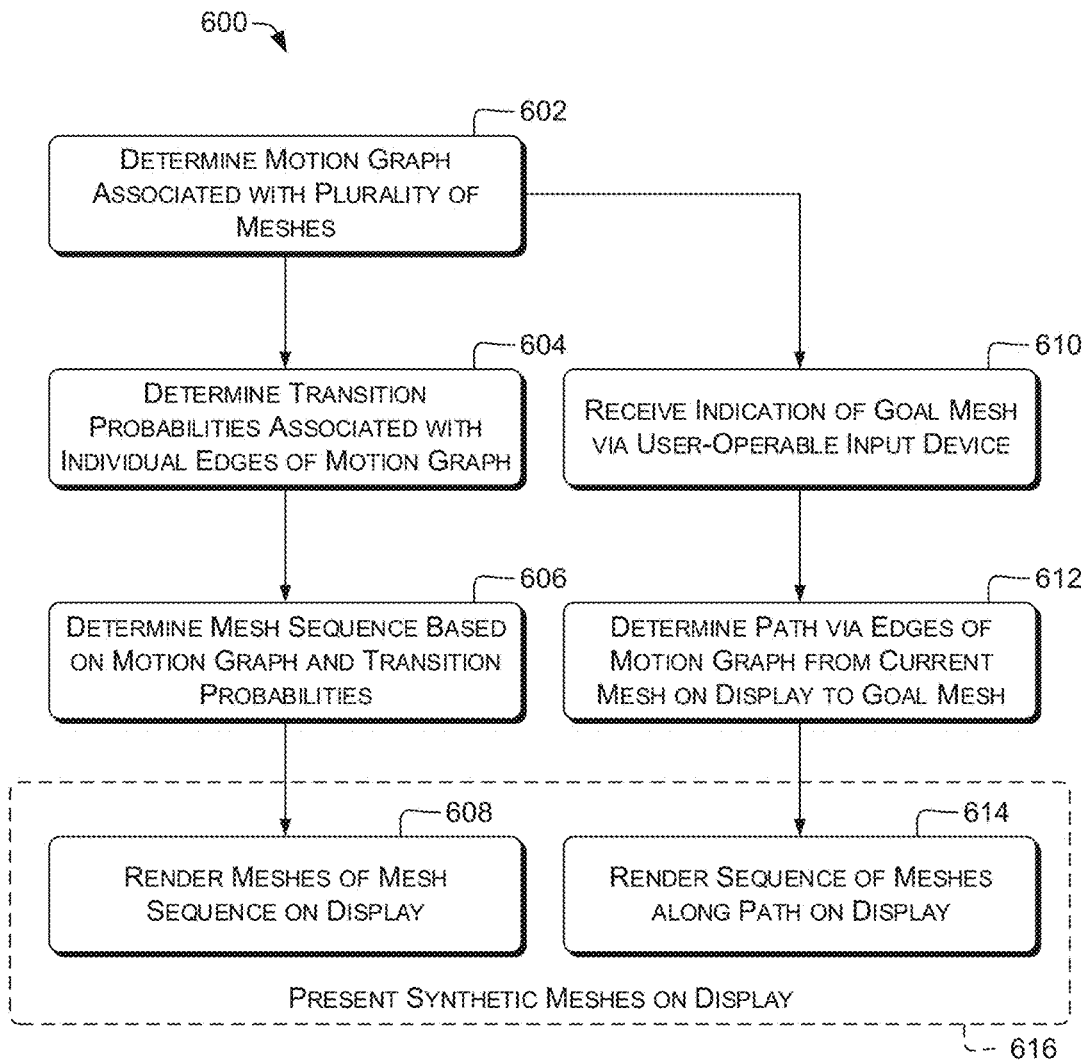
FIG. 6 is a flow diagram that illustrates an example process for synthesizing or presenting characters.

FIG. 6 illustrates example processes 600 for synthesizing or presenting characters. Blocks 602 or 616 can be preceded by block 508.

In some examples, at block 602, a motion graph can be determined, e.g., motion graph 226, 230, or 400. The motion graph can be associated with a plurality of meshes, e.g., a plurality of frames. In some examples, the plurality of meshes comprises at least some of the source meshes, at least some of the target meshes, and at least some of the synthetic meshes. For example, the motion graph can include a mesh in source frame 402, meshes in synthetic frame group 404, and a mesh in target frame 406. The motion graph can include a plurality of directional edges connecting a first respective mesh of the plurality of meshes to a second respective mesh of the plurality of meshes, e.g., the arrows in FIGS. 3 and 4.

In some examples, at block 604, respective transition probabilities associated with edges in the motion graph can be determined, e.g., based at least in part on both the number of directional edges of the motion graph and the number of meshes of the plurality of meshes. For example, a matrix P can be computed as discussed herein with reference to path-synthesis module 210 and Eqs. (41) or (42). The entries of the matrix P can be the transition probabilities of the edges, as discussed above. For example, entry $P_{st}$ can be the probability for the edge from node s to a transition sequence leading to node t. In the example of Eq. (41), the number of edges $|\varepsilon|$ and the number of meshes (frames) $|\mathcal{P}|$ are inputs.

In some examples, block 604 can include determining the respective transition probabilities (elements of matrix P) so that respective visit probabilities of individual meshes of the plurality of meshes are closer to uniform than are respective reference visit probabilities of the individual meshes of the plurality of meshes with respect to substantially uniform reference transition probabilities. Examples are discussed herein, e.g., with reference to path-synthesis module 210, e.g., uniform reference visit probability $\pi$ In other examples, the reference transition probabilities can be nonuniform.

In some examples, at block 606, a sequence of meshes can be determined based at least in part on the motion graph and the transition probabilities. Examples are discussed herein, e.g., with reference to path-synthesis module 210. For example, path-synthesis module 210 can compute a random walk of annotated motion graph 230. In the example of FIG. 4, at frame 406, path-synthesis module 210 can determine a random real number r between 0 and 1, inclusive. If r<P1, path-synthesis module 210 can determine that the edge from frame 406 to frame group 408 is the next edge. Otherwise, path-synthesis module 210 can determine that the edge from frame 406 to frame group 424 is the next edge. Path-synthesis module 210 can then add the mesh at the end of the next edge to the sequence of meshes. Similar random techniques can be used for any number of output edges.

In some examples, at block 608, meshes of the sequence of meshes can be rendered sequentially on the display. Determining the sequence and rendering the sequence can provide automatic non-repetitive playback of an annotated motion graph 230 in some examples. Examples are discussed herein, e.g., with reference to presentation module 212.

In some examples, a computing device 102 or other computing device carrying out process 600 includes or is communicatively connected with a user-operable input device such as a mouse or touchscreen. In some of these examples, block 602 can be followed by block 610.

In some examples, at block 610, an indication of a goal mesh of the plurality of meshes is received via the user-operable input device. For example, the motion graph can be rendered as a timeline, and entity 110 can click on a point of the timeline. The goal mesh can be the frame closest on the timeline to the point clicked.

In some examples, at block 612, a path can be determined via the directed edges of the motion graph from a current mesh presented on the display to the goal mesh. For example, block 610 can be performed while a production is paused displaying a particular frame, and the path can be a shortest path from the particular frame to the goal mesh. Examples are discussed herein, e.g., with reference to presentation module 212.

In some examples, at block 614, the sequence of meshes along the path can be rendered sequentially on the display. Examples are discussed herein, e.g., with reference to presentation module 212. Determining the path and rendering the sequence of meshes along the path can permit readily composing a smooth sequence of motions, e.g., to illustrate a particular aspect of the performance.

In examples discussed above with reference to blocks 608 and 614, and other examples shown as block 616 (which can include blocks 608 and 614), at least one of the synthetic meshes (or displaced synthetic meshes) can be presented sequentially on a display, e.g., display 104, FIG. 1. For example, at least one of the synthetic meshes, e.g., synthetic mesh data 224, can be rendered using a three-dimensional graphics library such as OPENGL or DIRECTX, or a custom rendering engine, e.g., implemented using SHADERTOY or another shader platform. In examples in which synthetic frames include synthetic texture data 228, the rendering can include texturing the synthetic mesh data 224 with the synthetic texture data 228. Block 616 can include at least one of: presenting at least one synthetic mesh, e.g., as a still frame or sequence of still frames; presenting multiple synthetic and/or captured meshes in realtime as a production; and/or receiving fast-forward, rewind, play, stop, or other transport commands, e.g., from entity 110, and displaying frames in response to the transport commands.

FIG. 7 illustrates an example process 700 for synthesizing meshes.

In some examples, at block 702, a first subset of a mesh sequence and a second subset of a mesh sequence can be determined based at least in part on a predetermined similarity criterion. The predetermined similarity criterion can include, e.g., a correlation or other value indicating the similarities of shape descriptors between two frames or two windows of frames, such as discussed above with reference to Eqs. (4)-(8). The first subset can include first meshes of the mesh sequence and the second subset can include second meshes of the mesh sequence. For example, the first and second subsets can correspond to the source and target windows of FIG. 3. Examples are discussed herein, e.g., with reference to windowing module 202. For example, subsets can be selected for which a value of the dissimilarity matrix from Eq. (4) satisfies a predetermined criterion (e.g., a threshold or ranking when sorted in increasing order of dissimilarity).

In some examples, at block 704, a reference mesh of the first meshes and the second meshes can be determined. Examples are discussed herein, e.g., with reference to regularization module 204. For example, procedure SelectTemplate of Table 1 can be used to determine a reference mesh $F_a$. The reference mesh can be in either the first subset or the second subset.

In some examples, at block 706, modified first meshes can be determined based at least in part on the respective first meshes and on the reference mesh. The modified first meshes can have a connectivity corresponding to the reference mesh. Examples are discussed herein, e.g., with reference to regularization module 204, Table 1, and meshes $F_r$.

In some examples, at block 708, modified second meshes can be determined based at least in part on the respective second meshes and on the reference mesh. The modified second meshes can have a connectivity corresponding to the reference mesh. The modified second meshes can be determined analogously to the modified first meshes (block 706).

In some examples, at block 710, synthetic meshes can be determined based at least in part on the respective modified first meshes and the respective modified second meshes. Examples are discussed herein, e.g., with reference to mesh-synthesis module 206 and Table 4.

Figure 8:
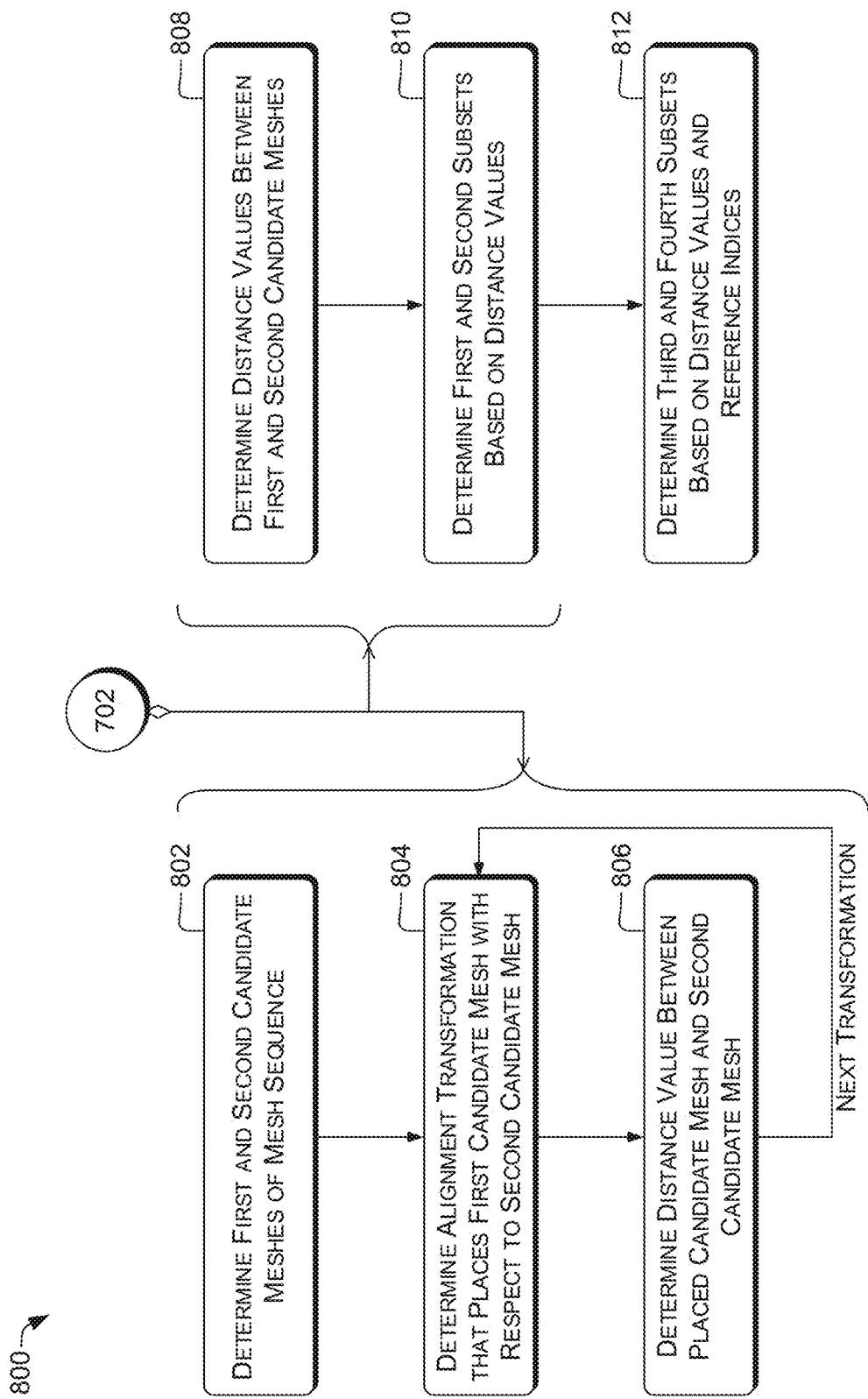
FIG. 8 is a flow diagram that illustrates an example process for synthesizing meshes, including operations on candidate meshes.

FIG. 8 illustrates example processes 800 for synthesizing meshes. In some examples, block 702 can include blocks 802-806, or blocks 808-810.

In some examples, at block 802, a first candidate mesh of the mesh sequence and a second candidate mesh of the mesh sequence can be determined. The candidate meshes can be candidates to become source frame $F_s$ or target frame $F_t$. Examples are discussed herein, e.g., with reference to windowing module 202. For example, the candidate meshes can be selected based on an exhaustive comparison of all pairs of meshes (in which the order within a pair is ignored), or other criteria. For example, a first candidate mesh can be selected as the next mesh in a loop through all meshes in the mesh sequence or through a sample of meshes in the mesh sequence. The second candidate mesh can be selected as the next mesh in a loop through all or sampled meshes in the mesh sequence sufficiently far from the first candidate mesh along a timeline of the capture 128. For example, since windows extend k frames from their centers, in some examples, the second candidate mesh can be selected to be at least 2k frames (e.g., ≥2k+1 frames) away from the first candidate mesh, so that the windows will not overlap.

In some examples, at block 804, an alignment transformation can be determined. The alignment transformation can place the first candidate mesh with respect to the second candidate mesh to provide a placed candidate mesh. In some examples, the alignment transformation can align the centers of mass of the first candidate mesh and the second candidate mesh. Examples are discussed herein, e.g., with reference to windowing module 202. Block 804 is described as transforming the first candidate mesh to provide the placed candidate mesh. Block 804 can additionally or alternatively include transforming the second candidate mesh to provide the placed candidate mesh.

In some examples, at block 806, a distance value can be determined between the placed candidate mesh and the second candidate mesh. Examples are discussed herein, e.g., with reference to windowing module 202 or Eqs. (4)-(8). The distance value can be computed according to a predetermined metric, e.g., the sum of squared distances between the placed candidate mesh and the second candidate mesh, the overlap between the volume enclosed by the placed candidate mesh and the volume enclosed by the second candidate mesh, or other metrics. For example, respective skeletons can be determined of the placed candidate mesh and the second candidate mesh, and difference(s) can be computed between the joint parameters of the respective skeletons. In some examples, a distance can be determined between the transformations determined by non-rigid ICP, as described herein, and an identity transformation matrix.

In some examples, block 806 can be followed by block 804 ("Next Transformation"). In this way, blocks 804 and 806 can be executed multiple times, e.g., for each of a plurality of alignment transformations. In some examples, the plurality of alignment transformations can include different rotations and a common translation, e.g., as discussed herein with reference to windowing module 202.

In some examples, at block 808, a plurality of distance values can be determined between first candidate meshes of the mesh sequence and respective second candidate meshes of the mesh sequence. Examples are discussed herein, e.g., with reference to windowing module 202 and blocks 804-806.

In some examples, at block 810, the first subset and the second subset can be determined based at least in part on the plurality of distance values. Examples are discussed herein, e.g., with reference to windowing module 202 and block 802. In some examples, block 810 can be followed by block 812.

In some examples, at block 812, a third subset of the mesh sequence and a fourth subset of the mesh sequence can be determined. The third and fourth subsets can be determined based at least in part on the plurality of distance values, a reference index of the first subset in the mesh sequence, and a reference index of the second subset in the mesh sequence. For example, the third and fourth subsets can be determined as described herein for the first and second subsets, with the constraint that the third and fourth subsets have to be at least a predetermined distance along the timeline from the first subset and the second subset, respectively or together. The reference indices of the first and second subsets (e.g., subscripts i in $F_i$) can be used to determine the distance between subsets. Selecting third and fourth subsets spaced apart along the timeline from the first and second subsets can permit determining more varied transition sequences and more effectively covering the motion graph in a random walk, e.g., as described with reference to FIG. 2,6, or 13.

Figure 9:
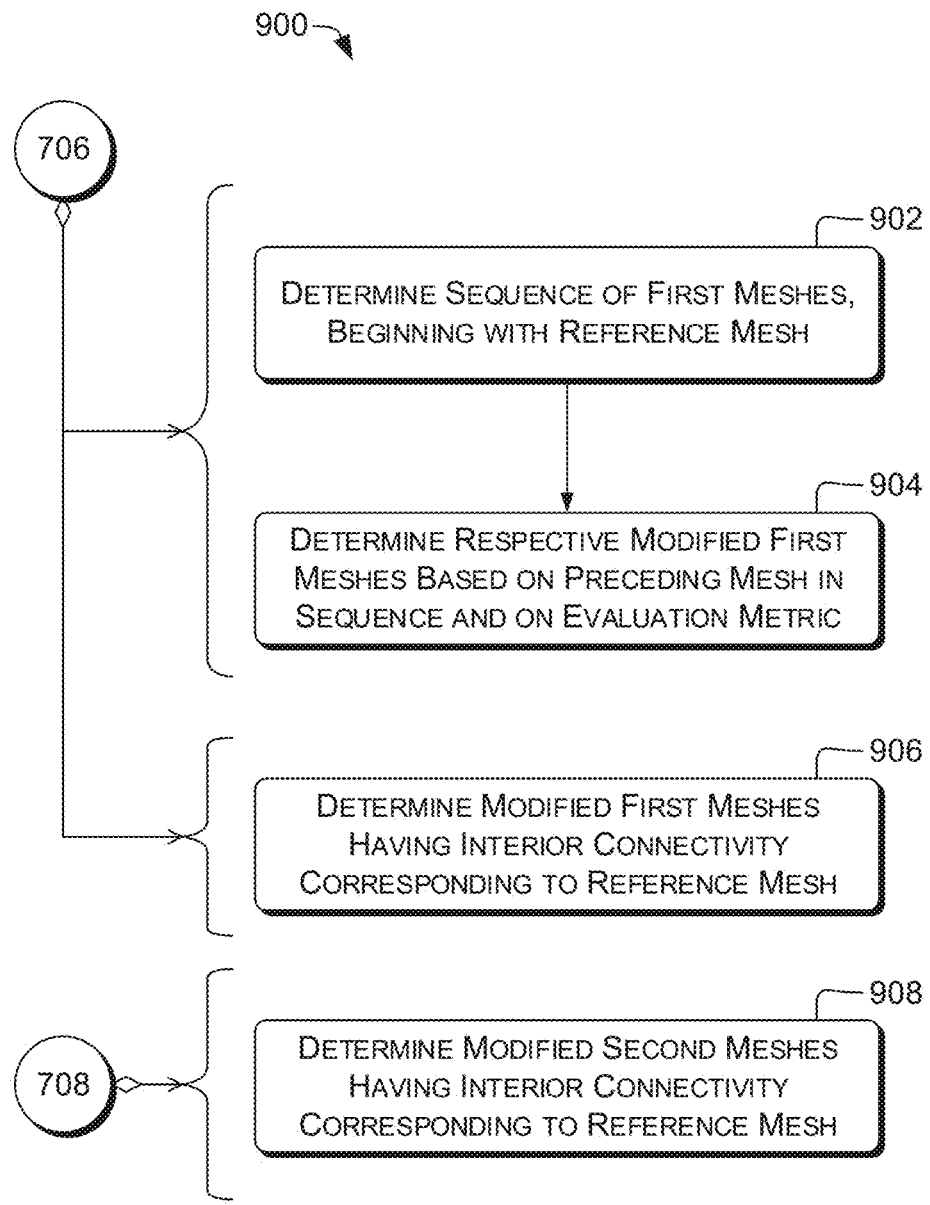
FIG. 9 is a flow diagram that illustrates an example process for synthesizing meshes.

FIG. 9 shows example processes 900 for synthesizing meshes. In some examples, block 706 of determining the modified first meshes can include blocks 902-904 or block 906. In some examples, block 708 of determining the modified second meshes can include performing functions described with reference to FIG. 9, but in the context of second meshes instead of first meshes. In some examples, block 708 can include block 908.

In some examples, at block 902, a sequence of the first meshes can be determined. The sequence of the first meshes can begin with the reference mesh determined at block 704, e.g., $F_a$. Examples are discussed herein, e.g., with reference to regularization module 204 and Table 1. For example, the sequence can be the order in which items are popped off stack Q in Table 1.

In some examples, at block 904, for one or more of the first meshes in the sequence other than the reference mesh, a respective modified first mesh can be determined based at least in part on a preceding first mesh in the sequence and a predetermined surface-deformation evaluation metric. For example, the surface-deformation evaluation metric can include determining to what extent a transformation is a deformation, e.g., not merely a rotation or translation. As indicated by the arrow, block 904 can be performed iteratively for a plurality of the first meshes other than the reference mesh, e.g., for each of the first meshes other than the reference mesh. Examples are discussed herein, e.g., with reference to regularization module 204, procedures PropagateSurface and DetailTransfer, and Table 1. For example, the modified first meshes can be determined by tracking connectivity outward from $F_a$, e.g., as described above in the nonlimiting example of $\alpha=s+2$ and $k=3$.

In some examples, at block 906, the modified first meshes can be determined further having an interior connectivity corresponding to the reference mesh based at least in part on the respective first meshes. In some examples using block 906, the connectivity discussed above with reference to block 706 can be a surface connectivity. By using block 906, the modified meshes can have both surface and volumetric connectivity. Examples are discussed herein, e.g., with reference to regularization module 204, procedure PropagateVolume, and Table 1.

In some examples, block 706 can be used with respect to meshes that do not include interior vertices. In some examples, blocks 706 and 906 can be used with respect to meshes that do include interior vertices, e.g., that have been tetrahedralized or otherwise provided with interior vertices. Using block 906 can permit more accurately reflecting in the synthetic meshes the shapes of captured meshes.

In some examples, at block 908, the modified second meshes can be determined based at least in part on the respective second meshes. The modified second meshes can have an interior connectivity corresponding to the reference mesh. This can be done, e.g., as described with reference to block 906 for the modified first meshes.

Figure 10:
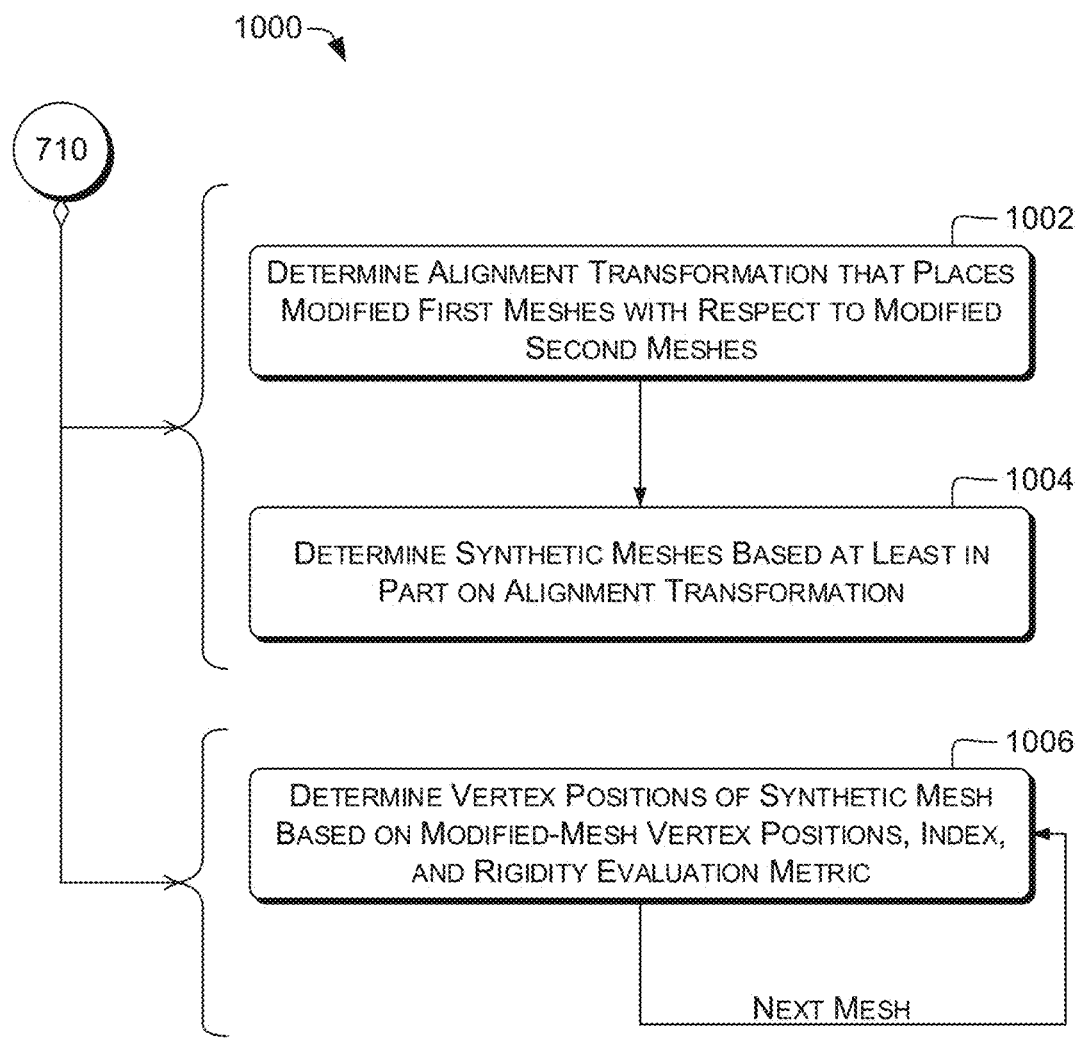
FIG. 10 is a flow diagram that illustrates an example process for synthesizing meshes.

FIG. 10 shows example processes 1000 for synthesizing meshes. In some examples, block 710 can include blocks 1002-1004, or 1006.

In some examples, at block 1002, an alignment transformation can be determined that places the modified first meshes with respect to the modified second meshes. Examples are discussed herein, e.g., with reference to mesh-synthesis module 206, procedure AlignWindows, Table 4, and Eqs. (20)-(22).

In some examples, at block 1004, the synthetic meshes can be determined further based at least in part on the alignment transformation. Examples are discussed herein, e.g., with reference to mesh-synthesis module 206, procedure Pose, Table 4, and Eq. (26).

In some examples, at block 1006, vertex positions of an individual mesh of the synthetic meshes can be determined based at least in part on vertex positions of the respective modified first mesh, vertex positions of the respective modified second mesh, a respective index in the synthetic meshes (e.g., index i, Eq. (24)), and a predetermined rigidity evaluation metric. Block 1006 can be performed multiple times for respective synthetic meshes ("Next Mesh" arrow). Examples are discussed herein, e.g., with reference to mesh-synthesis module 206, procedure FitARAP, Table 4, and Eqs. (23)-(25).

For example, the rigidity evaluation metric can include an $E_{ARAP}(\cdot)$ function such as that used in Eqs. (23) and (25). An example of such a function is given in Eq. (19). Using the rigidity evaluation metric in determining vertex positions can permit determining the individual mesh of the synthetic meshes having a shape substantially corresponding to the shapes of the respective modified first mesh and the respective modified second mesh. This can reduce deformation of shapes compared to prior schemes. For example, in a performance by a human actor, when interpolating between a mesh in which one of the character's arms is extended backwards and a mesh in which that arm is extended forwards, conventional per-vertex linear position interpolation can cause the character's arm to be significantly shorter in the interpolated mesh than in the original meshes. Using a rigidity evaluation metric can maintain rigidity of the shape of the arm, reducing the deformation of the arm in synthetic meshes as described herein compared to previous schemes.

Figure 11:
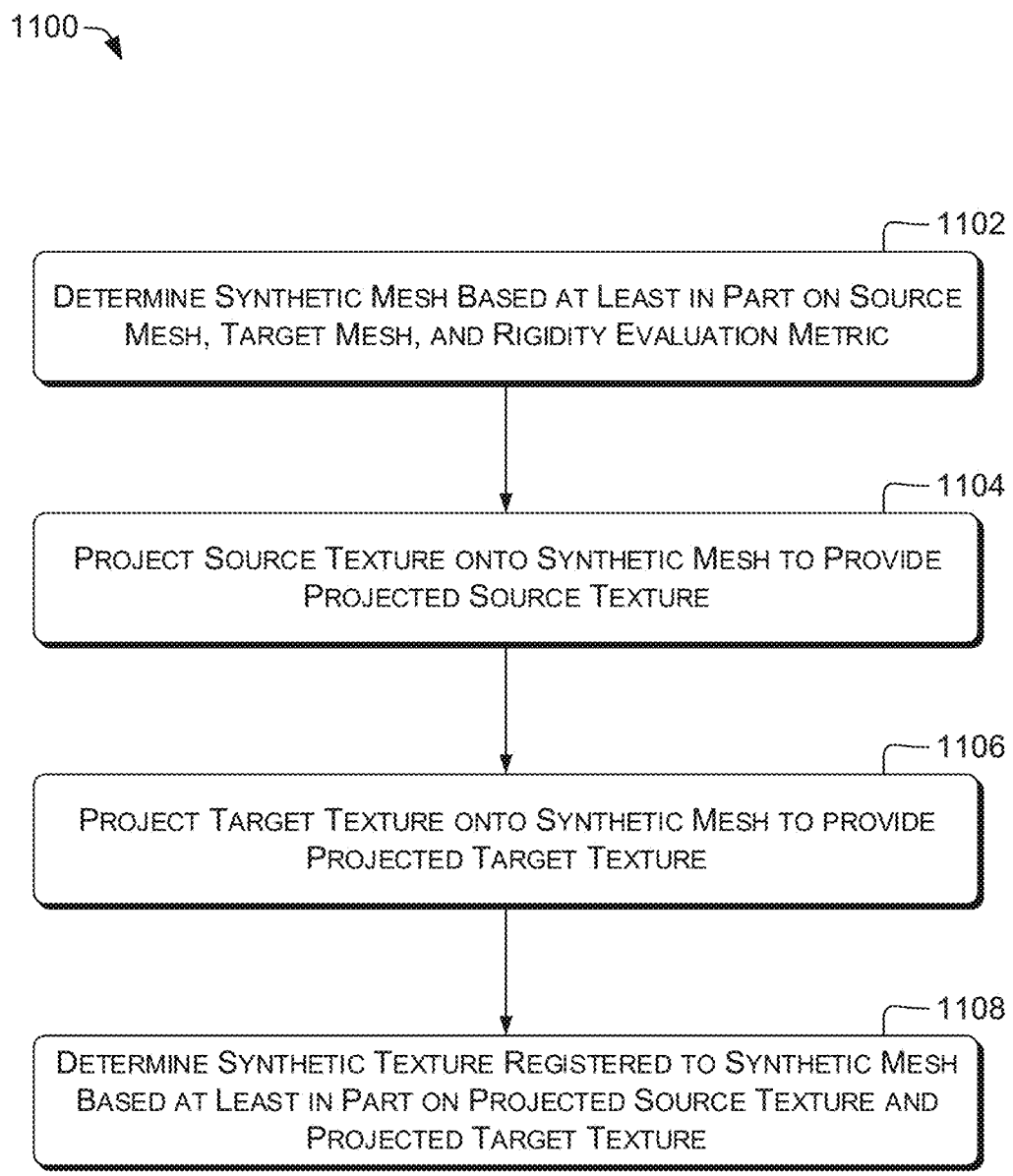
FIG. 11 is a flow diagram that illustrates an example process for synthesizing meshes and textures.

FIG. 11 shows an example process 1100 for synthesizing meshes and textures.

In some examples, at block 1102, a synthetic mesh is determined based at least in part on a source mesh of a source mesh sequence, a target mesh of a target mesh sequence, and a predetermined rigidity evaluation metric. Examples are discussed herein, e.g., with reference to mesh-synthesis module 206, FIGS. 5-10, e.g., block 1106, or portions of the discussion of FIGS. 2-4 referred to in the discussion of FIGS. 5-10.

In some examples, at block 1104, a source texture is projected onto the synthetic mesh to provide a projected source texture. Examples are discussed herein, e.g., with reference to texture-synthesis module 208, procedure ProjectTexture, and Table 4. In some examples in which texture data 122 includes projected data, block 1104 can be omitted.

In some examples, at block 1106, a target texture is projected onto the synthetic mesh to provide a projected target texture. This can be done, e.g., as discussed with reference to block 1104 with respect to the source texture. In some examples in which texture data 122 includes projected data, block 1106 can be omitted.

In some examples, at block 1108, a synthetic texture is determined. The synthetic texture can be determined based at least in part on the projected source texture and the projected target texture. The synthetic texture can be determined so that it is registered to the synthetic mesh, e.g., so that texels of the synthetic texture are associated with specific polys of the synthetic mesh or specific texture coordinates (e.g., barycentric coordinates) on those polys. Examples are discussed herein, e.g., with reference to the texture-synthesis module 208; Table 4, lines 2-4 and 8-11; Tables 5 and 6; procedures Advect, MeshOpticalFlow, and RefineFlow; and Eqs. (27)-(36).

Figure 12:
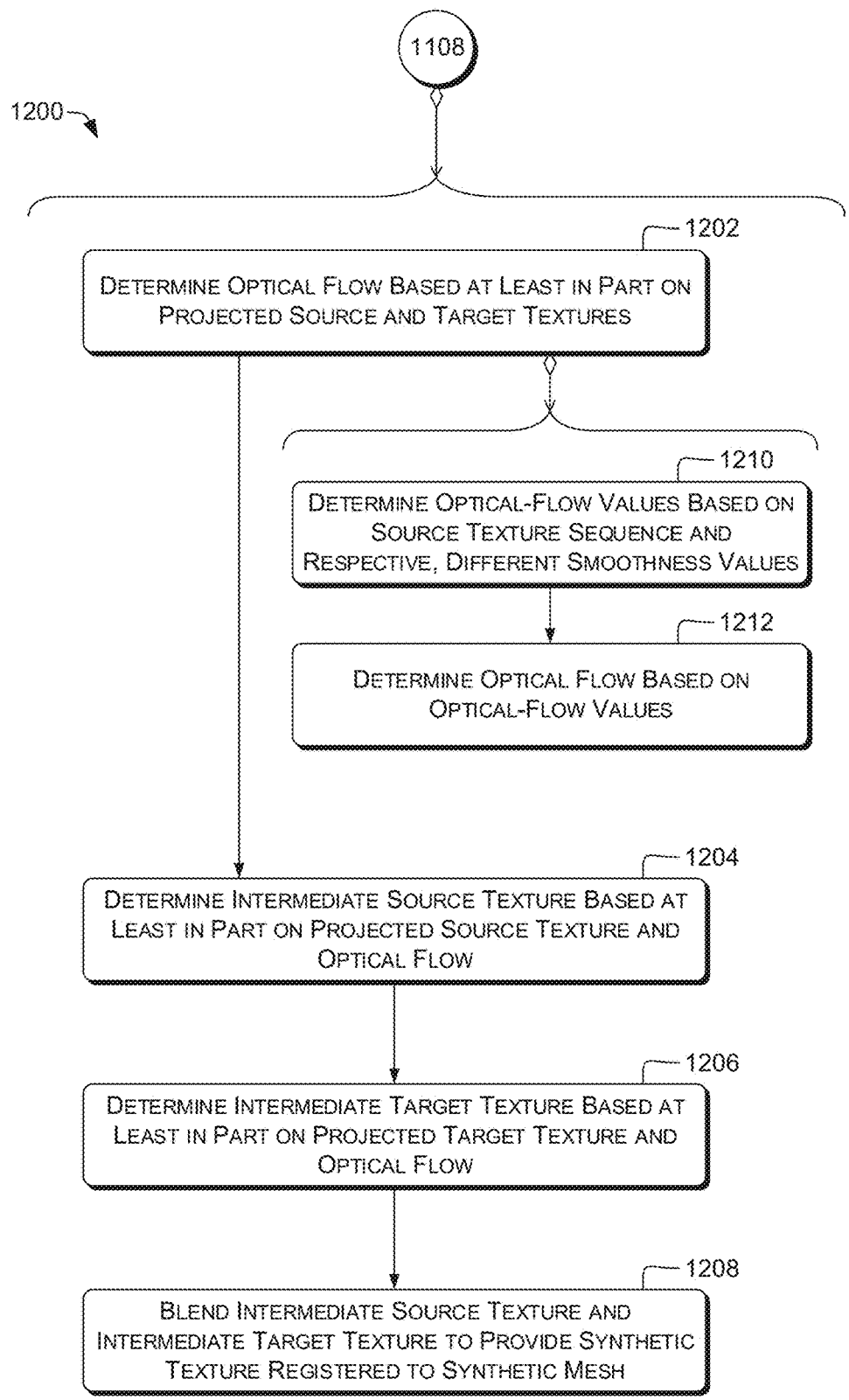
FIG. 12 is a flow diagram that illustrates an example process for synthesizing textures using optical flows.

FIG. 12 shows example processes 1200 for synthesizing textures. In some examples, block 1108 can include blocks 1202-1212.

In some examples, at block 1202, an optical flow can be determined based at least in part on the projected source texture and the projected target texture. For example, the optical flow can indicate the directions of motion of image data regions from the projected source texture to the projected target texture. Examples are discussed herein, e.g., with reference to the texture-synthesis module 208; Table 4, lines 2-4; Tables 5 and 6; procedures Advect, MeshOpticalFlow, RefineFlow, SmoothSignal, EstimateFlow, and GetScale; and Eqs. (27)-(36). In some examples, block 1202 can include blocks 1210 and 1212, discussed below.

In some examples, at block 1204, an intermediate source texture can be determined based at least in part on the projected source texture and the optical flow, e.g., by advecting the projected source texture according to the optical flow. Examples are discussed herein, e.g., with reference to the texture-synthesis module 208; Table 4, line 9; procedure Advect; and Eqs. (29)-(34).

In some examples, at block 1206, an intermediate target texture can be determined based at least in part on the projected target texture and the optical flow. Examples are discussed herein, e.g., with reference to block 1204 and Table 4, line 10.

In some examples, at block 1208, the intermediate source texture and the intermediate target texture can be blended to determine the synthetic texture. Examples are discussed herein, e.g., with reference to Table 4, lines 8 and 11. For example, linear blending can be performed between the intermediate source texture and the intermediate target texture. The amount of linear blending can be selected based on the index of the synthetic mesh in the transition, e.g., the index from −k to k over a transition such as synthetic transition sequence 310 or 312, FIG. 3.

In some examples, at block 1210, a plurality of optical-flow values can be determined based at least in part on the source texture sequence and respective, different smoothness values. Examples are discussed herein, e.g., with reference to procedure MeshOpticalFlow, Table 5, which calls procedure RefineFlow multiple times, each time with a different smoothness parameter $\in/4^l$.

In some examples, at block 1212, the optical flow can be determined based at least in part on the plurality of optical-flow values. Examples are discussed herein, e.g., with reference to procedure MeshOpticalFlow, Table 5, which accumulates the results of the RefineFlow calls into optical-flow field $\vec{v}$.

Figure 13:
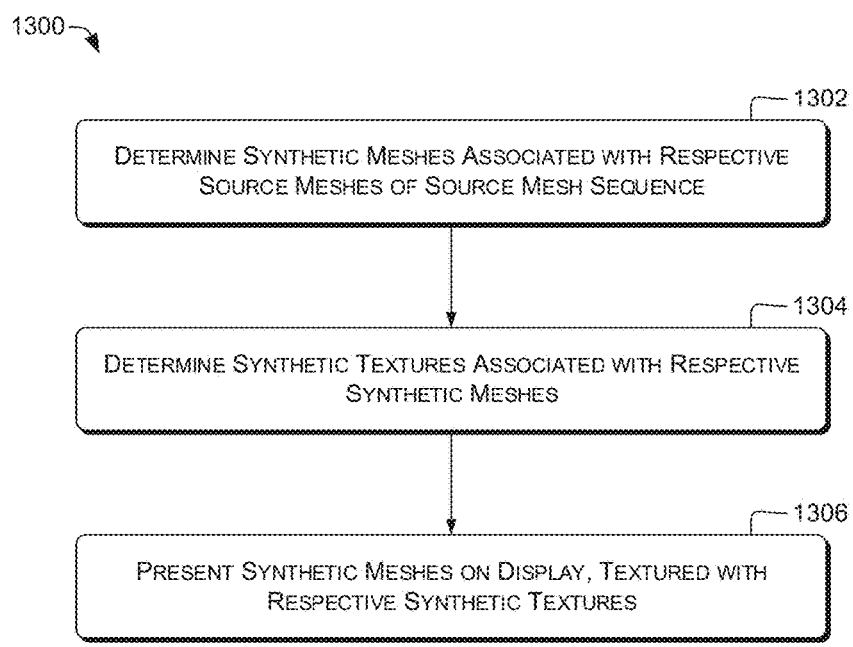
FIG. 13 is a flow diagram that illustrates an example process for determining or presenting synthetic meshes or textures.

FIG. 13 shows an example process 1300 for determining or presenting synthetic meshes or textures. In some examples, block 1108 can be followed by block 1302 or block 1306.

In some examples, at block 1302, a plurality of synthetic meshes can be determined, e.g., by an interactive process, for respective source meshes of the source mesh sequence. For example, each synthetic mesh can be determined as discussed herein with reference to block 1102. In some examples, block 1302 can include processing of the synthetic mesh in block 1102.

In some examples, at block 1304, a plurality of synthetic textures associated with respective synthetic meshes of the plurality of synthetic meshes can be determined, e.g., by an iterative process. For example, each synthetic texture can be determined as discussed herein with reference to blocks 1104-1108. In some examples, block 1304 can include processing of the synthetic texture in blocks 1104-1108.

In some examples, at block 1306, the synthetic meshes can be presented on a display, e.g., as video or still frame(s) of a production. The synthetic meshes can be textured with the respective synthetic textures for presentation. The synthetic meshes (and textures) can be presented sequentially. Examples are discussed herein, e.g., with reference to blocks 608, 614, or 616, or display 104.

Figure 14:
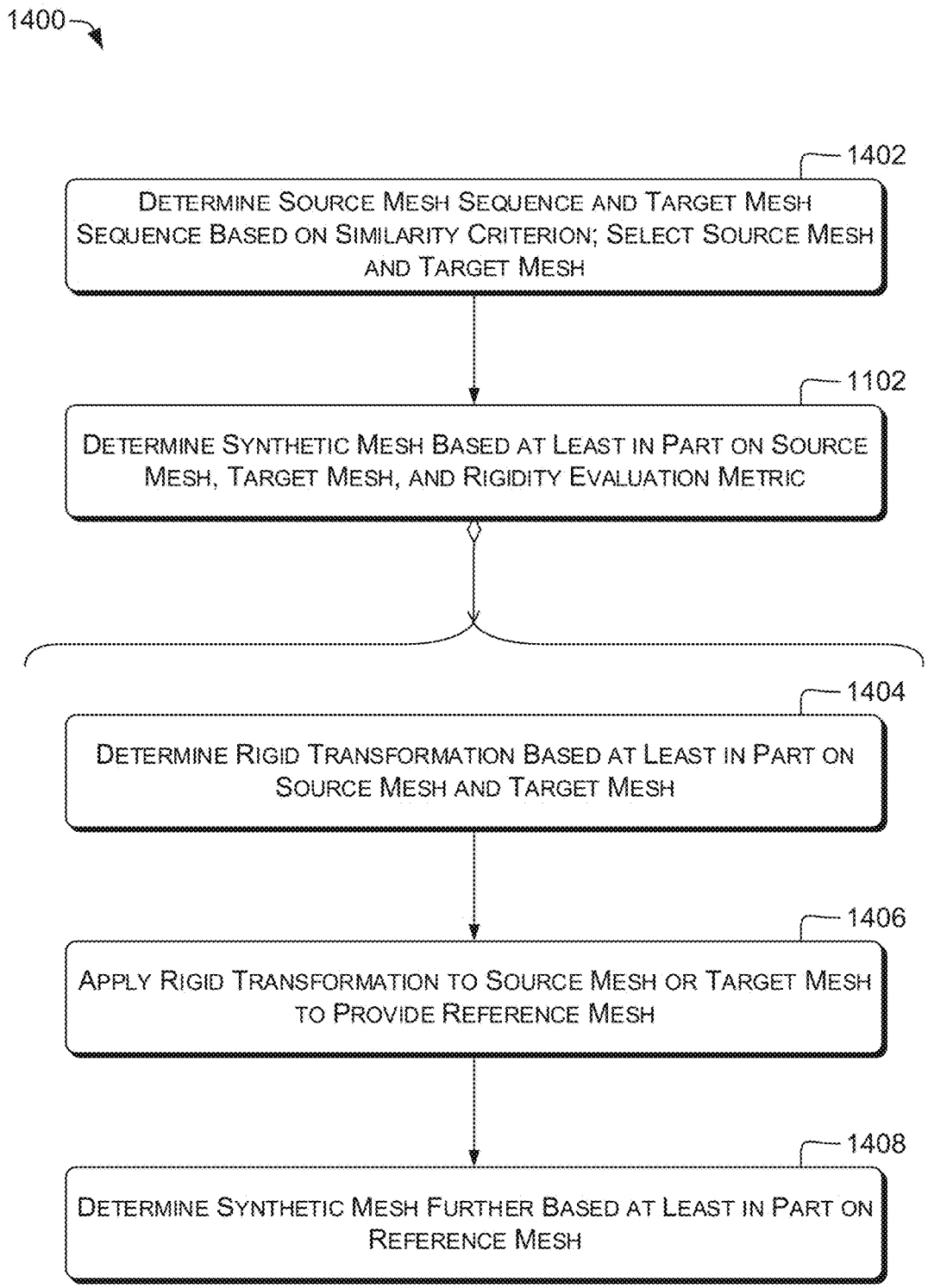
FIG. 14 is a flow diagram that illustrates an example process for synthesizing meshes.

FIG. 14 shows example processes 1400 for synthesizing meshes. In some examples, block 1102 can be preceded by block 1402. In some examples, block 1102 can include blocks 1404-1408.

In some examples, at block 1402, the source mesh sequence and the target mesh sequence can be determined from a mesh sequence based at least in part on a selected similarity criterion. Examples are discussed herein, e.g., with reference to windowing module 202. In some examples in which block 1402 is followed by block 1102, block 1402 can include selecting the source mesh from the source mesh sequence and selecting the target mesh from the target mesh sequence. Examples are discussed herein, e.g., with reference to windowing module 202, which can find frames $F_s$ and $F_t$ (the source mesh and the target mesh, respectively) as well as the windows $[F_{s-k}, F_{s+k}]$ and $[F_{t-k}, F_{t+k}]$ (the source mesh sequence and the target mesh sequence, respectively).

In some examples, at block 1404, a rigid transformation can be determined based on the source mesh and the target mesh. Examples are discussed herein, e.g., with reference to block 502.

In some examples, at block 1406, the rigid transformation can be applied to at least one of the source mesh or the target mesh to provide a reference mesh. Examples are discussed herein, e.g., with reference to blocks 502 and 508.

In some examples, at block 1408, the synthetic mesh can be determined further based at least in part on the reference mesh. Examples are discussed herein, e.g., with reference to mesh-synthesis module 206, block 710, and FIG. 10.

Figure 15:
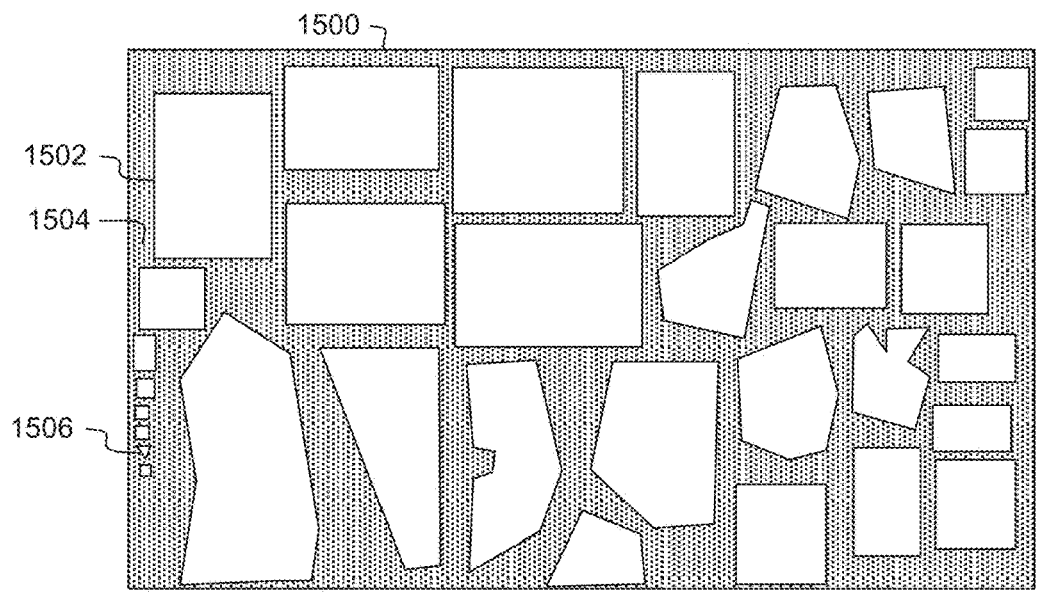
FIG. 15 is a graphical depiction of an example texture image.

FIG. 15 graphically depicts an example texture image 1500. Texture image 1500 can be, e.g., a bitmap or vector image defined to span a range of coordinates. Coordinates in texture image 1500 can be, e.g., (s, t) texture coordinates. Upon rendering, a particular mesh, e.g., a synthetic mesh, can be textured using image data from one texture image 1500, or from more than one texture image 1500. For clarity, image content is not shown in the graphical depiction of FIG. 15.

Texture image 1500 includes at least one texture region 1502, which can cover the full texture image 1500 or, as shown, less than the full the texture image. For clarity, although many texture regions 1502 are shown in texture image 1500, only one is labeled. Texture regions 1502 can be defined by metadata associated with texture image 1500. Additionally or alternatively, texture regions 1502 can be defined implicitly by (s, t) coordinates associated with vertices of the mesh being textured. For example, the texture of each rendered fragment of a poly can be determined by indexing texture image 1500 using (s, t) coordinates interpolated from (s, t) coordinates of that poly's vertices. In some examples, texture image 1500 can contain any content, e.g., black, transparent, or random image data, in area 1504 (shown hatched for clarity) outside texture regions 1502.

As shown, texture regions 1502 can have various sizes and shapes, and can be assembled into a texture image in various ways. In some examples, the edges of each texture region 1502 can correspond with edges of at least one poly. For example, texture region 1506 can correspond to exactly one triangle, in a nonlimiting example, or texture region 1502 can correspond to a plurality of triangles. References to texture regions 1502, taken collectively, can include texture region 1506.

In some examples of blocks 1104 or 1106, FIG. 11, the projected source texture and the projected target texture can be determined to have the same layout of texture regions, e.g., the layout of regions 1502 shown in texture image 1500.

Figure 16:
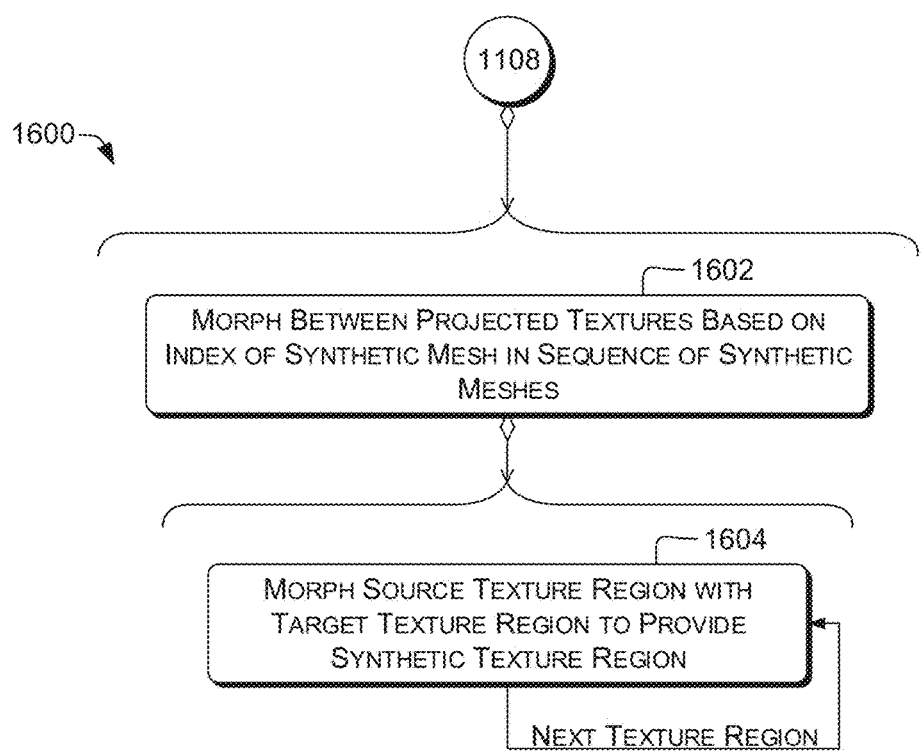
FIG. 16 is a flow diagram that illustrates an example process for synthesizing textures.

FIG. 16 shows example processes 1600 for synthesizing textures. In some examples, block 1108 can include blocks 1602 or 1604.

In some examples, at block 1602, the synthetic texture can be determined by morphing between the projected source texture and the projected target texture based at least in part on an index of the synthetic mesh in a sequence of synthetic meshes to provide the synthetic texture. For example, an interpolation percentage $\lambda_i \in [0,1]$ can be determined based on the index i in a synthetic transition sequence such as those discussed above with reference to FIG. 3. Morphing algorithms can then morph the projected source texture $\lambda_i$ percent of the way towards the projected source texture to determine the synthetic texture.

In some examples, block 1602 can include morphing a single image while respecting boundaries between texture regions 1502, discussed above with reference to FIG. 15. For example, a morphing algorithm or set of control points can be used that causes each texture region 1502 to be morphed without respect to any other texture region 1502, even if a single morphing operation is applied to an entire texture image 1500. This can permit efficiently determining synthetic texture images containing multiple texture regions 1502.

In some examples, at block 1604, individual source texture regions of the projected source texture can be separately morphed with respective target texture regions of the projected target texture to provide respective synthetic texture regions of the synthetic texture. For example, texture region 1502 of the projected source texture can be morphed with texture region 1502 of the projected target texture. Separately, texture region 1506 of the projected source texture can be morphed with texture region 1506 of the projected target texture. This can permit using a wide range of morphing algorithms, since the texture regions 1502 are separated before morphing. In some examples, block 1604 can include dividing projected source texture and the projected target texture into overlapping rectangles, and masking the areas outside those rectangles so differences between the projected source texture and the projected target texture in respective areas 1504 will not affect the morphing. Block 1604 can be executed multiple times for respective texture regions 1502, as depicted by the "Next Texture Region" arrow.

In some examples of blocks 1602 or 1604, morphing can be performed so that data are morphed only within texture regions 1502, and not between texture regions 1502. For example, at least one control point for the morph can be set on the boundary of a particular texture region 1502 in the projected source texture, and a corresponding control point can be set at substantially the same location in the projected target texture. In some examples, multiple morph control points can be set on the boundary of a particular texture region 1502 at corresponding locations in the projected source texture and the projected target texture. In some examples, such control points can be set on the respective boundaries of multiple texture regions 1502.

Table 7 shows examples of processes 1600 in the context of other operations described above with reference to Table 4. Table 7 shows pseudocode for procedure SynthesizeTransition2. In some examples, procedure SynthesizeTransition2 is used in place of procedure SynthesizeTransition. For example, any reference herein to procedure SynthesizeTransition can refer instead to procedure SynthesizeTransition2, in some examples. Table 7 shows a call to function Morph, which takes as input the projected source texture $L_{-k}^{st}$, the projected target texture $I_k^{st}$, and the interpolation parameter $\lambda_i$ discussed above, and provides as output the synthetic texture $I_i^{st}$. Morph can include any morphing routine or operation, e.g., image blending, image-registration algorithms such as stereo or optical-flow algorithms, halfway-domain morphing, map warping, color gradient similarity determination, structural similarity determination, cyclopean-coordinate morphing, or linear or nonlinear deformations.

TABLE 7

| | SynthesizeTransition2( $\overline{W}_s$, $\overline{W}_t$, $\in$, $\epsilon$, L ) |
|---|---|
| 1 | (o, R) ← AlignWindows( $\overline{F}_s$, $\overline{F}_t$ ) |
| 2 | $L_{-k}^{st}$ ← ProjectTexture( $F_{s-k}$, $I_{s-k}$, $F_{-k}^{st}$ ) |
| 3 | $I_k^{st}$ ← ProjectTexture( $F_{t+k}$, $I_{t+k}$, $F^{st}$ ) |
| 5 | for i ∈ [−k, k]: |
| 6 | $\overline{F}_i^{st}$ ← FitARAP( $\overline{F}_{s+i}$, $\overline{F}_{t+i}$, R ) |
| 7 | $\overline{F}_i^{st}$ ← Pose( $\overline{F}_{s+i}$, $\overline{F}_{t+i}$, $\overline{F}_i^{st}$, R , o ) |
| 8 | $\lambda_i$ ← $^{i + k}/_{2k}$ |
| 9 | $I_i^{st}$ ← Morph( $L_{-k}^{st}$, $I_k^{st}$, $\lambda_i$ ) |

Illustrative Components

Figure 17:
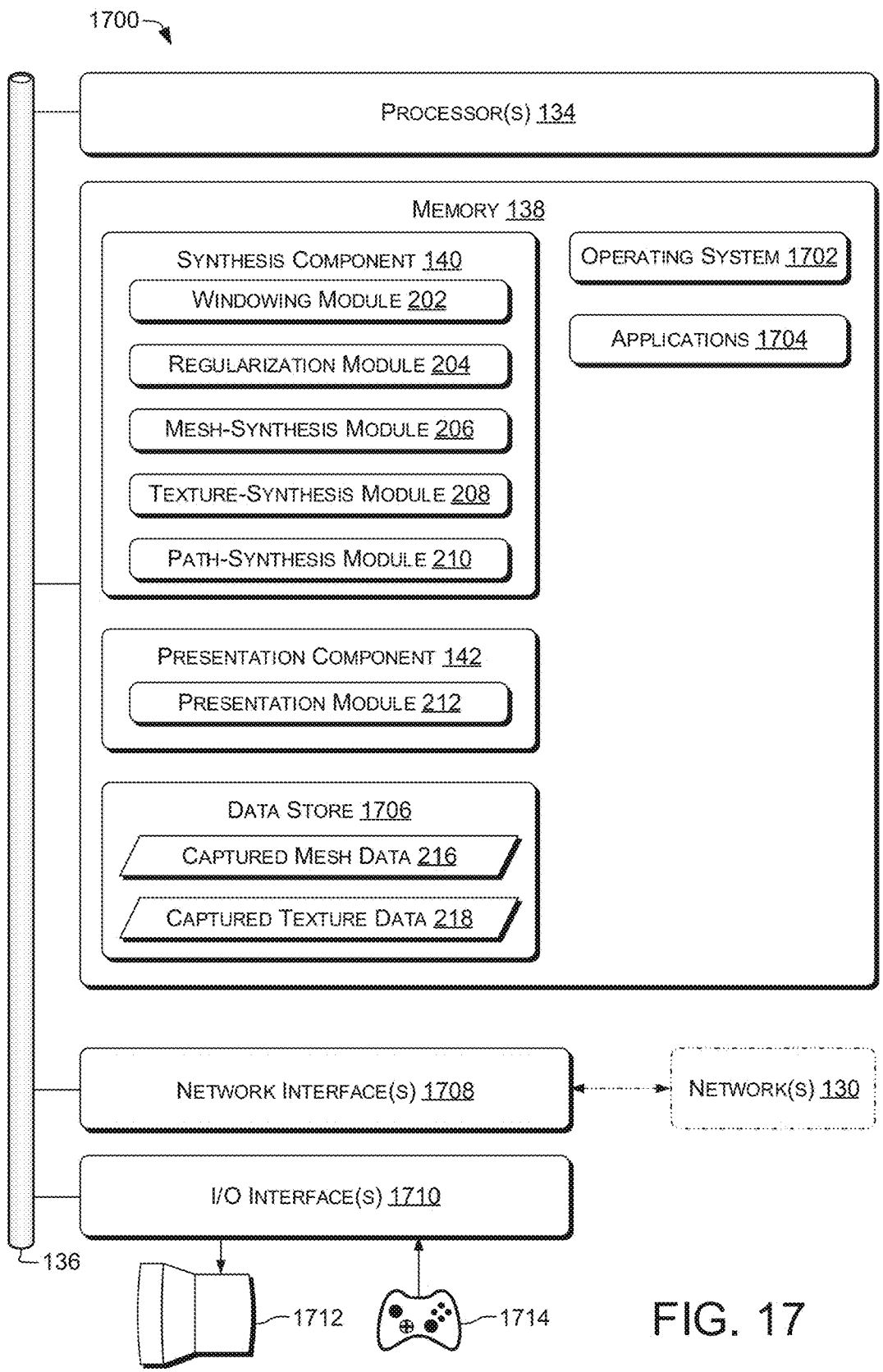
FIG. 17 is a block diagram depicting an example computing device configured to participate in character synthesis or presentation according to various examples described herein.

FIG. 17 illustrates select components of an example computing device 1700, which can represent computing devices 102 or 106, or capture controller 114. In the illustrated example, computing device 1700 includes one or more processor(s) 134 communicatively coupled with a memory 138. Memory 138 can be implemented as any combination of various types of memory components, e.g., computer-readable media (CRM) or computer storage media components. Examples of possible memory components include a random access memory (RAM), a disk drive, a mass storage component, and a non-volatile memory (e.g., ROM, Flash, EPROM, EEPROM, etc.). Alternative implementations of computing device 1700 can include a range of processing and memory capabilities. For example, full-resource computing devices can be implemented with substantial memory and processing resources, including a disk drive to store content for replay by the viewer. Low-resource computing devices, however, can have limited processing and memory capabilities, such as a limited amount of RAM, no disk drive, and limited processing capabilities.

Processor(s) 134 process various instructions to control the operation of computing device 1700 and to communicate with other electronic and computing devices. For example, the processor(s) 134 can be configured to execute modules of a plurality of modules, discussed above with reference to FIG. 2, on the memory 138. In some examples, the computer-executable instructions stored on the memory 138 can, upon execution, configure a computer such as a computing device 1700 to perform operations described herein with reference to, e.g., synthesis component 140 or modules thereof. The modules stored in the memory 138 can include instructions that, when executed by the one or more processor(s) 134, cause the one or more processor(s) 134 to perform operations described herein.

The memory 138 stores various information or data, including, for example, at least a synthesis component 140, a presentation component 142, an operating system 1702, or one or more other applications 1704. Functionality described associated with the illustrated components or modules can be combined to be performed by a fewer number of components or modules or can be split and performed by a larger number of components or modules. The other applications 1704 can include, for example, an Internet browser such as a Web browser, a media player application, a video editing application, a video streaming application, a television viewing application, and so on. In some examples, computer-executable instructions of synthesis component 140, presentation component 142, or applications 1704 stored in at least one computer-readable medium (e.g., memory 138), when executed on processor 134 of computing device 1700, direct computing device 1700 to perform functions listed herein with respect to the relevant components in memory 138.

In some examples, synthesis component 140 synthesizes meshes, textures, or paths. This can be as described above with reference to FIGS. 2-14, e.g., using algorithms such as those described above. In some examples, presentation component 142 presents characters or productions, e.g., via display 104 or 1712 (discussed below). This can be as described above with reference to FIG. 2, 6, or 13, e.g., using algorithms such as those described above.

In the illustrated example, memory 138 includes a data store 1706. In some examples, data store 1706 can store information described above with reference to FIG. 2, e.g., information of capture 128, captured mesh data 216, or captured texture data 218.

The illustrated computing device 1700 can include one or more network interface(s) 1708 that can permit computing device 1700 to communicate with other computing devices 1700 via one or more network(s) 130. For example, network interface(s) 1708 can establish or facilitate receiving wired or wireless network service. In some examples, at least one of the network interface(s) 1708 can include, but is not limited to, a transceiver for Ethernet, cellular (3G, 4G, or other), WI-FI, ultra-wideband (UWB), BLUETOOTH, satellite, or other wireless transmissions. At least one of the network interface(s) 1708 can include a wired I/O interface, such as an Ethernet interface, a serial interface, a Universal Serial Bus (USB) interface, an INFINIBAND interface, or other wired interfaces.

The illustrated computing device 1700 can include one or more input/output (I/O) interfaces 1710, that can include, or be communicatively connected with, for example, a display device 1712 (which can represent display 104), enabling computing device 1700 to present video content. In example implementations, I/O interface 1710 provides signals to a touchscreen or other display device that displays, e.g., Web pages of captive portals. In some examples, computing device 1700 can be configured to present, on display device 1712, one or more captured or synthetic meshes or textures.

I/O interface(s) 1710 can additionally or alternatively include, or be communicatively connected with, for example, a user-operable input device 1714 (graphically represented as a gamepad), enabling a user to, e.g., direct computing device 1700 to establish connections to specific destinations. User-operable input device 1714 can include, e.g., a touch sensor over a touchscreen, a user-operable button, switch, or other physical input control, an optical sensor, e.g., to detect finger position with respect to a screen, a mouse, a trackball, a joystick, or a pointing stick such as a TRACKPOINT. In some examples, user-operable input device 1714 can be operated by an entity 110 to provide an indication of a goal mesh, e.g., as discussed herein with reference to block 610.

Although shown separately, some of the components of computing device 1700 can be implemented together in a single hardware device, such as in a Field-Programmable Gate Array (FPGA), an Application Specific Integrated Circuit (ASIC), Application-specific Standard Product (ASSP), System-On-a-Chip system (SoC), Complex Programmable Logic Device (CPLD), Digital Signal Processor (DSP), or other type of customizable processor. For example, a processor 134 can represent a hybrid device, such as a device from ALTERA or XILINX that includes a CPU core embedded in an FPGA fabric. These or other hardware logic components can operate independently or, in some instances, can be driven by a CPU. In some examples, processor 134 can be or include one or more single-core processors, multi-core processors, central processing unit (CPUs), graphics processing units (GPUs), general-purpose GPUs (GPGPUs), or hardware logic components configured, e.g., via specialized programming from modules or APIs, to perform functions described herein.

Additionally, a system bus 136 typically connects the various components within computing device 1700. A system bus 136 can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, e.g., a Mezzanine bus.

Any of the components illustrated in FIG. 17 can be implemented in hardware, software, or a combination of hardware and software. Further, any of the components illustrated in FIG. 17, e.g., memory 138, can be implemented using any form of computer-readable media that is accessible by computing device 1700, either locally or remotely, including over a network 130. Computer-readable media includes two types of computer-readable media, namely computer storage media and communications media. Computer storage media (e.g., a computer storage medium) includes tangible storage units such as volatile memory, nonvolatile memory, or other persistent or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including, but not limited to, random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, or storage media that can be used to store and maintain information for access by a computing device 1700.

In contrast to computer storage media, communication media can embody computer-readable instructions, data structures, program modules, or other data in a modulated data signal, such as a carrier wave, or other transmission mechanism. As defined herein, computer storage media does not include communication media. In some examples, memory 138 can be or include computer storage media.

Example Clauses

A: A system comprising: at least one processor; and a memory storing instructions that, when executed by the at least one processor, cause the at least one processor to perform operations comprising: determining a rigid transformation based on a first source mesh of a source mesh sequence and a first target mesh of a target mesh sequence; determining respective interpolation weights associated with individual source meshes of the source mesh sequence based on respective indices of the individual source meshes in the source mesh sequence; determining respective synthetic meshes based at least in part on the individual source meshes, respective target meshes of the target mesh sequence, and the respective interpolation weights; and placing the respective synthetic meshes based at least in part on the rigid transformation to define a processor-generated character.

B: The system according to paragraph A, the operations for placing comprising: determining respective alignment transformations that place the respective synthetic meshes with respect to the respective meshes of the source mesh sequence and the target mesh sequence; and displacing the respective synthetic meshes by the respective alignment transformations to provide displaced synthetic meshes.

C: The system according to paragraph A or B, further comprising a display, the operations further comprising presenting the synthetic meshes sequentially on the display.

D: The system according to any of paragraphs A-C, the operations further comprising: determining a motion graph associated with a plurality of meshes, wherein: the plurality of meshes comprises at least some of the source meshes, at least some of the target meshes, and at least some of the synthetic meshes; and the motion graph comprises a plurality of directional edges connecting a first respective mesh of the plurality of meshes to a second respective mesh of the plurality of meshes; and determining respective transition probabilities associated with edges in the motion graph based at least in part on both the number of directional edges of the motion graph and the number of meshes of the plurality of meshes.

E: The system according to paragraph D, the operations further comprising determining the respective transition probabilities so that respective visit probabilities of individual meshes of the plurality of meshes are closer to uniform than are respective reference visit probabilities of the individual meshes of the plurality of meshes with respect to substantially uniform reference transition probabilities.

F: The system according to paragraph D or E, further comprising a display, the operations further comprising: determining a sequence of meshes based at least in part on the motion graph and the transition probabilities; and rendering meshes of the sequence of meshes sequentially on the display.

G: The system according to paragraph F, further comprising a user-operable input device, the operations further comprising: receiving an indication of a goal mesh of the plurality of meshes via the user-operable input device; determining a path via the directional edges of the motion graph from a current mesh presented on the display to the goal mesh; and rendering the sequence of meshes along the path sequentially on the display.

H: A method, comprising, under control of a processor: determining a first subset of a mesh sequence and a second subset of a mesh sequence based at least in part on a selected similarity criterion, wherein the first subset includes first meshes of the mesh sequence and the second subset includes second meshes of the mesh sequence; determining a reference mesh of the first meshes and the second meshes; determining modified first meshes having a connectivity corresponding to the reference mesh based at least in part on the respective first meshes and the reference mesh; determining modified second meshes having a connectivity corresponding to the reference mesh based at least in part on the respective second meshes and the reference mesh; and determining synthetic meshes based at least in part on the respective modified first meshes and the respective modified second meshes.

I: The method according to paragraph H, wherein determining the first subset and the second subset comprises: determining a first candidate mesh of the mesh sequence and a second candidate mesh of the mesh sequence; determining an alignment transformation that places the first candidate mesh with respect to the second candidate mesh to provide a placed candidate mesh; and determining a distance value between the placed candidate mesh and the second candidate mesh.

J: The method according to paragraph H or I, wherein: determining the first subset and the second subset comprises: determining a plurality of distance values between first candidate meshes of the mesh sequence and respective second candidate meshes of the mesh sequence; and determining the first subset and the second subset based at least in part on the plurality of distance values; and the method further comprises: determining a third subset of the mesh sequence and a fourth subset of the mesh sequence based at least in part on the plurality of distance values, a reference index of the first subset in the mesh sequence, and a reference index of the second subset in the mesh sequence.

K: The method according to any of paragraphs H-J, wherein determining the modified first meshes comprises: determining a sequence of the first meshes beginning with the reference mesh; and iteratively determining, for individual first meshes of the first meshes in the sequence other than the reference mesh, the respective modified first mesh based at least in part on a preceding first mesh in the sequence and a predetermined surface-deformation evaluation metric.

L: The method according to any of paragraphs H-K, wherein the connectivity is a surface connectivity and the method further comprises: determining the modified first meshes further having an interior connectivity corresponding to the reference mesh based at least in part on the respective first meshes; and determining the modified second meshes further having an interior connectivity corresponding to the reference mesh based at least in part on the respective first meshes.

M: The method according to any of paragraphs H-L, further comprising: determining an alignment transformation that places the modified first meshes with respect to the modified second meshes; and determining the synthetic meshes further based at least in part on the alignment transformation.

N: The method according to any of paragraphs H-M, wherein determining the synthetic meshes further comprises: determining vertex positions of an individual mesh of the synthetic meshes based at least in part on vertex positions of the respective modified first mesh, vertex positions of the respective modified second mesh, a respective index in the synthetic meshes, and a predetermined rigidity evaluation metric.

O: At least one computer-readable medium storing computer-executable instructions that, when executed by at least one processor of a computer, configure the computer to perform acts comprising: determining a synthetic mesh based at least in part on a source mesh of a source mesh sequence, a target mesh of a target mesh sequence, and a predetermined rigidity evaluation metric; projecting a source texture onto the synthetic mesh to provide a projected source texture; projecting a target texture onto the synthetic mesh to provide a projected target texture; and determining a synthetic texture registered to the synthetic mesh based at least in part on the projected source texture and the projected target texture.

P: The at least one computer-readable medium according to paragraph O, the acts further comprising morphing between the projected source texture and the projected target texture based at least in part on an index of the synthetic mesh in a sequence of synthetic meshes to provide the synthetic texture.

Q: The at least one computer-readable medium according to paragraph P, the acts further comprising separately morphing individual source texture regions of the projected source texture with respective target texture regions of the projected target texture to provide respective synthetic texture regions of the synthetic texture.

R: The at least one computer-readable medium according to paragraph P or Q, the acts further comprising: iteratively determining a plurality of synthetic meshes associated with respective source meshes of the source mesh sequence; iteratively determining a plurality of synthetic textures associated with respective synthetic meshes of the plurality of synthetic meshes; and presenting the synthetic meshes textured with the respective synthetic textures on a display.

S: The at least one computer-readable medium according to any of paragraphs P-R, the acts further comprising: determining a rigid transformation based on the source mesh and the target mesh; applying the rigid transformation to at least one of the source mesh or the target mesh to provide a reference mesh; and determining the synthetic mesh further based at least in part on the reference mesh.

T: The at least one computer-readable medium according to any of paragraphs P-S, the acts further comprising: determining the source mesh sequence and the target mesh sequence from a mesh sequence based at least in part on a selected similarity criterion.

U: The at least one computer-readable medium according to any of paragraphs O-T, the acts further comprising: determining an optical flow based at least in part on the projected source texture and the projected target texture; determining an intermediate source texture based at least in part on the projected source texture and the optical flow; determining an intermediate target texture based at least in part on the projected target texture and the optical flow; and blending the intermediate source texture and the intermediate target texture to determine the synthetic texture.

V: The at least one computer-readable medium according to paragraph U, the acts further comprising: determining a plurality of optical-flow values based at least in part on the source texture sequence and respective, different smoothness values; and determining the optical flow based at least in part on the plurality of optical-flow values.

W: A system, comprising: means for determining a first subset of a mesh sequence and a second subset of a mesh sequence based at least in part on a selected similarity criterion, wherein the first subset includes first meshes of the mesh sequence and the second subset includes second meshes of the mesh sequence; means for determining a reference mesh of the first meshes and the second meshes; means for determining modified first meshes having a connectivity corresponding to the reference mesh based at least in part on the respective first meshes and the reference mesh; means for determining modified second meshes having a connectivity corresponding to the reference mesh based at least in part on the respective second meshes and the reference mesh; and means for determining synthetic meshes based at least in part on the respective modified first meshes and the respective modified second meshes.

X: The system according to paragraph W, wherein the means for determining the first subset and the second subset comprises: means for determining a first candidate mesh of the mesh sequence and a second candidate mesh of the mesh sequence; means for determining an alignment transformation that places the first candidate mesh with respect to the second candidate mesh to provide a placed candidate mesh; and means for determining a distance value between the placed candidate mesh and the second candidate mesh.

Y: The system according to paragraph W or X, wherein: the means for determining the first subset and the second subset comprises: means for determining a plurality of distance values between first candidate meshes of the mesh sequence and respective second candidate meshes of the mesh sequence; and means for determining the first subset and the second subset based at least in part on the plurality of distance values; and the system further comprises: means for determining a third subset of the mesh sequence and a fourth subset of the mesh sequence based at least in part on the plurality of distance values, a reference index of the first subset in the mesh sequence, and a reference index of the second subset in the mesh sequence.

Z: The system according to any of paragraphs W-Y, wherein the means for determining the modified first meshes comprises: means for determining a sequence of the first meshes beginning with the reference mesh; and means for iteratively determining, for individual first meshes of the first meshes in the sequence other than the reference mesh, the respective modified first mesh based at least in part on a preceding first mesh in the sequence and a predetermined surface-deformation evaluation metric.

AA: The system according to any of paragraphs W-Z, wherein the connectivity is a surface connectivity and the system further comprises: means for determining the modified first meshes further having an interior connectivity corresponding to the reference mesh based at least in part on the respective first meshes; and means for determining the modified second meshes further having an interior connectivity corresponding to the reference mesh based at least in part on the respective first meshes.

AB: The system according to any of paragraphs W-AA, further comprising: means for determining an alignment transformation that places the modified first meshes with respect to the modified second meshes; and means for determining the synthetic meshes further based at least in part on the alignment transformation.

AC: The system according to any of paragraphs W-AB, wherein the means for determining the synthetic meshes further comprises: means for determining vertex positions of an individual mesh of the synthetic meshes based at least in part on vertex positions of the respective modified first mesh, vertex positions of the respective modified second mesh, a respective index in the synthetic meshes, and a predetermined rigidity evaluation metric.

AD: A computer-readable medium, e.g., a computer storage medium, having thereon computer-executable instructions, the computer-executable instructions upon execution configuring a computer to perform operations as any of paragraphs H-N recites.

AE: A device comprising: a processor; and a computer-readable medium, e.g., a computer storage medium, having thereon computer-executable instructions, the computer-executable instructions upon execution by the processor configuring the device to perform operations as any of paragraphs H-N recites.

AF: A system comprising: means for processing; and means for storing having thereon computer-executable instructions, the computer-executable instructions including means to configure the system to carry out a method as any of paragraphs H-N recites.

AG: A method comprising performing operations as any of paragraphs A-G recites.

AH: A method comprising performing operations as any of paragraphs O-V recites.

Conclusion

Character-synthesis techniques described herein can synthesize mesh, texture, and/or path data more efficiently than prior schemes, and operating on a wider range of inputs than do prior schemes. Some examples can synthesize transition sequences between windows that have characters in different orientations.

Although character synthesis has been described in language specific to structural features or methodological steps, it is to be understood that the invention defined in the appended claims is not necessarily limited to the specific features or steps described. Rather, the specific features and steps are disclosed as preferred forms of implementing the claimed invention.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, or executed in parallel to implement the described processes. The described processes can be performed by resources associated with one or more computing device(s) 1700, such as one or more internal or external CPUs or GPUs, or one or more pieces of hardware logic such as FPGAs, DSPs, or other types of accelerators.

The methods and processes described above can be embodied in, and fully automated via, software code modules executed by one or more general purpose computers or processors. The code modules can be stored in any type of computer-readable storage medium or other computer storage medium. Some or all of the methods can alternatively be embodied in specialized computer hardware.

Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" and the phrase "and/or" are used herein in an inclusive sense unless specifically stated otherwise. Accordingly, conjunctive language such as, but not limited to, at least the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ).

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. Examples herein are nonlimiting unless expressly stated otherwise, regardless of whether or not any particular example is expressly described as being nonlimiting. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:

1. A system comprising: at least one processor; and a memory storing instructions that, when executed by the at least one processor, cause the at least one processor to perform operations comprising:
   determining a rigid transformation based on a beginning source mesh of a source mesh sequence and a selected target mesh of a target mesh sequence, wherein the source mesh sequence and the target mesh sequence each comprise a plurality of individual meshes, respectively;
   determining respective interpolation weights associated with the plurality of individual source meshes of the source mesh sequence based on respective indices of the individual source meshes in the source mesh sequence,
   wherein a first respective interpolation weight is assigned to a first individual source mesh of the source mesh sequence with a first coordinate, along a z-axis,
   wherein a second respective interpolation weight is assigned to a second individual source mesh of the source mesh sequence with a second coordinate, along the z-axis,
   wherein the first coordinate is nearer a ground plane along the z-axis than the second coordinate, and
   wherein, because first coordinate is nearer the ground plane, the first respective interpolation weight is greater than the second respective interpolation weight;
   generating respective synthetic meshes based at least in part on the plurality of individual source meshes, respective target meshes of the target mesh sequence, and the respective interpolation weights; and
   placing the respective synthetic meshes based at least in part on the rigid transformation to define a processor-generated character.

2. The system according to claim 1, the operations for placing comprising: determining respective alignment transformations that place the respective synthetic meshes with respect to the respective plurality of individual meshes of the source mesh sequence and the target mesh sequence; and displacing the respective synthetic meshes by the respective alignment transformations to provide displaced synthetic meshes.

3. The system according to claim 1, further comprising a display, the operations further comprising presenting the synthetic meshes sequentially on the display.

4. The system according to claim 1, the operations further comprising: determining a motion graph associated with a sub-grouping of meshes,
   wherein: the sub-grouping of meshes comprises at least some of the source meshes, at least some of the target meshes, and at least some of the synthetic meshes; and the motion graph comprises a plurality of directional edges connecting a first respective mesh of the sub-grouping of meshes to a second respective mesh of the sub-grouping of meshes; and
   determining respective transition probabilities associated with edges in the motion graph based at least in part on both the number of directional edges of the motion graph and the number of meshes of the plurality sub-grouping of meshes.

5. The system according to claim 4, the operations further comprising determining the respective transition probabilities so that respective visit probabilities of individual meshes of the sub-grouping of meshes are closer to uniform than are respective reference visit probabilities of the individual meshes of the sub-grouping of meshes with respect to substantially uniform reference transition probabilities.

6. The system according to claim 4, further comprising a display, the operations further comprising: determining a sequence of meshes based at least in part on the motion graph and the transition probabilities; and rendering meshes of the sequence of meshes sequentially on the display.

7. The system according to claim 6, further comprising a user-operable input device, the operations further comprising: receiving an indication of a goal mesh of the sub-grouping of meshes via the user-operable input device; determining a path via the directional edges of the motion graph from a current mesh presented on the display to the goal mesh; and rendering the sequence of meshes along the path sequentially on the display.

8. A method performed by a processor, the method comprising:
   determining a rigid transformation based on a beginning source mesh of a source mesh sequence and a selected target mesh of a target mesh sequence, wherein the source mesh sequence and the target mesh sequence each comprise a plurality of individual meshes, respectively;
   determining respective interpolation weights associated with the plurality of individual source meshes of the source mesh sequence based on respective indices of the individual source meshes in the source mesh sequence,
   wherein a first respective interpolation weight is assigned to a first individual source mesh of the source mesh sequence with a first coordinate, along a z-axis,
   wherein a second respective interpolation weight is assigned to a second individual source mesh of the source mesh sequence with a second coordinate, along the z-axis,
   wherein the first coordinate is nearer a ground plane along the z-axis than the second coordinate, and
   wherein, because first coordinate is nearer the ground plane, the first respective interpolation weight is greater than the second respective interpolation weight;
   generating respective synthetic meshes based at least in part on the plurality of individual source meshes, respective target meshes of the target mesh sequence, and the respective interpolation weights; and
   placing the respective synthetic meshes based at least in part on the rigid transformation to define a processor-generated character.

9. The method according to claim 8, wherein placing the respective synthetic meshes comprises: determining respective alignment transformations that place the respective synthetic meshes with respect to the respective plurality of individual meshes of the source mesh sequence and the target mesh sequence; and displacing the respective synthetic meshes by the respective alignment transformations to provide displaced synthetic meshes.

10. The method according to claim 8, further comprising presenting the synthetic meshes sequentially on a display.

11. The method according to claim 8, further comprising: determining a motion graph associated with a sub-grouping of meshes,
wherein: the sub-grouping of meshes comprises at least some of the source meshes, at least some of the target meshes, and at least some of the synthetic meshes; and the motion graph comprises a plurality of directional edges connecting a first respective mesh of the sub-grouping of meshes to a second respective mesh of the sub-grouping of meshes; and
determining respective transition probabilities associated with edges in the motion graph based at least in part on both the number of directional edges of the motion graph and the number of meshes of the sub-grouping of meshes.

12. The method according to claim 11, further comprising determining the respective transition probabilities so that respective visit probabilities of individual meshes of the sub-grouping of meshes are closer to uniform than are respective reference visit probabilities of the individual meshes of the sub-grouping of meshes with respect to substantially uniform reference transition probabilities.

13. The method according to claim 11, further comprising determining a sequence of meshes based at least in part on the motion graph and the transition probabilities; and rendering meshes of the sequence of meshes sequentially on a display.

14. The method according to claim 13, further comprising receiving an indication of a goal mesh of the sub-grouping of meshes via a user-operable input device; determining a path via the directional edges of the motion graph from a current mesh presented on the display to the goal mesh; and rendering the sequence of meshes along the path sequentially on the display.

15. A non-transitory computer readable medium having stored thereon instructions that when executed by a processor cause the processor to conduct a method, the method comprising:
determining a rigid transformation based on a beginning source mesh of a source mesh sequence and a selected target mesh of a target mesh sequence,
wherein the source mesh sequence and the target mesh sequence each comprise a plurality of individual meshes, respectively;
determining respective interpolation weights associated with the plurality of individual source meshes of the source mesh sequence based on respective indices of the individual source meshes in the source mesh sequence,
wherein a first respective interpolation weight is assigned to a first individual source mesh of the source mesh sequence with a first coordinate, along a z-axis,
wherein a second respective interpolation weight is assigned to a second individual source mesh of the source mesh sequence with a second coordinate, along the z-axis,
wherein the first coordinate is nearer a ground plane along the z-axis than the second coordinate, and
wherein, because first coordinate is nearer the ground plane, the first respective interpolation weight is greater than the second respective interpolation weight;
generating respective synthetic meshes based at least in part on the plurality of individual source meshes, respective target meshes of the target mesh sequence, and the respective interpolation weights; and
placing the respective synthetic meshes based at least in part on the rigid transformation to define a processor-generated character.

16. The non-transitory computer readable medium according to claim 15, wherein placing the respective synthetic meshes comprises: determining respective alignment transformations that place the respective synthetic meshes with respect to the respective plurality of individual meshes of the source mesh sequence and the target mesh sequence; and displacing the respective synthetic meshes by the respective alignment transformations to provide displaced synthetic meshes.

17. The non-transitory computer readable medium according to claim 15, further comprising presenting the synthetic meshes sequentially on a display.

18. The non-transitory computer readable medium according to claim 15, further comprising: determining a motion graph associated with a sub-grouping of meshes,
wherein: the sub-grouping of meshes comprises at least some of the source meshes, at least some of the target meshes, and at least some of the synthetic meshes; and the motion graph comprises a plurality of directional edges connecting a first respective mesh of the sub-grouping of meshes to a second respective mesh of the sub-grouping of meshes; and
determining respective transition probabilities associated with edges in the motion graph based at least in part on both the number of directional edges of the motion graph and the number of meshes of the sub-grouping of meshes.

19. The non-transitory computer readable medium according to claim 18, further comprising determining the respective transition probabilities so that respective visit probabilities of individual meshes of the sub--grouping of meshes are closer to uniform than are respective reference visit probabilities of the individual meshes of the sub-grouping of meshes with respect to substantially uniform reference transition probabilities.

20. The non-transitory computer readable medium according to claim 18, further comprising:
determining a sequence of meshes based at least in part on the motion graph and the transition probabilities; and rendering meshes of the sequence of meshes sequentially on a display; and
receiving an indication of a goal mesh of the sub-grouping of meshes via a user-operable input device; determining a path via the directional edges of the motion graph from a current mesh presented on the display to the goal mesh; and
rendering the sequence of meshes along the path sequentially on the display.

* * * * *